United States Patent [19]

Arai et al.

[11] Patent Number: 5,026,221

[45] Date of Patent: Jun. 25, 1991

[54] ROTARY CUTTING TOOL

[75] Inventors: Tatsuo Arai; Hidehisa Shiratori; Ryoei Hasegawa; Kazuo Iizuka, all of Tokyo, Japan

[73] Assignee: Mitsubishi Metal Corporation, Tokyo, Japan

[21] Appl. No.: 521,973

[22] Filed: May 11, 1990

[30] Foreign Application Priority Data

| May 11, 1989 | [JP] | Japan | 1-54052 |
| Aug. 15, 1989 | [JP] | Japan | 1-210360 |
| Mar. 28, 1990 | [JP] | Japan | 2-32011 |
| Mar. 28, 1990 | [JP] | Japan | 2-32012 |
| Mar. 28, 1990 | [JP] | Japan | 2-32013 |

[51] Int. Cl.$^5$ .................................................. B23C 7/00
[52] U.S. Cl. .................................. 409/137; 407/51; 407/115; 409/134
[58] Field of Search ............... 409/137, 134; 408/61, 408/56, 241 R, 241 G; 407/33, 51, 115; 144/251 R, 252 R

[56] References Cited

U.S. PATENT DOCUMENTS

| 1,990,991 | 2/1935 | Heubach | 409/137 |
| 2,944,465 | 7/1960 | Jones | 409/137 |
| 3,167,260 | 1/1965 | Gibbons et al. | 409/137 X |
| 3,899,814 | 8/1975 | Kralowetz | 409/137 X |
| 4,011,792 | 3/1977 | Davis | 409/137 |
| 4,037,982 | 7/1977 | Clement | 409/137 X |
| 4,563,115 | 1/1986 | Abe et al. | 409/134 |
| 4,915,550 | 4/1990 | Arai et al. | 408/61 |
| 4,932,447 | 6/1990 | Morin | 407/51 |

FOREIGN PATENT DOCUMENTS

| 63-136848 | 9/1988 | Japan. |
| 63-144146 | 9/1988 | Japan. |
| 1153247 | 6/1989 | Japan. |
| 141556 | 12/1989 | Japan. |
| 87-107131 | 8/1986 | U.S.S.R. |
| 1465189 | 3/1989 | U.S.S.R. | 409/234 |

Primary Examiner—William Briggs
Attorney, Agent, or Firm—Cushman, Darby & Cushman

[57] ABSTRACT

In a rotary cutting tool for use with at least one cutting tip, a cutter body has its forward end whose outer periphery has mounted thereto the cutting tip. A chip suction device is arranged outwardly of an outer peripheral surface of the cutter body for drawing chips generated by the cutting tip. The chip suction device includes a generally cylindrical cover unit having a wall for covering the cutter body. The cover unit is supported by the cutter body for rotation relative thereto. A chip accommodating chamber is defined between an inner peripheral surface of the cover unit and the outer peripheral surface of the cutter body. A suction port unit is provided in the wall of the cover unit and communicates with the chip accommodating chamber. A chip guide unit is arranged at the forward end of the cutter body in facing relation to the face of the cutting tip for guiding the chips generated by the cutting tip to the chip accommodating chamber.

28 Claims, 30 Drawing Sheets

FIG. 71 (PRIOR ART)
FIG. 72 (PRIOR ART)
FIG. 73 (PRIOR ART)
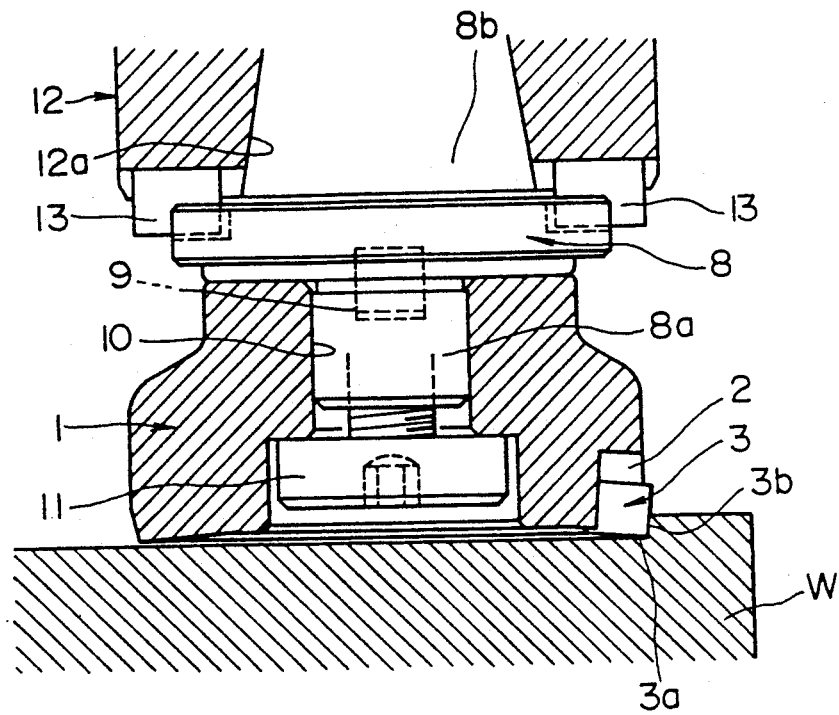
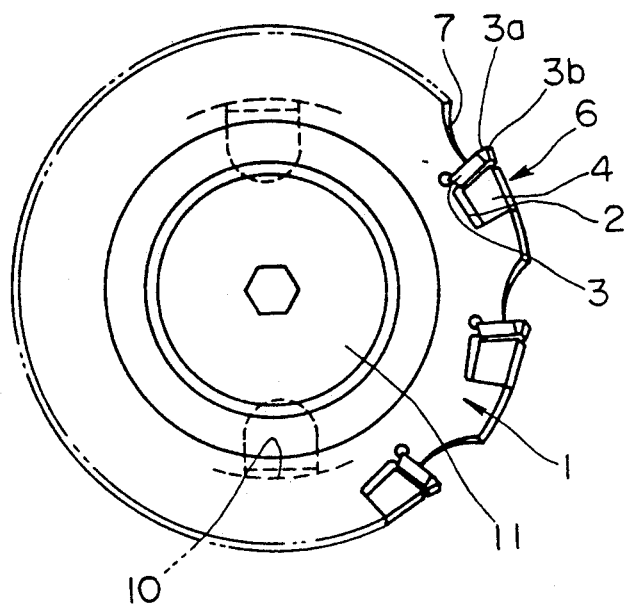
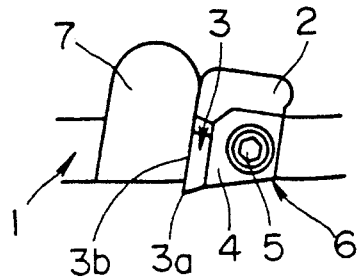

ROTARY CUTTING TOOL

BACKGROUND OF THE INVENTION

1. Field of the Invention

The present invention relates to rotary cutting tools chiefly for use in surface cutting such as, for example, a face milling cutter or the like and, more particularly, to a rotary cutting tool capable of successively processing chips generated during cutting.

2. Prior Art

Tools of various configurations have conventionally been proposed as rotatable cutting tools which are used to apply surface processing to a workpiece. Of the tools, a tool for use in a face milling cutter is small in cutting resistance and is suitable for strong cutting. Accordingly, the tool for use in the face milling cutter has widely been utilized at present.

The tool for the face milling cutter comprises a cutter body rotatable about its rotational axis, a plurality of face cutting edges provided at the forward end face of the cutter body, and a plurality of outer peripheral cutting edges provided at a forward end of an outer peripheral surface of the cutter body. Generally, these edges are made of cemented carbide. Almost all mounting methods of the cutting edges use throw-away methods in which at least one carbide tip having the cutting edges is fixedly mounted to the cutting body in a detachable manner. Thus, as the conventional tool for the face milling cutter, an example of the tool for the face milling cutter of throw-away type will be taken and will be described with reference to FIGS. 76 through 78 of the attached drawings.

As shown in FIGS. 76 and 77, a cutter body 1 is generally cylindrical in shape and has, at its proximal end, a diameter-reduced section. The cutter body 1 has a forward end whose outer periphery is formed with a plurality of recesses or tip mounting grooves 2. The tip mounting grooves 2 open toward the forward end of the cutter body 1 and toward a location radially outwardly thereof. The tip mounting grooves 2 are equidistantly spaced from each other along the peripheral direction of the cutter body 1. A plurality of throw-away tips (hereinafter referred simply to as "tips") 3 are mounted respectively within the tip mounting groove 2 by their respective clamp mechanisms 6. Each of the clamp mechanisms 6 comprises a wedge element 4 and a clamp screw 5 as shown in FIG. 78. By the clamp mechanism 6, the tip 3 is urged against one of a pair of opposed wall surfaces of the tip clamp groove 2, whereby the tip 3 is fixedly mounted in position to the cutter body 1 in a detachable manner.

As shown in FIG. 78, the tip 3 is in the form of a plate element made of cemented carbide and is in plan generally square in shape. When the tip 3 is fixedly mounted in position to the tip mounting groove 2, one end of the tip 3, which projects from the forward end face of the cutter body 1, is formed into a face cutting edge 3a, and one side of the tip 3, which projects from the forward end of the outer peripheral surface of the cutter body 1, is formed into an outer peripheral cutting edge 3b.

As shown in FIGS. 77 and 78, a plurality of tip pockets 7 are provided respectively in front of the tips 3 in the rotational direction of the cutter body 1. Each of the tip pockets 7 opens toward the forward end of the cutter body 1 and toward the radially outward location thereof, and has an arcuate wall surface. The tip pocket 7 has such a function as to successively guide and discharge chips generated by the cutting edges 3a and 3b, to the outside of the cutter body 1. Further, when a workpiece W is made of material which tends to generate continuous streamline chips such as low carbon steel or the like, the tip pocket 7 has also such a function of continuously rounding off the chips generated, and to divide and to break the chips.

On the other hand, the diameter-reduced section of the cutter body 1 is fixedly mounted to an arbor 8 through a detent key 9. Specifically, the arbor 8 has a shaft section 8a which is fitted in a mounting bore 10 which is formed at the center of the diameter-reduced section of the cutter body 1. A fastening bolt 11 is screwed into the end face of the shaft section 8a from an end face of the diameter-reduced section of the cutter body 1, which is located adjacent a larger-diameter section of the cutter body 1. In this manner, the cutter body 1 is fixedly mounted to the arbor 8 in concentric or coaxial relation thereto. Furthermore, at a location opposite to the shaft section 8a, the arbor 8 has a tapered shank 8b which is fitted in a tapered bore 12a in a main spindle 12 of a machine tool (hereinafter referred to as "main spindle"). The tapered shank 8b has its forward end which is formed with a female thread section (not shown). The female thread section is provided for drawing or pulling up the arbor 8 axially of the main spindle 12 by means of a drawing bolt (not shown) within the main spindle 12, to firmly connect the face milling cutter and the main spindle 12 to each other.

Face processing of the workpiece W by the use of the tool for the face milling cutter constructed as above is conducted as follows.

As shown in FIG. 76, the taper shank 8b of the arbor 8 is first fitted in the tapered bore 12a of the main spindle 12. The arbor 8 is drawn axially of the main spindle 12 by the drawing bolt. The arbor 8 is fixedly mounted to the main spindle 12 through a pair of main spindle keys 13. Thus, the face milling cutter is mounted to the main spindle 12. Subsequently, the workpiece W is fixedly mounted to a machine table (not shown) such that a work surface of the workpiece W extends perpendicularly to the axis of the main spindle 12. The main spindle 12 is rotated about its axis. The main spindle 12 or the machine table is moved axially of the main spindle 12 to give a predetermined depth of cut to the surface of the workpiece W. The main spindle 12 or the machine table is moved in a direction perpendicular to the axis of the main spindle 12. By doing so, surface parts of the workpiece W are successively cut by the face cutting edge 3a and the outer peripheral cutting edge 3b of each of the tips 3, so that the workpiece W is subject to surface processing.

The face milling cutter described above has the following drawback or disadvantage. That is, since the face milling cutter merely guides and discharges the chips generated, peripherally outwardly of the face milling cutter, the chips are widely dispersed or scattered to the circumference of the face milling cutter, accompanied with rotation of the cutter body 1. As a result, not only is the operational environment deteriorated, but also hazardous operating conditions sometimes occur. Further, a considerable time is taken to process the chips after completion of the cutting.

Moreover, the conventional face milling cutter has also the following disadvantage. That is, since the chips are gradually accumulated on the workpiece W, the table of the machine or the like, as the cutting continues, thermal deformation occurs in the workpiece W or the machine due to heat of the chips. Thus, working or processing accuracy is deteriorated, and the chips bit into the tip 3 so that the quality of the cut surface is damaged.

Furthermore, the chips scattered to the environment of the machine get into a sliding surface or the like of the machine. Thus, there is a fear that the machine per se deteriorates in accuracy or has its service life reduced.

The above-discussed problems are particularly important at a machining center which requires unmanned operation for a long period of time.

Further, in the case where the conventional face milling cutter described above is used to process a joint surface of a box-type workpiece having a relatively thin wall thickness, or to process a workpiece such as an opposite or reverse boss in which portions relatively small in processing area are dotted, there is a case where the width of the processing surface extending along the rotational direction of the tool becomes narrower than the peripheral pitch of the tips 3. In this case, since the tips 3 are cut intermittently into the workpiece, the cutting force fluctuates violently so that sheaves or shakes and vibration are induced.

In addition, intermittent contact between the tips 3 and the workpiece also causes periodical fluctuation in the dynamic rigidity of the main spindle system of the machine to which the tool is mounted. Thus, the sheaves or shakes and vibration induced by the cutting are amplified to cause breakage of the cutting edges and to reduce the service life thereof and, further, to cause a reduction in the processing accuracy of the workpiece. Thus, there is a fear that normal or regular cutting processing is damaging.

SUMMARY OF THE INVENTION

It is therefore an object of the invention to provide a rotatable cutting tool capable of processing a workpiece without scattering of chips generated by cutting in the surroundings.

It is another object of the invention to provide a rotary cutting tool capable of restricting sheaves or shakes and vibration occurring at cutting to normally or regularly cut a workpiece.

It is still another object of the invention to provide a rotary cutting tool capable of being used in a machine tool which is provided with an automatic tool exchanging apparatus.

According to the invention, there is provided a rotary cutting tool for use with at least one cutting tip having a face, the rotary cutting tool comprising a cutter body rotatable about a rotational axis and having a forward end and a proximal end, the cutting tip being mounted to an outer periphery of the forward end of the cutter body, and chip suction means arranged outwardly of an outer peripheral surface of the cutter body for drawing chips generated by the cutting tip, the chip suction means including;

generally cylindrical cover means having a wall for covering the cutter body, the cover means being supported by the cutter body for rotation relative thereto;

a chip accommodating chamber defined between an inner peripheral surface of the cover means and the outer peripheral surface of the cutter body;

suction port means provided in the wall of the cover means and communicating with the chip accommodating chamber; and chip guide means arranged at the forward end of the cutter body in facing relation to the face of the cutting tip for guiding the chips generated by the cutting tip to the chip accommodating chamber.

BRIEF DESCRIPTION OF THE DRAWINGS

FIG. 71 is a longitudinal cross-sectional view of the conventional rotary cutting tool;

FIG. 72 is a bottom view of the conventional cutting tool illustrated in FIG. 71; and FIG. 73 is a fragmentary enlarged view showing a forward end section of the tool illustrated in FIGS. 71 and 72.

DESCRIPTION OF THE PREFERRED EMBODIMENTS OF THE INVENTION

Figure 1:
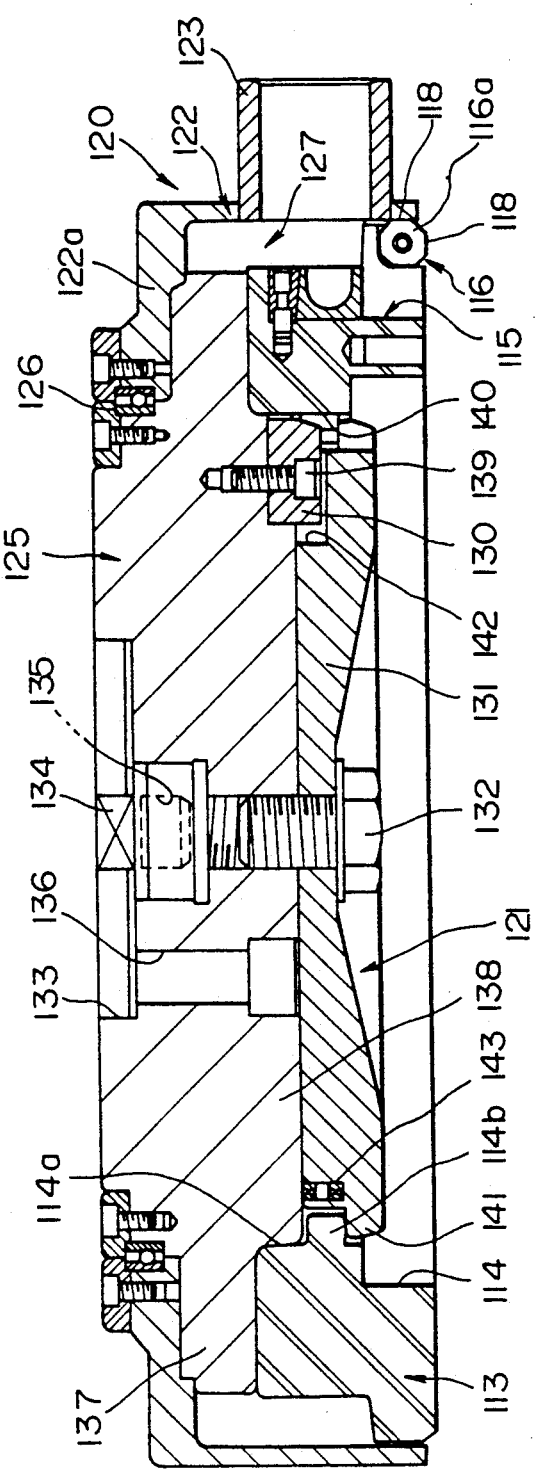
FIG. 1 is a longitudinal cross-sectional view of a rotary cutting tool according to a first embodiment of the invention.
Figure 3:
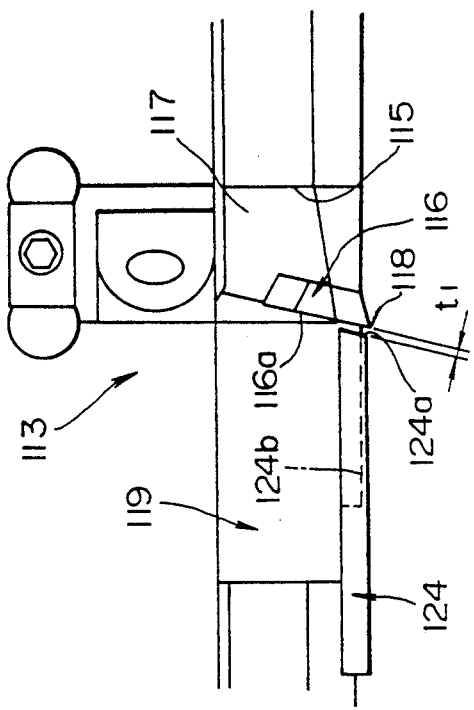
FIG. 3 is a fragmentary enlarged view showing an outer periphery of a forward end of a cutter body illustrated in FIGS. 1 and 2.
Figure 2:
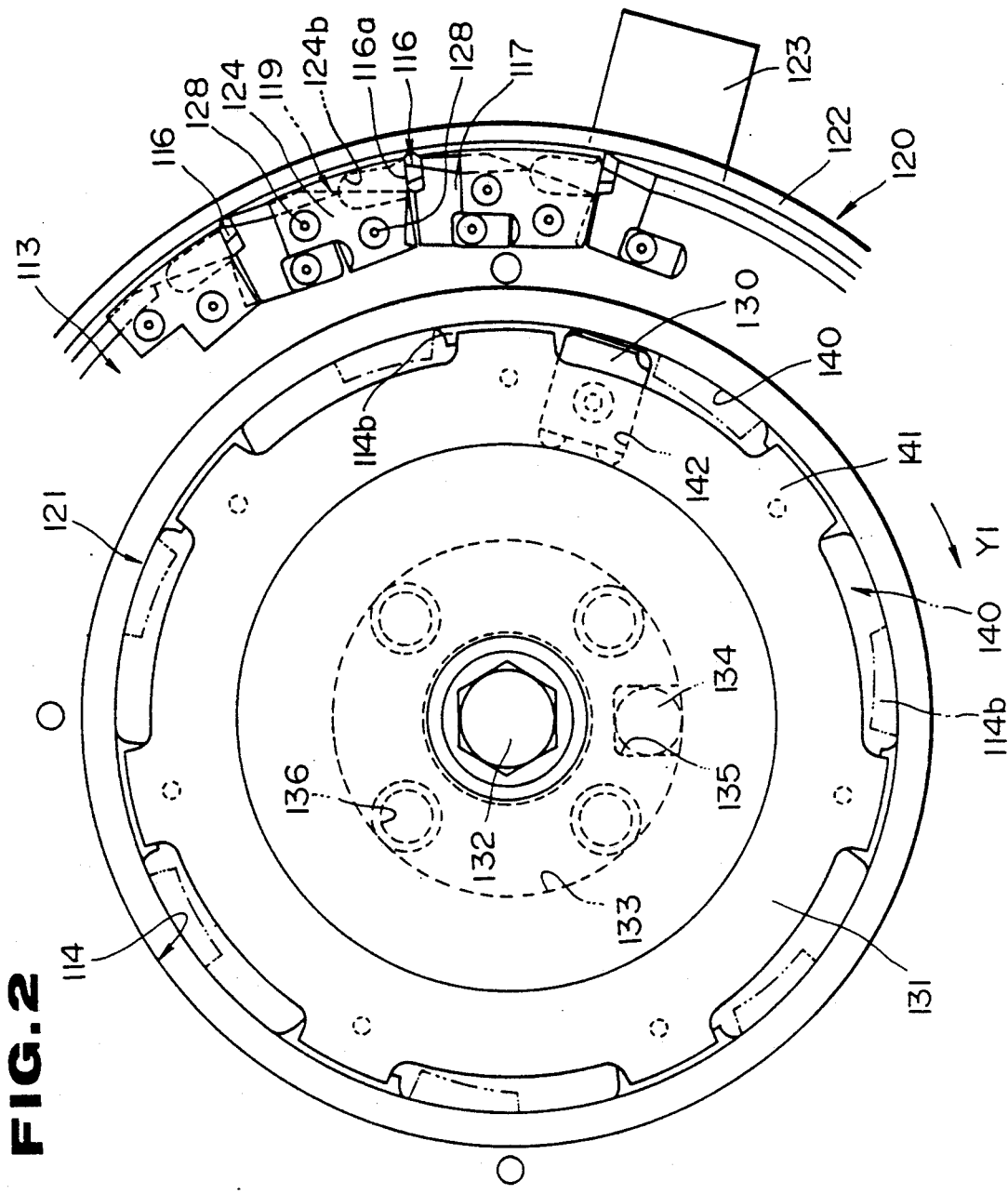
FIG. 2 is a fragmentary bottom view of the rotary cutting tool illustrated in FIG. 1.

Referring first to FIGS. 1 through 3, there is shown a rotary cutting tool according to a first embodiment of the invention.

The rotary cutting tool according to the first embodiment comprises a cutter body 113 which is formed, at its center, with a central bore 114 extending axially through the cutter body 113. The cutter body 113 is generally in the form of a cylinder whose forward end is enlarged in diameter. A plurality of recesses or grooves 115 are formed at an outer periphery of the forward end of the cutter body 113 in equidistantly spaced relation to one another in a peripheral direction. The grooves 115 open toward a forward end face and an outer peripheral surface of the cutter body 113.

As shown in FIGS. 1 and 3, at least one or a plurality of throw-away tips (hereinafter referred simply to as "tips") 116 are mounted respectively to the grooves 115 through respective cartridges 117 in a detachable manner. Each of the tips 116 is in the form of a regular octagon in plan. The tip 116 has a face 116a whose ridgelines are formed respectively into cutting edges 118. One of the cutting edges 118 of each of the tips 116 slightly projects from the forward end face of the cutter body 113. Further, as shown in FIGS. 2 and 3, outer peripheral surface portions of the cutter body 113, which are contiguous respectively to the grooves 115, are formed respectively into inclined surfaces each of which is gradually inclined radially inwardly of the cutter body 113 toward the face 116a of the tip 116. Thus, a plurality of tip pockets 119 are formed respectively in front of the faces 116a of the tips 116.

A chip suction mechanism 120 for removing chips generated by the tips 116 is arranged outwardly of the peripheral surface of the cutter body 113. On the other hand, a cutter fastening mechanism 121 for mounting the cutter body 113 to a main spindle (not shown) of a machine body is arranged at a location extending from the central bore 114 to the proximal end of the cutter body 113.

The above mechanisms 120 and 121 will be described below in order. As shown in FIGS. 1 and 2, the chip suction mechanism 120 generally comprises a chip accommodating element or a cover assembly 122 generally in the form of a cylinder for covering the outer peripheral surface of the cutter body 113, a suction port element 123 inserted into a peripheral wall of the cover assembly 122, and a plurality of chip guide members or elements 124 mounted to the forward end face of the cutter body 113.

As shown in FIG. 1, the cover assembly 122 is formed, at its proximal end, with a fitting section 122a whose inner periphery is arranged adjacent the proximal end of the cutter body 113. The cover assembly 122 is fitted, through a radial bearing 126, about an adapter 125 which forms a part of the cutter fastening mechanism 121. Thus, the cover assembly 122 is so arranged as to be rotatable relatively to the cutter body 113.

The cover assembly 122 has its forward end which extends to a location completely covering the cutting edges 118 of the respective tips 116 projecting radially outwardly of the cutter body 113. The cover assembly 122 has its inner diameter which is so determined as to be slightly larger than a rotational locus of the above-described cutting edges 118 about the axis of the cutter body 113. The cover assembly 122 has an intermediate section contiguous to its forward end, whose inner diameter is so determined as to be identical with that of the forward end of the cover assembly 122. The intermediate section has its inner peripheral surface which cooperates with the outer peripheral surface of the cutter body 113 adjacent the proximal end thereof, to define therebetween a chip accommodating chamber 127.

The suction port element 123 is cylindrical in shape, and has one end thereof which is fitted in the intermediate section of the cover assembly 122. The one end of the suction port element 123 has its interior portion which communicates with the chip accommodating chamber 127. On the other hand, a suction hose of a suction machine (not shown) is fitted about an outer peripheral surface of the other end of the suction port element 123. Thus, by the suction port element 123, the cover assembly 122 is maintained immovable and cannot be rotated about its axis.

Moreover, as shown in FIGS. 2 and 3, each of the chip guide elements 124 is in the form of a planar plate, and is fixedly mounted to the cutter body 113 by two mounting screws 128 and 128 at a location facing toward the face 116a of a corresponding one of the tips 116 which are located at the peripheral edge of the forward end of the cutter body 113. Thus, the chip guide element 124 covers the corresponding tip pocket 119.

As shown in FIG. 3, each of the chip guide elements 124 is positioned axially such that its surface is moved rearwardly toward the proximal end of the cutter body 113 with respect to the cutting edge 118 of the tip 116 which projects forwardly of the forward end of the cutter body 113. Further, the chip guide element 124 is positioned peripherally such that a gap $t_1$ occurs between the face 116a of the tip 116 and an end face 124a of the chip guide element 124 facing toward the face 116a of the tip 116. In this manner, the chip guide element 124 guides the chips generated along the face 116a of the tip 116 from the cutting edge 118 thereof, to the tip pocket 119.

Furthermore, a groove 124b is formed at a portion of the rear face of the chip guide element 124, which faces toward the tip pocket 119, and extends toward the wall surface of the tip pocket 119. Thus, consideration is made to prevent the chips guided to the gap $t_1$ from being clogged, and to discharge the chips to the tip pocket 119 without hindrance.

On the other hand, the cutter fastening mechanism 121 generally comprises the adapter 125 arranged adjacent the proximal end of the cutter body 113, a drive key 130 mounted to the adapter 125, an intermediate element 131 inserted in the central bore 114 of the cutter body 113, and a connecting bolt 132 inserted in the center of the intermediate element 131.

The adapter 125 is formed, adjacent its proximal end, with a fitting bore 133 in which is inserted a forward end of an arbor (not shown) inserted in a tapered bore in a main spindle of a machine body (not shown). A key 134, which is engaged with a key groove (not shown) in a forward end of the main spindle, is formed in a fitting bore 135. The adapter 125 is connected to the main spindle in an integral manner by a plurality of connecting bolts (not shown) which are inserted respectively through a plurality of bolt bores 136. Further, the adapter 125 has its outer periphery which is formed with a flange 137. The flange 137 has its one end face which faces toward the fitting section 122a of the cover assembly 122 with a slight gap left therebetween, to prevent dirt, dust or the like floating within the chip accommodating chamber 127 from invading the radial bearing 126.

The adapter 125 is formed, adjacent its forward end, with an annular projection 138 which is fitted in a fitting section 114a of the central bore 114 in the cutter body 113. The drive key 130 is fixedly mounted to the annular projection 138 through a bolt 139.

The drive key 130 is provided for transmitting rotation of the adapter 125 to the cutter body 113. As shown in detail in FIG. 2, the drive key 130 is mounted to the adapter 125 at a location which faces toward inner peripheral surfaces of respective projections or smaller-diameter sections 114b which are formed at the central bore 114 in the cutter body 113. The drive key 130 has its forward end which is fitted, in a loose or floating manner, in one of a plurality of cut-outs 140 formed respectively between the smaller-diameter sections 114b in equidistantly spaced relation to each other. Thus, the drive key 130 is engaged with one of a pair of opposed wall surfaces of one of the cut-outs 140, accompanied with rotation of the cutter body 113.

Furthermore, as shown in FIG. 1, the intermediate element 131 is inserted in an inner periphery of the smaller-diameter sections 114b of the cutter body 113.

The intermediate element 131 is connected to the adapter 125 through the connecting bolt 132 which is inserted through the center of the intermediate element 131. As shown in detail in FIG. 2, the intermediate element 131 has its end face which faces toward the forward end of the cutter body 113, and the end face of the intermediate element 131 has its peripheral edge which is formed with a plurality of projections 141. The projections 141 are the same in number as the cut-outs 140 formed respectively between the smaller-diameter sections 114b, and are equidistantly spaced from each other in the peripheral direction of the cutting tool. The projections 141 are engaged with the axial end faces of the respective smaller-diameter sections 114b to restrict axial movement of the cutter body 113.

Further, the intermediate element 131 has its axial end face which is directed toward the adapter 125, and the axial end face of the intermediate element 131 is formed with a key groove 142 at a location different from the projections 141. The drive key 130 is engaged with the key groove 142. By the drive key 130, the rotation of the adapter 125 is transmitted also to the intermediate element 131. Moreover, a spring 143 is inserted in the axial end face of the intermediate element 131. By the spring 143, the intermediate element 131 is always biased toward the head of the connecting bolt 132.

A description of the use of the face milling cutter constructed as above to perform cutting processing is given below. The cutter body 113 is first mounted to the machine body by the cutter fastening mechanism 121. Subsequently, the cutter body 113 is rotated about its rotational axis to cut a workpiece. Chips generated at the cutting of the workpiece are successively processed by the chip suction mechanism 120.

The operations of the respective mechanisms 121 and 120 will be described below in order. It will first be described to mount the cutter body 113 to the main spindle of the machine body. The adapter 125 is mounted to the main spindle by the connecting bolts which are inserted respectively through the bolt bores 136. Then, the drive key 130 is engaged with the key groove 142 in the intermediate element 131. Subsequently, the connecting bolt 132 is inserted into the intermediate element 131 and is screwed into the adapter 125. In this connection, the depth of insertion or the number of the connecting bolts 132 is limited to such a degree that the gaps between the projections 141 of the intermediate element 131 and the adapter 125 do not become smaller than the thickness of the smaller-diameter sections 114b of the cutter body 113.

Subsequently, as indicated by the double dotted lines in FIG. 2, the projections 141 of the intermediate element 131 and the drive key 130 are made in agreement respectively with the cut-outs 140, and the cutter body 113 is pushed toward the adapter 125 to fit the fitting section 114a about the annular projection 138 of the adapter 125. The cutter body 113 is rotated in the direction $Y_1$ in FIG. 2 until one of the pair of opposed wall surfaces of one of the cut-outs 140 corresponding to the drive key 130 is engaged with the latter.

By doing so, the projections 141 of the intermediate element 131 are engaged with the smaller-diameter sections 141b of the cutter body 113 so that movement of the cutter body 113 in the axial direction is restricted. Subsequently, the connecting bolt 132 is further tightened, whereby the cutter body 113 is firmly clamped between the adapter 125 and the intermediate element 131 and is connected to the main spindle of the machine body. In this connection, when the cutter body 113 is mounted to the intermediate element 131 and the adapter 125, the suction hose of the suction machine (not shown) is fitted about the the suction port element 123 which is arranged at the cover assembly 122. By the suction hose and the suction port element 123, the cover assembly 122 is prevented from being rotated about its rotational axis.

When the cutter body 113 is mounted to the main spindle of the machine body, operation of the machine body starts so that the cutter body 113 is rotated in a direction opposite to the direction $Y_1$ in FIG. 2, and is fed in a direction perpendicular to the rotational axis of the cutter body 113. Accompanied with the rotation and feeding, the cutting edge 118 of each of the tips 116, which projects from the forward end face of the cutter body 113, cuts the workpiece.

At this time, the chips generated along the cutting edge 118 to the face 116a of the tip 116 pass through the gap $t_1$ between the chip guide element 124 and the face 116a and are guided to the tip pocket 119. The chips are rounded off and divided into pieces by the tip pocket 119, and are discharged into the chip accommodating chamber 127. The chips discharged into the chip accommodating chamber 127 are discharged through the suction port element 123 under the drawing or suction action of the suction machine connected to the suction port element 123, and is collected by the suction machine.

When it is necessary to replace the tips 116 during cutting, the connecting bolt 132 of the cutter fastening mechanism 121 is loosened and, subsequently, the cutter body 113 is rotated in the direction opposite to the direction $Y_1$ in FIG. 2 to disengage the intermediate element 131 and the cutter body 113 from each other. In this manner, the cutter body 113 is taken out or removed from the interior of the cover assembly 122. The tips 116 are removed from the cutter body 113, and are replaced by new ones. Subsequently, the cutter body 113 should again be connected to the adapter 125 in accordance with the steps described above.

As mentioned above, according to the face milling cutter of the first embodiment of the invention, the chips generated at cutting are successively guided to the chip accommodating chamber 127 by the chip guide element 124. The chips are further discharged through the suction port element 123 and are drawn and collected by the suction machine. Thus, there are provided the following functional advantages. That is, the chips are not scattered around the machine, and the working or operating environment can be considerably improved; and the period of time required for chip processing can considerably be reduced. Moreover, since the chips are not accumulated on the workpiece and the machine body, deterioration in processing accuracy due to thermal deformation of the workpiece and the machine and deterioration in quality of the cut surface accompanied with biting of the chips does not occur. Further, the chips do not enter the sliding surface of the machine body and the like so that it the accuracy and the service life of the machine body are not reduced.

In addition, in the first embodiment, not only the chip suction mechanism 120 is arranged at the cutter body 113, but also the cutter fastening mechanism 121 is arranged at the cutter body 113. Thus, there is obtained the following functional advantage. That is, as compared with the case of provision of only the chip suction mechanism 120, the operability at replacement of the tips 116 can considerably be improved.

Specifically, it is assumed that only the chip suction mechanism is mounted to the conventional face milling cutter by, for example, mounting of a cover assembly to the arbor 8b shown in FIG. 76. In this case, the tips 3 are covered by the cover assembly under such a condition that the cutter body 1 is mounted to the main spindle 12 of the machine body. Thus, it becomes difficult to directly remove the tips 3 from the cutter body 1. Accordingly, in order to replace the tips 3 with other ones, the cutter body 1 cannot but be demounted from the arbor 8. In this case, however, since the outer periphery of the cutter body 1 is covered by the cover assembly so that the cutter body 1 cannot sufficiently be supported or held, there is a fear that operability at insertion and tightening of the fastening bolt 11 may cause considerable damage.

To the contrary, according to the first embodiment of the invention, only operation of the connecting bolt 132 under such a condition that the intermediate element 131 and the cutter body 113 are engaged with each other enables the cutter body 113 to be demounted from the adapter 125. Further, when the connecting bolt 132 is operated, it is unnecessary for an operator to support the cutter body 113. Thus, provision of the chip suction mechanism 120 does not in any way reduce the operability at replacement of the tips 116, so that the tips 116 can easily and quickly be replaced by other ones.

In connection with the above, the size of the gap between the inner peripheral surface of the forward end of the cover assembly 122 and the cutting edges 118 of the respective tips 16, which project radially outwardly of the peripheral surface of the cutter body 113, is not specified in the first embodiment. If the gap size is too small, however, there is a fear that eccentricity of the cover assembly 122 or the like causes the above-mentioned cutting edges 118 to bite into the cover assembly 122. Accordingly, it is desirable to secure the gap size to a value equal to or greater than 0.5 mm. Conversely, if the gap is excessively large, sealing-up of the chip accommodating chamber 127 is considerably impaired so that the suction efficiency is inevitably reduced. Thus, it is required that the gap be restricted to at most 2 mm and, preferably, to 1 mm or less.

Moreover, in the first embodiment, the case has been described where the chip suction mechanism 120 and the cutter fastening mechanism 121 are arranged particularly on the throw-away type face milling cutter. However, the rotary cutting tool according to the invention should not be limited to the application to this face milling cutter. The invention is naturally applicable to a face milling cutter having a plurality of soldered tips.

Furthermore, the drive key 130 should not be limited to one in number. When a larger driving force is required, two or more drive keys may be arranged. Further, in the first embodiment, a key groove to be formed in the cutter body 113 in accordance with the drive key 130 is omitted in the first embodiment, and the cut-outs 140, in which the projections 141 of the intermediate element 131 are fitted respectively, are substituted for the key groove. However, the rotary cutting tool according to the invention should not be limited to these cut-outs 140. The key groove, with which the drive key 130 is engaged, may independently be formed in the outer peripheral edge of the cutter body 113 or the like.

Moreover, in the first embodiment, the cover assembly 122 is rotatably supported by the adapter 125. However, the invention should not be limited to this specific example. For instance, the cover assembly 122 may be fixedly mounted to the periphery of the main spindle of the machine body. In summary, the arrangement may be such that the cover assembly 122 is rotatably arranged relatively to the cutter body 113, and the suction hose is connected to the suction port element 123.

Figure 4:
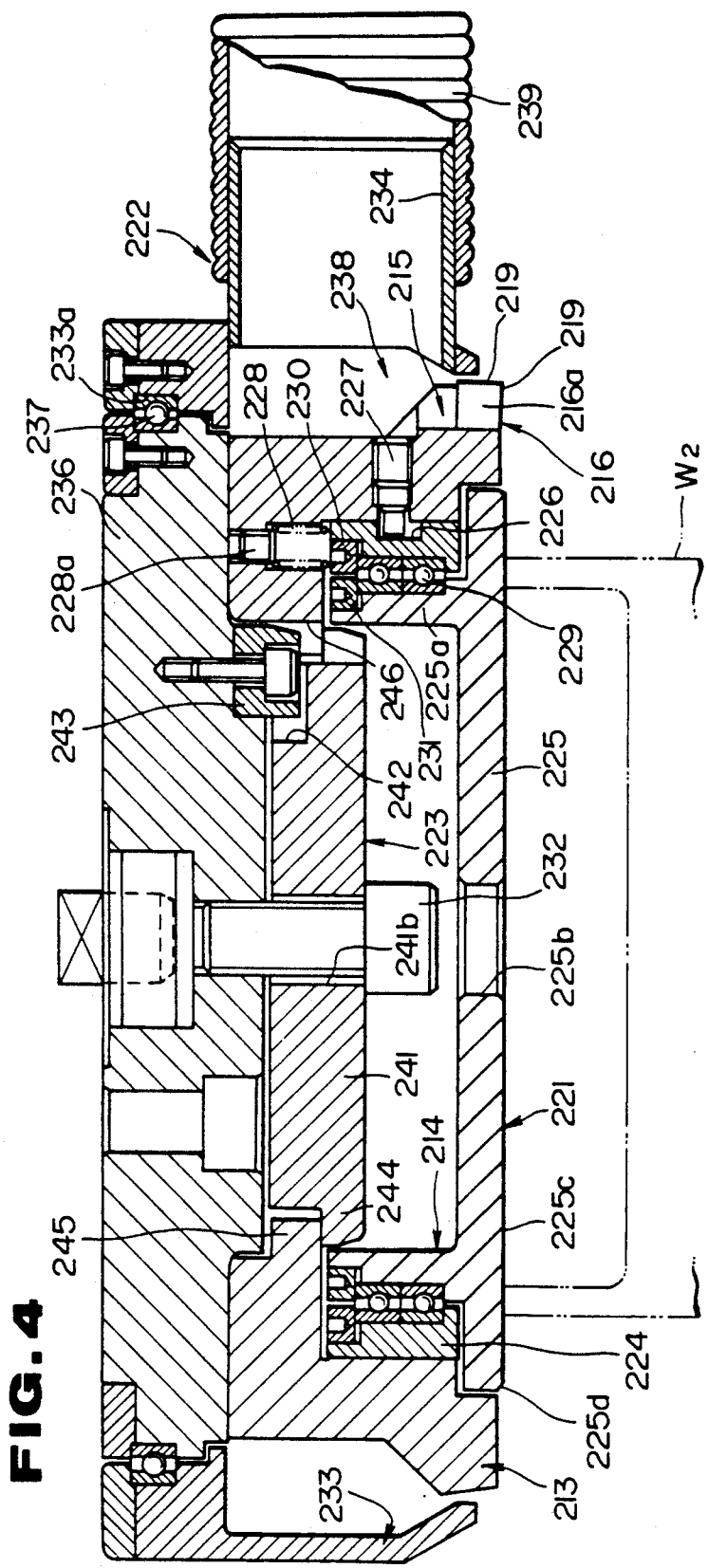
FIG. 4 is a longitudinal cross-sectional view of a rotary cutting tool according to a second embodiment of the invention.
Figure 6:
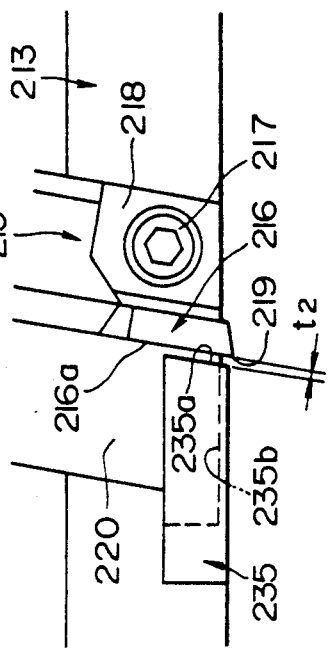
FIG. 6 is a fragmentary enlarged view showing an outer periphery of a forward end of a cutter body illustrated in FIGS. 4 and 5.
Figure 5:
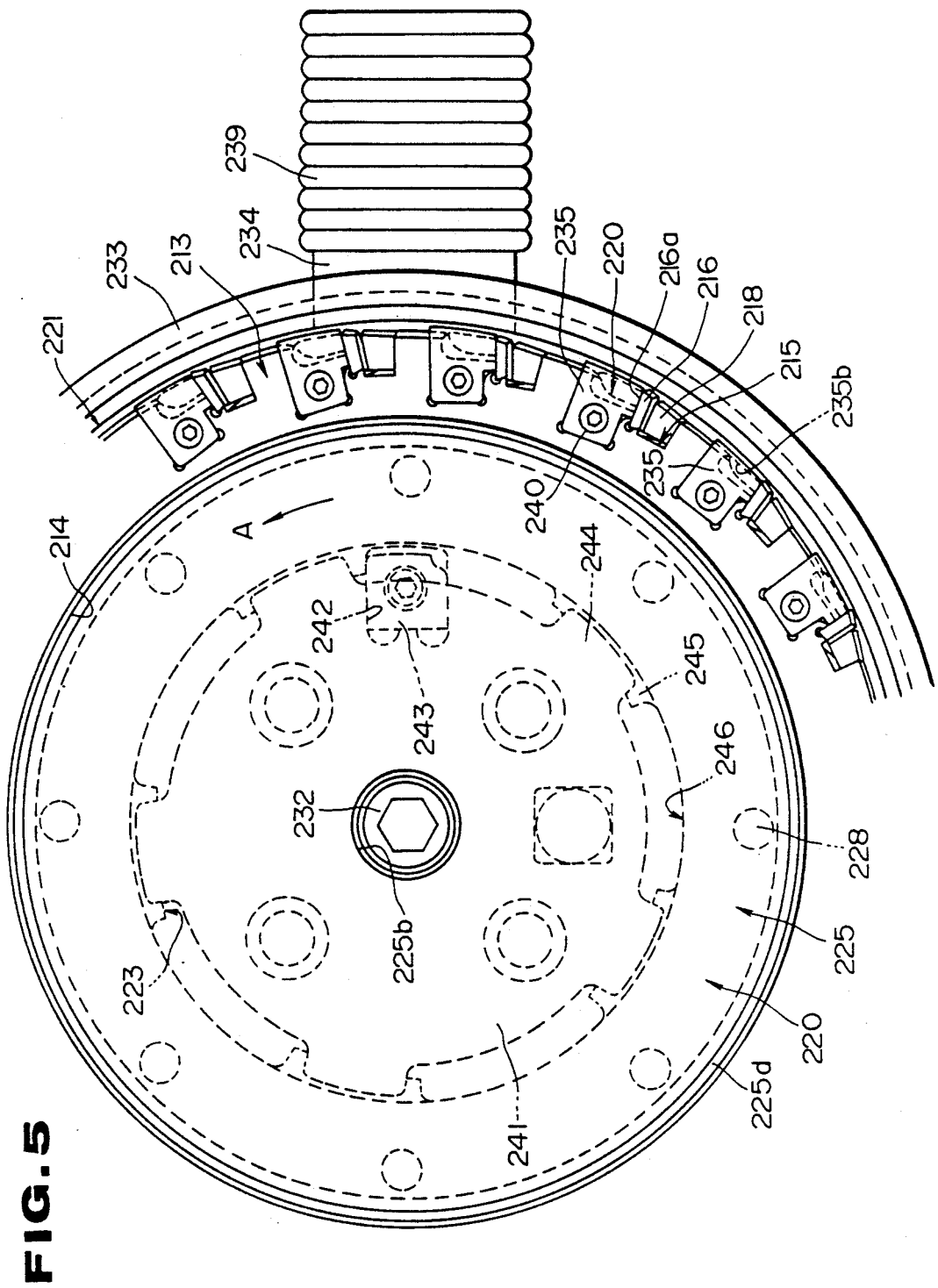
FIG. 5 is a fragmentary bottom view of the rotary cutting tool illustrated in FIG. 4.

Referring next to FIGS. 4 through 6, there is shown a rotary cutting tool according to a second embodiment of the invention.

The rotary cutting tool according to the second embodiment comprises a cutter body 213 which is generally in the form of a cylinder. The cutter body 213 has its forward end which is formed, at its center, with a recess 214. The forward end of the cutter body 213 is enlarged in diameter. The cuter body 213 has its forward end whose outer periphery is formed with a plurality of grooves 215. The grooves 215 open toward the forward end face and the outer peripheral surface of the cutter body 213, and are formed in equidistantly spaced relation to each other in a peripheral direction of the cutting tool.

As shown in FIGS. 4 and 6, a plurality of throw-away tips (hereinafter referred simply to as "tips") 216 are detachably mounted respectively to the grooves 215 by respective wedge elements 218 which are fastened by respective clamp screws 217. Each of the tips 216 is in the form of a plate and has its face 216a whose ridgelines are formed respectively into cutting edges 219. One of the cutting edges 219 slightly projects from the forward end face of the cutter body 213. Further, as shown in FIGS. 5 and 6, a plurality of tip pockets 220 are formed in the cutter body 213 at respective locations where the outer peripheral surface of the cutter body 213 is directed toward the faces 216a of the respective tips 216

As shown in FIG. 4, a work clamp mechanism 221 for pressing down a workpiece $W_2$ is arranged at the forward end of the cutter body 213. Further, a chip suction mechanism 222 is arranged radially outwardly of the peripheral surface of the cutter body 213 for drawing chips generated by the cutting edges 219 of the tips 216. Moreover, a cutter fastening mechanism 223 is arranged at a location extending from the recess 214 of the cutter body 213 toward the proximal end thereof, for mounting the cutter body 213 to a main spindle of a machine body (not shown).

The mechanisms 221, 222 and 223 will be described below in order. As shown in FIGS. 4 nd 5, the work clamp mechanism 221 is generally arranged such that a support element 224 generally in the form of a cylinder is inserted in the recess 214 of the cutter body 213, and a work clamp element 225 is connected to the support element 224.

The support element 224 is arranged for movement axially of the cuter body 213. A groove 226 formed in the outer peripheral surface of the support element 224 is engaged with a forward end of a screw 227 which is screwed from the peripheral surface of the cutter body 213 to prevent the support element 224 from falling off from the recess 214. The support element 224 is always biased toward the forward end of the cutter body 213 by a plurality of springs 228 (refer to FIG. 5) which are arranged adjacent the proximal end of the cutter body 213 in equidistantly spaced relation to each other.

A plurality of radial bearings 229 are fitted in the inner periphery of the support element 224, and have their respective outer rings which are fastened axially by a fastening nut 230. The radial bearings 229 have their respective inner rings which are fitted about a shaft section 225a formed adjacent the proximal end of the work clamp element 225, and which are axially fastened by a fastening nut 231. Thus, the work clamp element 225 is connected to the support element 224 through the radial bearings 229, and is rotatable about the rotational axis of the cutter body 213.

The work clamp element 225 has its forward end which is formed into a disc shape. The disc-shaped forward end of the work clamp element 225 is formed, at its center, with a through bore 225b through which a connecting bolt 232 is inserted. The connecting bolt 232 forms a part of the cutter fastening mechanism 223. Further, the work clamp element 225 has a forward end face 225c which is formed into an abutment surface with respect to the workpiece $W_2$. The forward end face 225c is processed in finishing into a smooth surface, and has its peripheral edge section which is formed with a tapered section 225d. The forward end face 225c of the work clamp element 225 projects from the forward end face of the cutter body 213 under such a condition that the support element 224 biased by the springs 228 is located nearest the forward end of the cutter body 213. In this connection, the biasing force of the springs 228 biasing the support element 224 is adjusted by their respective adjusting screws 228b.

On the other hand, as shown in FIGS. 4 and 5, the chip suction mechanism 222 generally comprises a chip accommodating element or a cover assembly 233 generally in the form of a cylinder for covering an outer peripheral surface of the cutter body 213, a suction port element 234 provided in a peripheral wall of the cover assembly 233, and a plurality of chip guide elements 235 mounted to the peripheral edge of the forward end face of the cutter body 213.

The cover assembly 233 has its proximal end formed with a fitting bore 223a. The fitting bore 333a is arrange adjacent the proximal end of the cutter body 213. The cover assembly 233 is connected to an adapter 236 through a radial bearing 237. The adapter 236 forms a part of the cutter fastening mechanism 223. Thus, the cover assembly 233 is rotatable relatively to the cutter body 213.

The forward end of the cover assembly 233 extends to a location covering upper portions of the respective cutting edges 219 of the tips 216, which project radially outwardly of the cutter body 213. The forward end of the cover assembly 233 has its inner diameter which is so determined as to be slightly larger than a rotational locus of the cutting edges 219 about the axis of the cutter body 213. The cover assembly 233 has an intermediate section contiguous to its forward end, which is enlarged in diameter more than the forward end. The intermediate section has an inner peripheral surface which cooperates with an outer peripheral surface of the cutter body 213 adjacent the proximal end thereof, to define therebetween a chip accommodating chamber 238.

The suction port element 234 is formed into a cylinder having its one end which is fitted in the intermediate section of the cover assembly 233. A suction hose 239 of a suction machine (not shown) is fitted about the outer periphery of the suction port element 234. Thus, the chip accommodating chamber 238 communicates with the suction machine through the suction hose 239. Further, the cover assembly 233 is restricted by the suction hose 239 so that the cover assembly 233 is prevented from being rotated about its axis.

As shown in FIGS. 5 and 6, each of the chip guide elements 235 is in the form of a planar plate, and is fixedly mounted to the cutter body 213 by a bolt 240 at a location which is directed toward the face 216a of the tip 216 at the peripheral edge of the forward end of the cutter body 213, to cover the tip pocket 220.

As shown in FIG. 6, each of the chip guide elements 235 is positioned axially such that its surface is substantially flush with the forward end face of the cutter body 213. The chip guide element 235 is positioned peripherally such that gap $t_2$ occurs between the face 216a of the tip 216 and an end face 235a of the chip guide element 235, which is directed toward the face 216a. The chip guide elements 235 guide chips generated along the faces 216a from the cutting edges 219, into the respective tip pockets 220. Moreover, a groove 235b is formed in a portion of each of the chip guide elements 235, which faces toward the tip pocket 220. The groove 235b extends from the end face 235a toward the wall surface of the tip pocket 220. Thus, consideration is made to prevent the chips guided to the gap $t_2$ from being clogged in order to discharge the chips to the tip pocket 220 without hindrance.

As shown in FIGS. 4 and 5, the cutter fastening mechanism 223 comprises the adapter 236 whose forward end is fitted in the proximal end of the cutter body 213 and whose proximal end is connected to a main spindle of a machine body (not shown) through a tool holder (not shown), an intermediate element 241 inserted rotatably in the recess 214 of the cutter body 213, a drive key 243 fixedly mounted to the forward end of the adapter 236 and fitted in a key groove 242 provided in the rearward face of the intermediate element 241, and the connecting bolt 232 inserted in a central bore 241b in the intermediate element 241 and screwed into the center of the adapter 236.

The intermediate element 241 is provided for restricting axial movement of the cutter body 213. A plurality of projections 244 are formed at the peripheral edge of the forward end of the intermediate element 241 in equidistantly spaced relation to each other in the peripheral direction of the cutting tool. The intermediate element 241 is firmly connected to the adapter 236 through the connecting bolt 232 under such a condition that the projections 244 are engaged respectively with smaller-diameter sections 245 which are formed at the recess 214 of the cutter body 213 in number corresponding to the projections 244. In this manner, the cutter body 213 is clamped between the intermediate element 241 and the adapter 236.

The drive key 243 is fitted in one of a plurality of cut-outs 246 in the cutter body 213, which are formed in continuous to the smaller-diameter sections 245 thereof in a peripherally movable manner. The drive key 243 is engaged with one of a pair of opposed wall surfaces of one of the cut-outs 246 in the cutter body 213, which is located in front of the rotational direction (direction A in FIG. 5) under such a condition that the projections 244 of the intermediate section 241 are engaged respectively with the smaller-diameter sections 245 of the cutter body 213. Thus, the cutter body 213 is prevented from being rotated in a direction opposite to the cutter rotational direction.

It will be described below to use the face milling cutter constructed as above to perform cutting. The proximal end of the adapter 236 is first connected to the main spindle of the machine body. Subsequently, the cut-outs 246 of the cutter body 213 are made in agreement respectively with the projections 244 of the intermediate element 241. The cutter body 213 is pressed down or pushed toward the adapter 236, and the proximal end of the cutter body 213 is fitted about the adapter 236. The cutter body 213 is rotated until the smaller-diameter sections 245 of the cutter body 213 are engaged respectively with the projections 244 of the intermediate element 241. Then, the connecting bolt 232 is tightened. Thus, the cutter body 213 is clamped between the adapter 236 and the intermediate element 241 so that the cutter body 213 is prevented from being moved axially. Further, the cutter body 213 is prevented from being rotated in a direction opposite to the cutter rotational direction (the direction A in FIG. 5) by the drive key 243 which is engaged with the wall surface of one of the cut-outs 246.

After the cutter body 213 has been mounted to the main spindle, the cutter body 213 is rotated about its axis, and is fed in a direction perpendicular to the axis of the cutter body 213. Thus, the cutter body 213 cuts the workpiece $W_2$ by the cutting edges 219 of the tips 216.

In this case, the work clamp element 225, which projects from the forward end face of the cutter body 213, is gradually abutted against the cutting surface of the workpiece $W_2$ from the tapered section 225b at the peripheral edge of the work clamp element 225, accompanied with feeding of the cutter body 213. At the time the forward end face 225c of the work clamp element 225 is abutted against the workpiece $W_2$, the biasing load of the springs 228 biasing the support element 224 is transmitted to the work clamp element 225 through the support element 224, and serves as a force for pressing down the workpiece $W_2$. Thus, the forward end of the cutter body 213 and the workpiece $W_2$ are always maintained abutted against each other, so that fluctuation in the dynamic rigidity of the main-spindle system of the machine body is restricted. In this connection, in order to prevent a thin-wall section of the workpiece $W_2$ pressed down by the work clamp element 225 from being deformed due to an excessive load, the biasing load of the springs 228 is beforehand adjusted by the respective adjusting screws 228a.

Further, the chips generated along the faces 216a of the respective tips 216 from the cutting edges 219 thereof at cutting are passed through the gaps $t_2$ between the chip guide elements 235 and the faces 216a and are guided to the respective tip pockets 220. The chips are rounded off by each of the tip pockets 220 and are divided into pieces, and are discharged to the chip accommodating chamber 238. The chips discharged into the chip accommodating chamber 238 are drawn from the suction port element 234 by the suction machine through the suction hose 239 under the drawing action of the suction machine connected to the suction port element 234. In this manner, the chips are collected by the suction machine.

Moreover, if it becomes necessary to replace the tips 216 during cutting, the connecting bolt 232 of the cutter fastening mechanism 223 is loosened. Then, the cutter body 213 is rotated in the direction opposite to the direction A in FIG. 2 to disengage the projections 244 of the intermediate element 241 respectively from the smaller-diameter sections 245 of the cutter body 213. Subsequently, the cutter body 213 is removed from the interior of the cover assembly 233. The tips 216 are detached or demounted from the cutter body 213 and are replaced with new ones. Subsequently, the cutter body 213 is again engaged with the intermediate element 241, and is connected to the adapter 236.

As described above, in the cutter according to the second embodiment of the invention, since the forward end of the cutter body 213 and the workpiece $W_2$ are maintained always abutted against each other, the dynamic rigidity of the main spindle system of the machine is considerably improved as compared with the case where the forward end of the cutter body 213 is released from the workpiece $W_2$. Furthermore, there is no case where the value of the dynamic rigidity changes. Thus, occurrence of sheaves or shakes and vibration can considerably be restricted even in the case of so-called discontinuous or intermittent cutting in which a cutting force fluctuates due to discontinuous or intermittent contact between the tips 216 and the workpiece $W_2$.

In addition, the chips generated at cutting are successively drawn by the chip suction mechanism 222 without accumulation of the chips on the cutting surface of the workpiece $W_2$. Accordingly, there occurs no case where the chips bite into a location between the workpiece $W_2$ and the forward end face 225c of the work clamp element 225 to damage the cutting surface.

Furthermore, in the second embodiment, mere operation of the connecting bolt 232 under such a condition that the intermediate element 241 and the cutter body 213 are engaged with each other enables the cutter body 213 to be demounted from the adapter 236. Further, when the connecting bolt 232 is operated, it is not required for an operator to support the cutter body 213. Accordingly, in spite of the fact that the outer peripheral surface of the cutter body 213 is covered by the cover assembly 233 so that the cutter body 213 cannot be gripped, the operability of the cutter replacement operation is not hindered at all.

Figure 7:
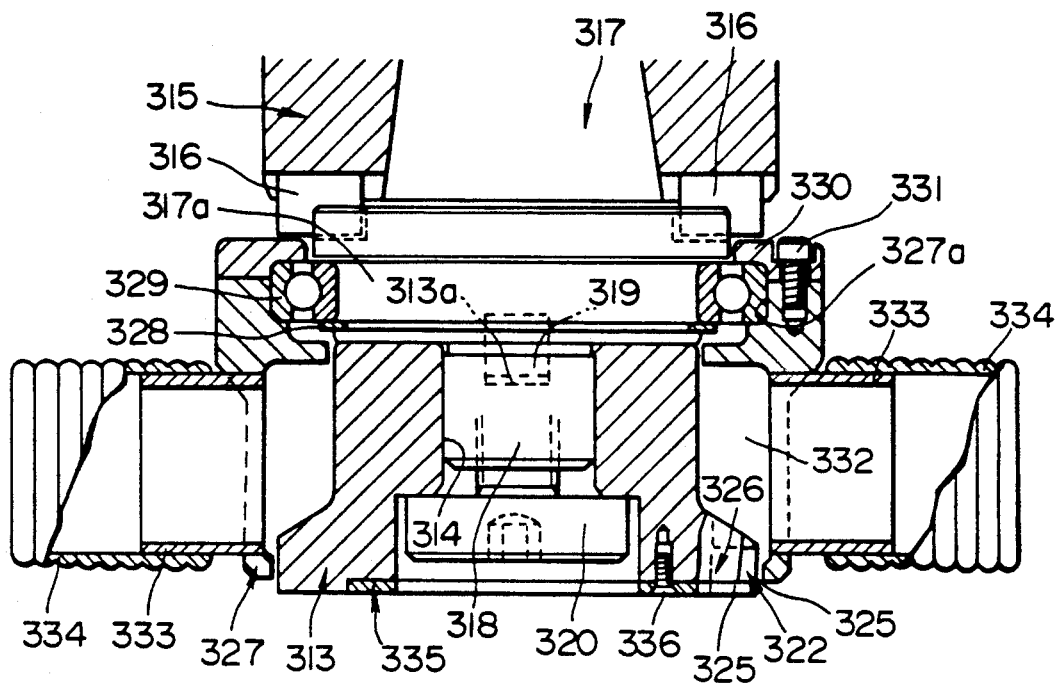
FIG. 7 is a longitudinal cross-sectional view of a rotary cutting tool according to a third embodiment of the invention.
Figure 8:
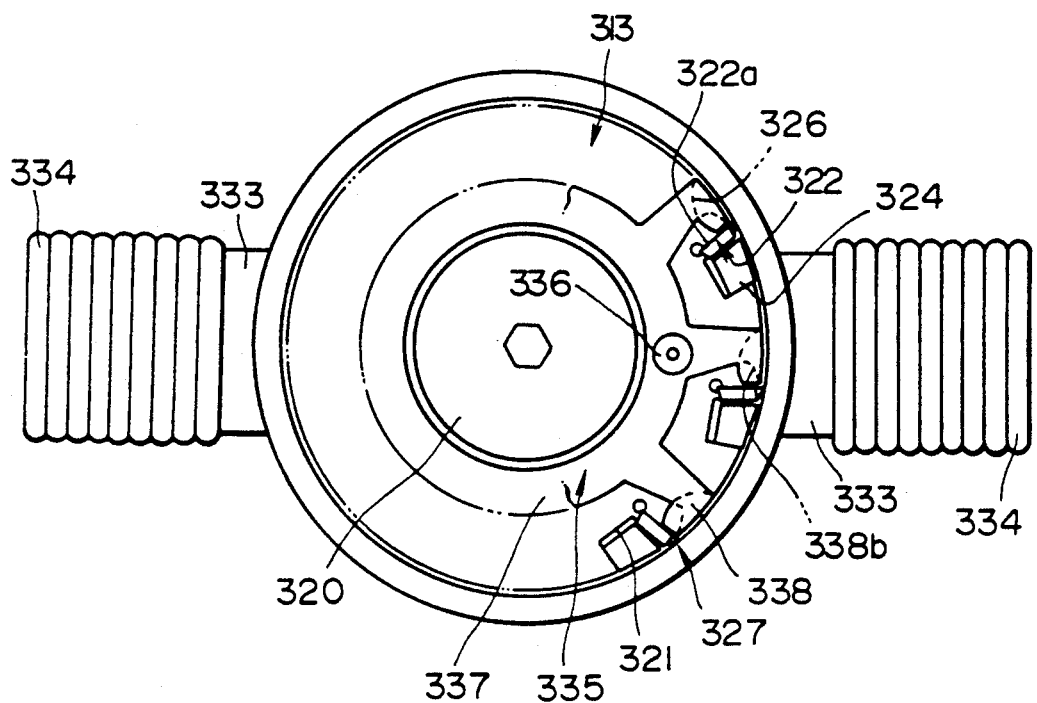
FIG. 8 is a bottom view of the rotary cutting tool illustrated in FIG. 7.
Figure 9:
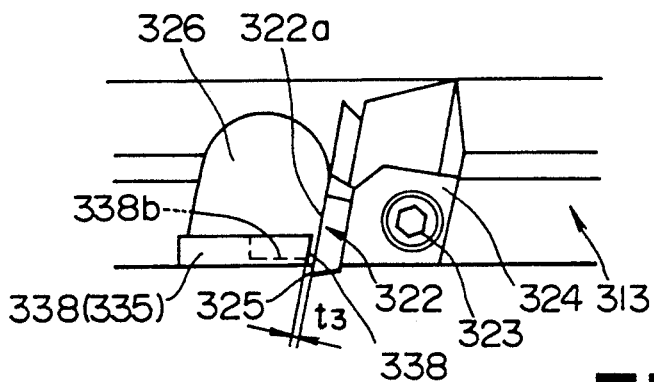
FIG. 9 is a fragmentary enlarged view showing an outer periphery of a forward end of a cutting body illustrated in FIGS. 7 and 8.

Referring next to FIGS. 7 through 9, there is shown a rotary cutting tool according to a third embodiment of the invention.

The rotary cutting tool according to the third embodiment comprises a cutter body 313 which is generally in the form of a cylinder. The cutter body 313 is formed, at its center, with a central bore 314 extending axially through the cutter body 313. The cutter body 313 has its forward end which is enlarged in diameter. The central bore 314 is fitted about a fitting shaft 318 of an arbor 317 which is mounted to a main spindle 315 of a machine body through a plurality of keys 316. The cutter body 313 is pressed down axially by a fastening bolt 320 which is screwed into the center of the arbor 317 under such a condition that a key groove 313a formed in the proximal end of the cutter body 313 is engaged with a drive key 319 fixedly mounted to the arbor 317. In this manner, the cutter body 313 is connected to the arbor 317.

As shown in FIGS. 8 and 9, a plurality of grooves 321 are formed in the outer periphery of the forward end of the cutter body 313 in equidistantly spaced relation to one another. The grooves 321 open toward the forward end face and the outer peripheral surface of the cutter body 313. At least one, that is, a plurality of throw-way tips (hereinafter referred merely to as "tips") 322 are detachably mounted respectively to the grooves 321 by respective wedge elements 324 which are fastened respectively to the cutter body 313 by clamp screws 323. Each of the tips 322 has its face 322a whose ridgelines are formed respectively into cutting edges 325. One of the cutting edges 325 slightly projects from the forward end face of the cutter body 313. Furthermore, a plurality of tip pockets 326 each having an arcuate wall surface are formed in the cutter body 313 at respective locations which are directed respectively to the faces 322a of the respective tips 322.

Furthermore, as shown in FIGS. 7 and 8, a chip accommodating element or a cover assembly 327 generally in the form of a cylinder is arranged at a location radially outwardly of the peripheral surface of the cutter body 313. The cover assembly 327 is formed, at its proximal end, with a fitting bore 327a which is fitted about a diameter-enlarged section 317a of the arbor 317, so that the cover assembly 327 is fitted about a radial bearing 329 which is retained by a ring-shaped retainer 328. The cover assembly 327 is connected, through a plurality of bolts 331, to a bearing retainer 330 at a location opposite to the ring-shaped retainer 328. Thus, the cover assembly 327 is supported rotatably with respect to the cutter body 313.

The cover assembly 327 has its forward end which extends substantially to an intermediate location of the cutting edges 325 of the respective tips 322, which project radially outwardly of the cutter body 313. The cover assembly 327 has its inner diameter which is so determined as to be slightly larger than a rotational locus of the above-mentioned cutting edges 325 about the axis of the cutter body 313. Further, the cover assembly 327 has an intermediate section contiguous to its forward end, whose inner diameter is larger than that of the forward end. A chip accommodating chamber 332 is defined between an inner peripheral surface of the intermediate section of the cover assembly 327 and an outer peripheral surface of the proximal end of the cutter body 313, which is reduced in diameter radially inwardly of the cutter body 313.

Moreover, a pair of suction port elements 333 and 333 are arranged at the peripheral wall of the cover assembly 327. The suction port elements 333 and 333 are arranged at their respective locations where the outer peripheral surface of the cover assembly 327 is equally divided into two. The suction port elements 333 and 333 have their respective one ends which are fitted respectively in the intermediate section of the cover assembly 327. A pair of suction hoses 334 and 334 of a suction machine (not shown) are fitted respectively about the outer peripheries of the suction port elements 333 and 333. By doing so, the chip accommodating chamber 332 communicates with the suction machine through the pair of suction hoses 334 and 334. Further, the cover assembly 327 is restricted by the pair of suction hoses 334 and 334 so as to be prevented from being rotated about the rotational axis of the cover assembly 327.

Furthermore, as shown in FIGS. 7 through 9, a chip guide element 335 is mounted to the forward end face of the cutter body 313 by a plurality of flat head screws 336 (only one shown). The chip guide element 335 comprises a thin ring-shaped mounting section 337 and a plurality of chip guide sections 338 formed at a peripheral edge of the mounting section 337 in equidistantly spaced relation to each other for covering respectively the tip pockets 326. The chip guide element 335 is axially positioned such that its surface is substantially in flush with the forward end face of the cutter body 313. The chip guide element 335 is positioned peripherally such that a gap $t_3$ occurs between the face 322a of each of the tips 322 and an end face 338a of each of the chip guide sections 338, which is directed toward the face 322a of the tip 322. In this manner, the chip guide element 335 guides chips generated along the faces 322a of the respective tips 322, into the tip pockets 326 through the gaps $t_3$.

Each of the chip guide sections 338 has its forward end whose rearward face is formed with a groove 338b which extends from the end face 338a toward the wall surface of the tip pocket 326. Thus, consideration is made to prevent the chips guided to the gaps $t_3$ from being clogged to discharge the chips to the tip pockets 326 without hindrance.

In the face milling cutter constructed as above, the chips generated along the face 322a of each of the tips 322 from the cutting edges 325 thereof are passed through the gap $t_2$ between the end face 338a of the chip guide element 335 and the face 322a of the tip 322, and are guided to the tip pocket 326. The chips are rounded off by the tip pocket 326 and are divided into pieces, and are discharged to the chip accommodating chamber 332. The chips discharged into the chip accommodating chamber 332 are drawn from the suction port elements 333 and 333 through the suction hoses 334 and 334 under the drawing action of the suction machine connected to the suction port elements 333 and 333 through the suction port elements 333 and 333. In this manner, the chips are collected by the suction machine.

As described above, according to the face milling cutter of the third embodiment, the chips generated at cutting are successively guided into the chip accommodating chamber 332 by the chip guide element 335. The chips are further drawn into the suction machine from the suction port elements 333 and 333 through the suction hoses 334 and 334, and are collected to the suction machine. Thus, there are provided the following functional advantages. That is, the chips are not scattered to the circumference of the machine, the working or operating environment can considerably be improved, and the period of time required for the chip processing can be reduced considerably. Moreover, since the chips are not accumulated on the workpiece, a table of the machine body and the like, no deterioration in processing accuracy due to thermal deformation of the workpiece and the machine, nor deterioration in quality of the cut surface due to the biting of chips occurs. Furthermore, the chips do not enter the sliding surface of the machine body and the like so that the accuracy and the service life of the machine body is not reduced.

In addition, in the third embodiment, the pair of suction port elements 333 and 333 are arranged respectively at their locations where the peripheral surface of the cover assembly 327 is equally divided into two. Accordingly, there can be provided such a functional advantage that the chip processing ability is improved as compared to a case where, particularly in a larger-diameter tool, the suction port element 333 is provided at a single location.

That is, when air within the chip accommodating chamber 332 is drawn through the suction port elements 333 and 333 to collect the chips, there is a tendency for the suction force acting upon various parts of the chip accommodating chamber 332 to gradually weaken as the distance increases from the suction port elements 333 and 333. For this reason, particularly in a large-diameter tool equal to or larger than 250 mm in diameter, only one suction port element 333 extremely weakens the suction force at the location within the chip accommodating chamber 332, which is most spaced apart from the vicinity of the suction port element 333. Thus, there is a fear that it is impossible to smoothly collect the chips. In the rotary cutting tool according to the third embodiment, however, since the pair of suction port elements 333 and 333 are arranged at their respective locations where the cover assembly 327 is equally divided into two in the peripheral direction, the distance to the location most spaced apart from the vicinity of each of the suction port elements 333 and 333 can considerably be reduced. For this reason, a sufficient suction force acts even at a location most spaced apart from the suction port elements 333 and 333 of the chip accommodating chamber 332 so that the chips are always smoothly collected.

In connection with the above, in the third embodiment, a case has particularly been described where the pair of suction port elements 333 and 333 are provided. However, the rotary cutting tool according to the invention should not be limited to this specific example. That is, the number of the suction port elements is selected in accordance with the tool diameter in an optimum manner. As a standard, two or three suction port elements 333 are sufficient within a range in which the diameter of the tool is less than 500 mm. In the case where the diameter of the tool is equal to or larger than 500 mm, it is preferable that at least four suction port elements are provided.

Figure 10:
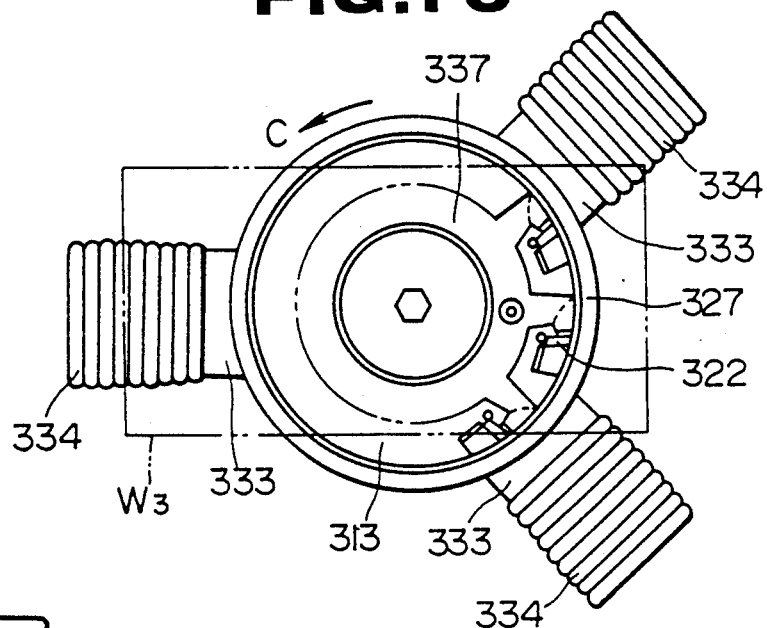
FIG. 10 is a bottom view of a modification of the rotary cutting tool illustrated in FIG. 7.
Figure 11:
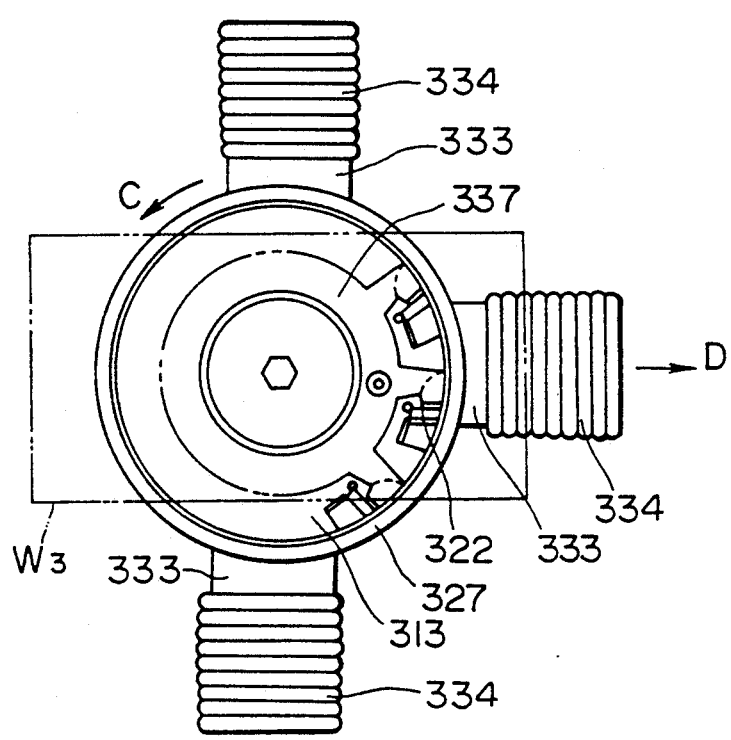
FIG. 11 is a view similar to FIG. 10, but showing another modification of the rotary cutting tool illustrated in FIG. 7.

The case where at least three suction port elements 333 are provided will be described with reference to FIGS. 10 and 11. That is, the three suction port elements 333 are usually arranged in equidistantly spaced relation to each other along the rotational direction C of the cutter body 313. As shown in FIG. 11, however, in the case where the feeding direction D of the cutter body 313 is particularly limited to one, only the tips 322 located in front of the feeding direction D cut the workpiece, while the tips 322 located to the rear of the feeding direction D do not participate in the cutting. Thus, if the suction port elements 333 are arranged in front of the feeding direction D in a concentrated manner, a stronger suction force acts upon a range within which the chips are generated, so that the chip processing ability can further be improved.

Figure 12:
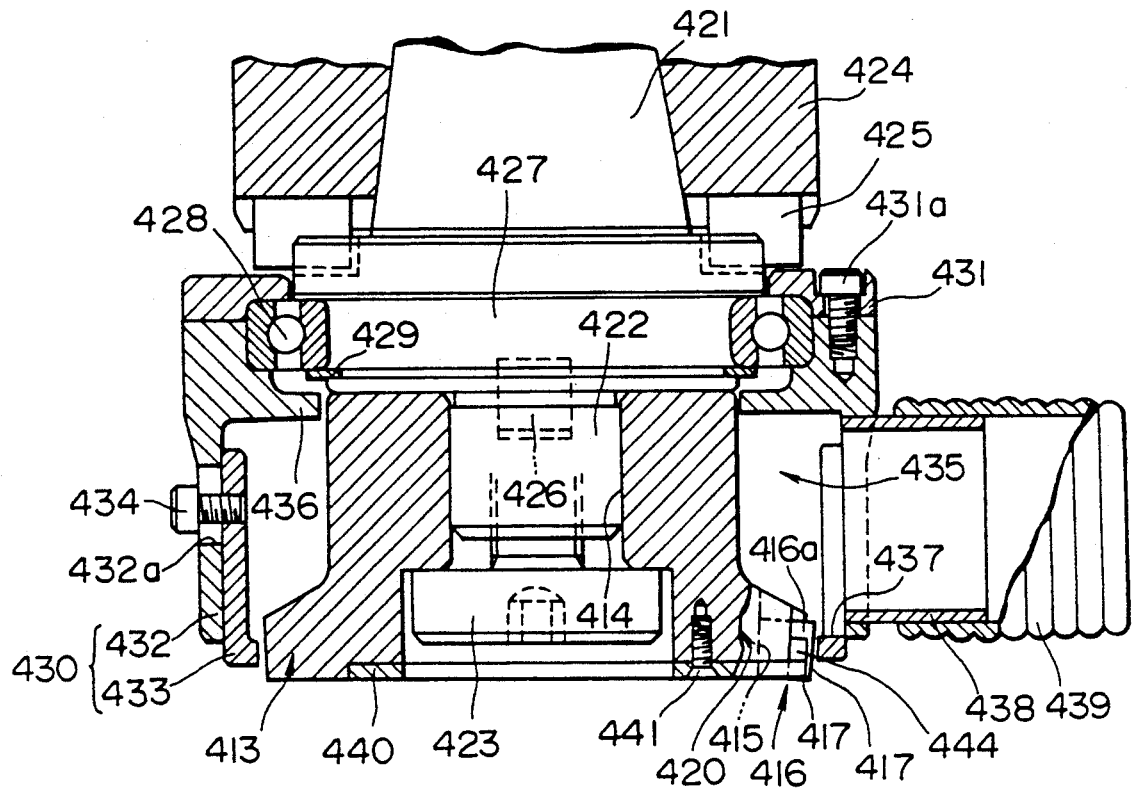
FIG. 12 is a longitudinal cross-sectional view of a rotary cutting tool according to a fourth embodiment of the invention.
Figure 13:
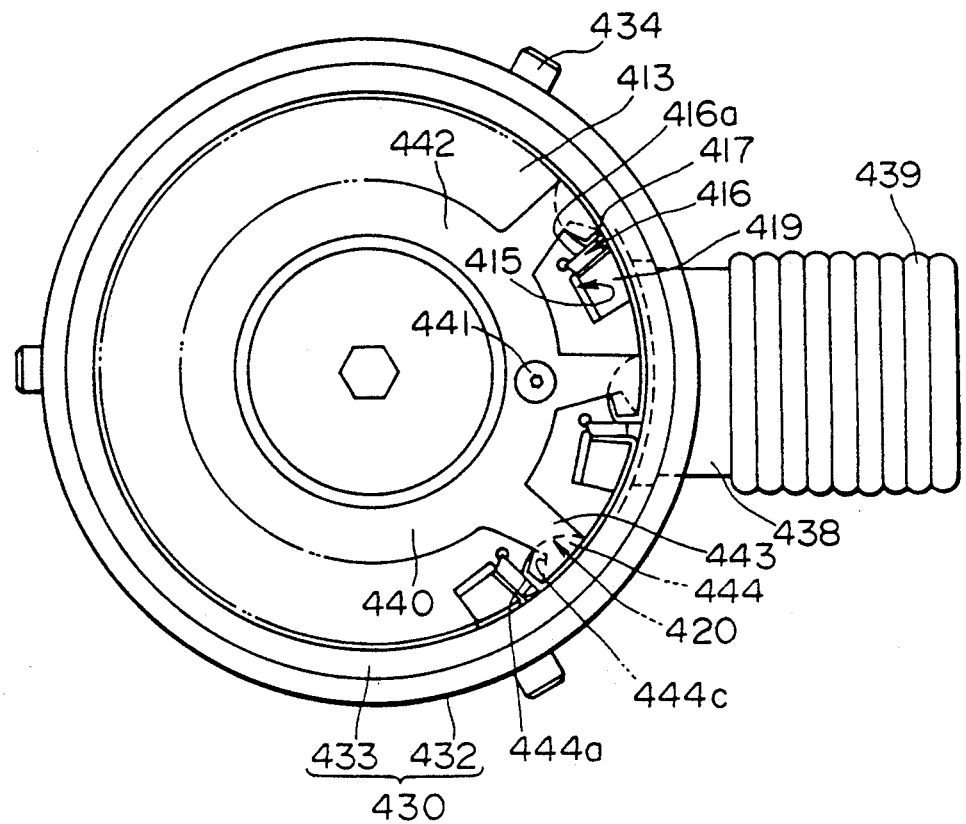
FIG. 13 is a bottom view of the rotary cutting tool illustrated in FIG. 12.
Figure 14:
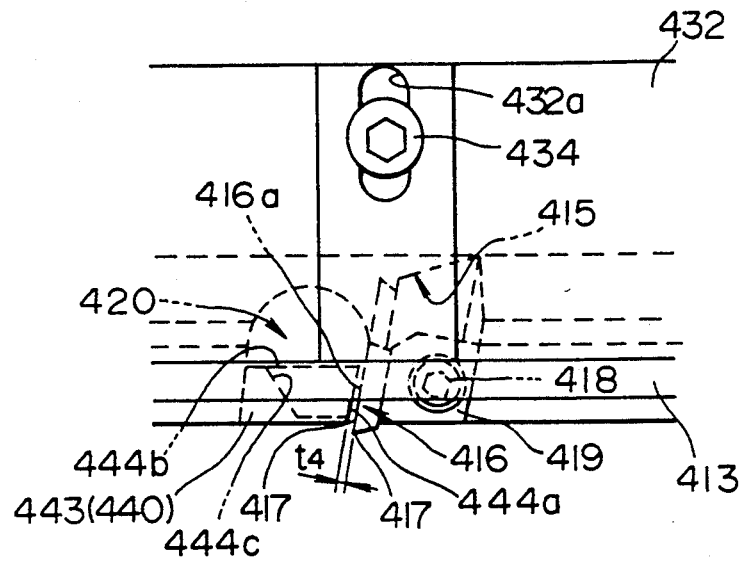
FIG. 14 is a fragmentary enlarged view showing an outer periphery of a forward end of a cutting body illustrated in FIGS. 12 and 13.
Figure 15:
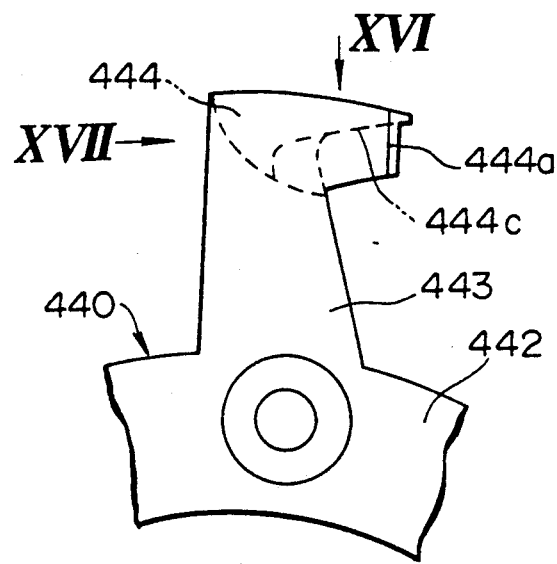
FIG. 15 is a fragmentary enlarged view showing a chip guide element illustrated in FIGS. 12 through 14.
Figure 16:
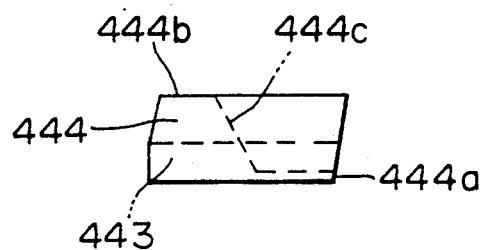
FIG. 16 is a fragmentary view as viewed from the arrow XVI in FIG. 15.
Figure 17:
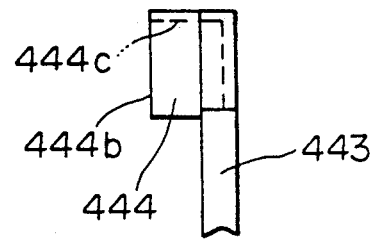
FIG. 17 is a fragmentary view as viewed from the arrow XVII in FIG. 15.

Referring next to FIGS. 12 through 14, there is shown a rotary cutting tool according to a fourth embodiment of the invention.

The rotary cutting tool according to the fourth embodiment comprises a cutter body 413 which is generally in the form of a cylinder having a central bore 414. The cutter body 413 has its forward end whose outer periphery is formed with a plurality of recesses or grooves 415 in equidistantly spaced relation to each other in a peripheral direction of the cutting tool. A plurality of tips 416 each in the form of a planar plate are detachably mounted respectively to the grooves 415 under such a condition that a cutting edge 417 of each of the tips 416 projects from the forward end face and the outer peripheral surface of the cutter body 413. Further, a plurality of tip pockets 420, each of which generally has an arcuate wall surface, are formed in the cutter body 413 at their respective locations directed toward faces 416a of the respective tips 416 which are arranged at the outer peripheral section of the forward end of the cutter body 413.

Moreover, the cutter body 413 is fastened axially by a fastening bolt 423 under such a condition that the central bore 414 in the cutter body 413 is fitted about a fitting shaft 422 of an arbor 421. Thus, the cutter body 413 is detachably connected to a main spindle 424 of a machine tool through the arbor 421. In this connection, keys 425 and 426 are interposed respectively between the arbor 421 and the main spindle 424 and between the arbor 421 and the cutter body 413, for transmitting rotation of the main spindle 424 to the cutter body 413.

As shown in FIGS. 12 and 13, a radial bearing (hereinafter referred simply to as "bearing") 428 is fitted about a support shaft 427 of the arbor 421, which is formed adjacent the proximal end of the fitting shaft 422. The bearing 428 is retained by a ring-shaped retainer 429. A cover assembly 430 is fitted about an outer ring of the bearing 428. The cover assembly 430 is connected, through a plurality of bolts 431a, to a bearing cap 431 which is fitted about the outer ring of the bearing 428 at a location opposite to the retainer 429. Thus, the cover assembly 430 is supported rotatably with respect to the cutter body 413.

The cover assembly 430 comprises a generally cylindrical support cover 432 supported by the arbor 421 through the bearing 428, and a movable cover 433 which, similarly to the support cover 432, is generally in the form of a cylinder and which is fitted in an inner peripheral surface of the support cover 432 adjacent the forward end thereof.

The forward end of the support cover 432 extends to a location adjacent the forward end of the cutter body 413, and substantially covers the outer peripheral surface of the cutter body 413. Further, the support cover 432 is formed with a plurality of elongated bores 432a at respective locations where the peripheral surface of the support cover 432 is equally divided into three. The elongated bores 432a extend axially of the cutter body 413. As shown in FIGS. 12 through 14, the movable cover 433 is connected to the support cover 432 through a plurality of bolts 434 which are inserted respectively through the elongated bores 432a. Thus, the movable cover 433 is movable axially of the cutter body 413. A distance from the forward end of the movable cover 433 to the cutting edge 417 of each of the tips 416, which faces toward the forward end of the cutter body 413, is so set as to be larger than the maximum depth of cut of the cutting edge 417 facing radially outwardly of the outer periphery of the cutter body 413, under such a condition that the tip 416 approaches, to the maximum, the proximal end of the cutter body 413.

Furthermore, the forward end of the movable cover 433 slightly projects from the forward end of the support cover 432 toward the forward end of the cutter body 413. A slight gap is left in a radial direction between the inner peripheral surface of the movable cover 433 and the cutting edge 417 of the tip 416, which is directed radially outwardly of the cutter body 413. A gap size is suitably set in accordance with material of the workpiece, cutting conditions and so on. It is preferable, however, that the gap size is within a range of from 0.5 mm to 2 mm. In order to do more reliable chip processing, it is desirable that the gap size is so set as to be within a range of from 0.5 mm to 1 mm. If the gap quantity is less than 0.5 mm, there is a fear that the radially outward cutting edges 417 will bite into the movable cover 433 due to eccentricity of the cover assembly 430 or the like. On the other hand, if the gap size exceeds 2 mm, there is a fear that chip suction force (subsequently to be described) becomes insufficient due to the amount of chips generated, the cutting conditions, and so on.

A chip accommodating chamber 435 is defined between the inner peripheral surfaces of the respective covers 431 and 432 and the outer peripheral surface of the cutter body 413. The chip accommodating chamber 435 is partitioned from the side of the cover assembly 430 facing toward the bearing 428, by a diameter-reduced section 436 formed on the support cover 431 adjacent the proximal end thereof.

The outer peripheral surface of the cover assembly 430 is formed with a through bore 437 which extends through the support cover 432 and the movable cover 433. A tubular suction port element 438 is fitted in the through bore 437. The suction port element 438 has its outer peripheral surface about which a suction hose 439 of a suction machine (not shown) is fitted. Thus, the chip accommodating chamber 435 communicates with the suction machine, and the cover assembly 430 is restricted by the suction hose 439 and is prevented from being rotated thereby.

Moreover, a chip guide element 440 is embedded in the forward end face of the cutter body 413 such that a forward end face of the chip guide element 440 is substantially flush with the forward end face of the cutter body 413. The chip guide element 440 is fixedly mounted to the cutter body 413 by a plurality of flat head screws 441 (only one shown). The chip guide element 440 comprises a thin ring-shaped mounting section 442, and a plurality of guide sections 443 formed at a peripheral edge of the mounting section 442 in equidistantly spaced relation to each other. The guide sections 443 extend radially outwardly of the cutter body 413. The guide sections 443 have their outer diameter which is so determined as to be the same as the outer diameter of the cutter body 413.

As shown in FIGS. 14 through 17, each of the guide sections 443 has its forward end which is formed with a projection 444 which is fitted in a corresponding one of the tip pockets 420. A gap $t_4$ is defined between the face 416a of the tip 416 and an end face 444a of the projection 444 facing toward the face 416a, for guiding chips generated along the face 416a, into the tip pocket 420. The projection 444 is formed with a groove 444c which opens toward the end face 444a and an upper face 444b of the projection 444. Thus, consideration is made to prevent the chips passing through the gap $t_4$ from being clogged to discharge the chips to the tip pocket 420 without hindrance. Moreover, a distance from the upper surface 444b of the projection 444 to the cutting edge 417 of the tip 416 facing toward the forward end of the cutter body 413 is so determined as to be slightly larger than the maximum depth of cut of the cutting edge 417 which faces radially outwardly of the cutter body 413. Thus, even if the axial position of the movable cover 433 changes, the radial gap between the outer peripheral surface of the guide section 443 and the cover assembly 430 is always maintained at a constant quantity.

In the face milling cutter constructed as described above, the position of the movable cover 433 is adjusted such that the cutting edge 417 facing radially outwardly of the cutter body 413 is exposed from the forward end of the movable cover 433 by a quantity slightly longer than the predetermined depth of cut. Then, the cutter body 413 is mounted to the main spindle 424 through the arbor 421. Subsequently, the cutter body 413 is rotated about its rotational axis while air within the chip accommodating chamber 435 is drawn by the suction machine connected to the suction port element 438. The cutter body 413 is also fed in a direction perpendicular to the rotational axis. Accompanied with the rotation and feeding, the cutting edges 417 projecting from the forward end face and the outer peripheral surface of the cutter body 413 cut the workpiece.

At this time, negative pressure is generated within the chip accommodating chamber 435 because the air is drawn by the suction machine. Accompanied with the negative pressure, air surrounding the cutter body 413 is successively drawn through the gap between the inner peripheral surface of the forward end of the movable cover 433 and the outer peripheral surface of the cutter body 413. In this case, the movable cover 433 is axially positioned such that the forward end of the movable cover 433 is positioned at a location slightly closer to the proximal end of the cutter body 413 than the depth of cut of the cutting edge 417 which faces radially outwardly of the cutter body 413. Accordingly, the chips generated along the face 416a of the tip 416 from the cutting edge 417 thereof are strongly drawn toward the chip accommodating chamber 435 while being guided to the gap $t_4$ between the end face 444a of the chip guide element 440 and the face 416a of the tip 416. The chips are rounded off and divided into pieces by the tip pocket 420, and are guided to the chip accommodating chamber 435. The chips are further drawn and collected to the suction machine from the chip accommodating chamber 435 through the suction hose 439.

In connection with the above, if it is necessary to alter the depth of cut of the cutting edges 417 at cutting, the projecting amount or quantity of the movable cover 433 should change in accordance with the alteration of the depth of cut, to adjust the exposure quantity of the cutting edges 417.

In the manner described above, according to the face milling cutter of the fourth embodiment, there are provided the following functional advantages. That is, since the chips generated at cutting are successively drawn and collected without scattering to the circumference of the machine, the working or operating environment can be considerably improved, and the period of time required for the chip processing can be considerably reduced. Moreover, since the chips are not accumulated on the workpiece, the table of the machine tool and the like, no deterioration in processing accuracy due to thermal deformation of the workpiece and the machine nor deterioration in quality of the cut surface accompanied with biting of the chips occurs. Furthermore, the chips do not enter the sliding surface of the machine tool and the like so that it can be prevented to reduce the accuracy and the service life of the machine tool.

In addition, in the fourth embodiment, the movable cover 433 is provided for movement axially of the cutter body 413. Accordingly, even if the depth of cut of the cutting edges 417 changes, the position of the movable cover 433 is adjusted in accordance with the change in the depth of cut of the cutting edges 417, thereby enabling the maximum suction force to be always applied to the circumference of the cutting edges 417. As a result, there is obtained such a functional advantage that chip processing can be done more reliably.

Further, in the fourth embodiment, the movable cover 433 is slidably inserted in the inner peripheral surface of the support cover 432, and the movable cover 433 and the support cover 432 are connected to each other by the bolts 434 which extend respectively through the elongated bores 432a, thereby enabling the forward end of the cover assembly 430 to be adjusted in position. However, the fourth embodiment should not be limited to this specific example. A pair of modifications of the fourth embodiment will be described with reference to FIGS. 18 and 19. In this connection, in FIGS. 18 and 19, components and parts like or similar to those illustrated in FIGS. 12 through 17 are designated by the same reference numerals, and the description of the like or similar components and parts will be omitted to avoid repetition.

Figure 18:
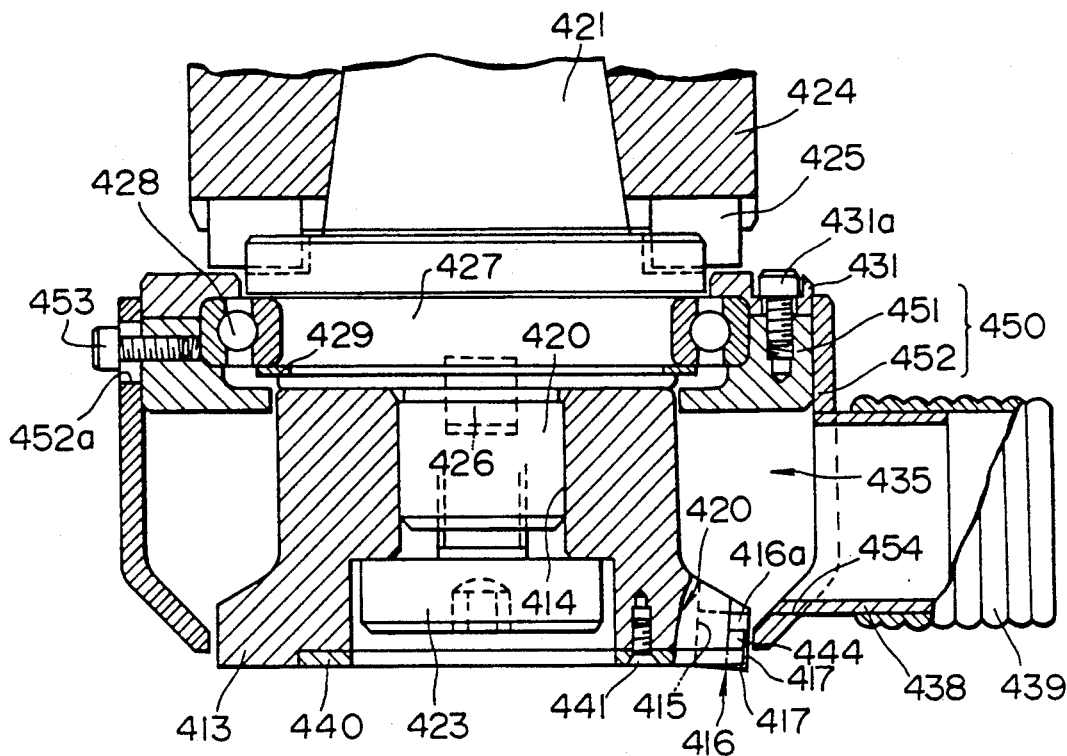
FIG. 18 is a longitudinal cross-sectional view of a modification of the rotary cutting tool illustrated in FIGS. 12 and 13.

In the modification illustrated in FIG. 18, a cover assembly 450 comprises a support ring 451 rotatably mounted to the outer peripheral surface of the arbor 421 through the bearing 428, and a movable cover 452 fitted about the outer periphery of the support ring 451 to cover the cutter body 413. The movable cover 452 opens toward the forward end of the cutter body 413. The movable cover 452 is connected to the support ring 451 through a plurality o±bolts 453 which extend respectively through the elongated bores 452a formed in the peripheral surface of the movable cover 452. Thus, the movable cover 452 has its forward end which is adjustable in position axially of the cover body 413. Further, the movable cover 452 has its peripheral wall which is formed with a through bore 454 in which the suction port element 438 is fitted.

In the modification illustrated in FIG. 18, the position of the forward end of the movable cover 452 is adjusted in accordance with the depth of cut of the cutting edges 417, whereby there can be obtained functional advantages which are similar to those obtained by the fourth embodiment. In addition, since the movable cover 452 is exposed to the outside of the support ring 451, there is also obtained such a functional advantage that the axial position of the movable cover 452 can be adjusted extremely easily.

Figure 19:
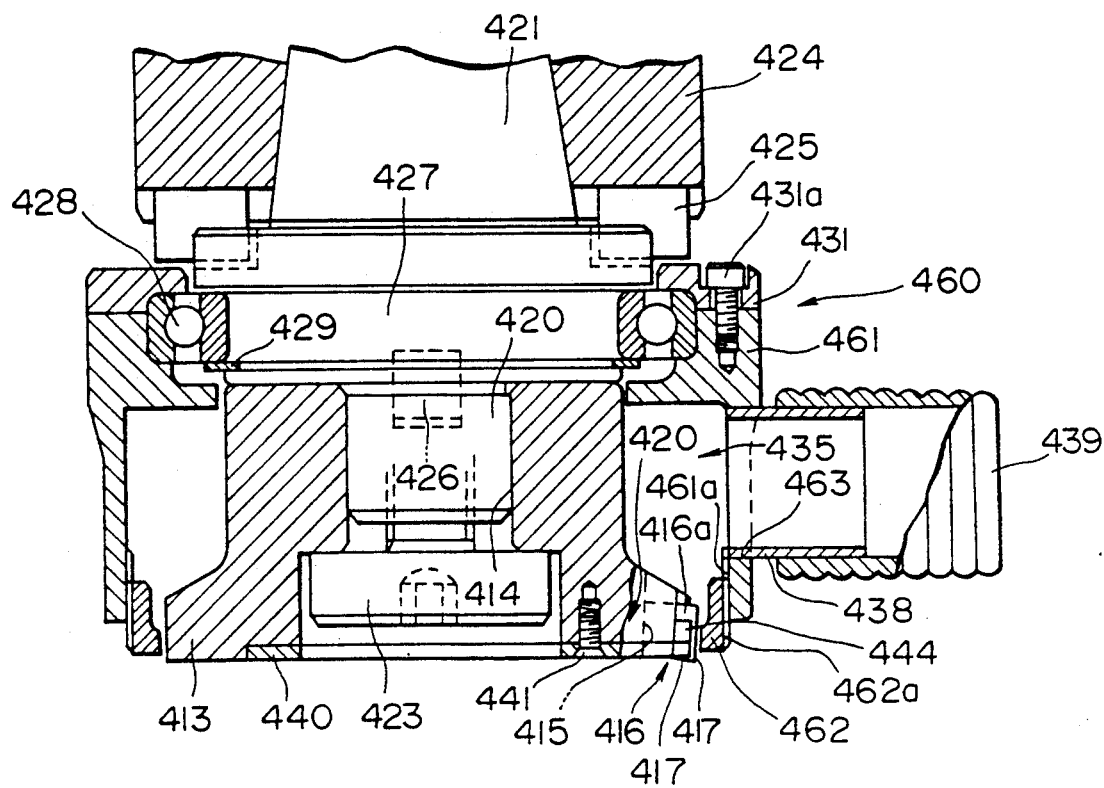
FIG. 19 is a view similar to FIG. 18, but showing another modification of the rotary cutting tool illustrated in FIGS. 12 and 13.

In the modification illustrated in FIG. 19, a cover assembly 460 comprises a support cover 461 covering the peripheral surface of the cutter body 413 and opening toward the forward end of the cutter body 413, and a movable ring 462 arranged on the inner peripheral surface of the forward end of the support cover 461. The movable ring 462 is in the form of a short cylinder. Here, similarly to the fourth embodiment, the support cover 461 is rotatably supported by the arbor 421 through the bearing 428. The suction port element 438 is fitted in a through bore 463 which is formed in the peripheral wall of the support cover 461. Moreover, the movable ring 462 has its outer peripheral surface which is formed with a male threaded section 462a. The male threaded section 462a is threadedly engaged with a female threaded section 461a formed in the inner peripheral surface of the forward end of the support cover 461, whereby the movable ring 462 is united together with the support cover 461.

In this modification illustrated in FIG. 19, a screwed quantity of the movable ring 462 to the support cover 461 is adjusted whereby the axial position of the forward end of the movable ring 462 changes or is altered. Accordingly, there can be obtained functional advantages similar to those obtained by the fourth embodiment. In addition, the operation of the modification illustrated in FIG. 19 is only rotation of the movable ring 462 per se. Thus, there can be provided such a functional advantage that adjustment can be done easily and quickly as compared with the above fourth embodiment in which it is required to operate the plurality of bolts.

Referring next to FIGS. 20 through 25, there is shown a rotatable cutting tool according to a fifth embodiment of the invention.

The rotatable cutting tool according to the fifth embodiment comprises a cutter body 520 which is generally in the form of a cylinder having a central bore 521. A plurality of recesses or grooves 522 are formed in an outer periphery of a forward end of the cutter body 520 in equidistantly spaced relation to each other. The groove 522 open toward the forward end and the outer periphery of the cutter body 520. A plurality of tips 523 each in the form of a planar plate are detachably mounted respectively to the grooves 522 by respective clamp elements 526 fastened respectively by clamp screws 525, under such a condition that cutting edges 524 of the respective tips 523 project from the forward end face and the outer peripheral surface of the cutter body 520.

Figure 23:
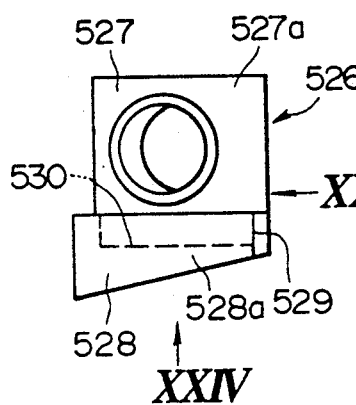
FIG. 23 is a side elevational view of a clamp element illustrated in FIGS. 20 through 22.
Figure 24:
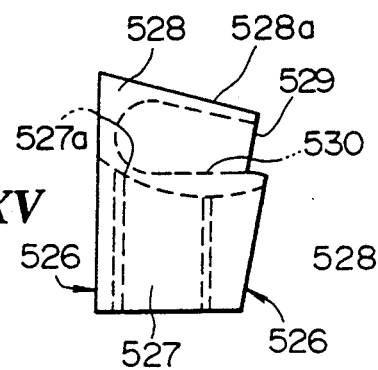
FIG. 24 is a view as viewed from the arrow XXIV in FIG. 23.
Figure 25:
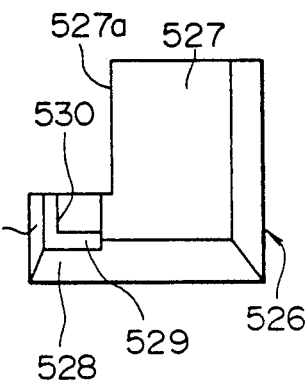
FIG. 25 is a view as viewed from the arrow XXV in FIG. 23.

As shown in detail in FIGS. 23 through 25, each of the clamp elements 526 comprises a wedge section 527 inserted into a location between the wall surface of a corresponding one of the grooves 522 and a face 523a of the tip 523 to press down the tip 523 in a peripheral direction of the rotatable cutting tool, and a chip guide section 528 which projects from the forward end of the wedge section 527 toward the outer periphery of the cutting tool radially thereof.

The wedge section 527 has a wall surface 527a which is formed into a curved surface. The curved wall surface 527a is arcuately concave toward the inner peripheral side of the cutting tool from the outer peripheral surface of the forward end of the cutter body 520. A space occurring between the wall surface 527a and the outer peripheral surface of the forward end of the cutter body 520 serves as a tip pocket which rounds off chips generated by the cutting edge 524. Further, the wedge section 527 has its forward end face which is formed substantially flush with the forward end face of the cutter body 520.

On the other hand, the chip guide section 528 is formed as follows. Specifically, an end face 528a of the chip guide section 528 on the side of its outer periphery extends to a location moved slightly rearwardly toward the inner periphery of the cutting tool from the cutting edge 524 of the tip 523, which faces radially outwardly of the cutting tool, to substantially close the groove 522 at the forward end of the cutting tool.

A recession quantity $\delta_1$ of the radially outward end face 528a of the chip guide section 528 with respect to the cutting edge 524 is suitably determined in accordance with material of the workpiece, cutting conditions and so on. It is preferable, however, that the recession quantity is set to a range of from 0.2 mm to 1.0 mm. If the recession quantity $\delta_1$ is less than 0.2 mm, the chip guide section 528 will bite into the workpiece due to an error in mounting of the tip 523 or the like. On the other hand, if the recession quantity $\delta_1$ exceeds 1.0 mm, the gap becomes excessive between the end face 528a and an inner peripheral surface of a forward end of a cover assembly subsequently to be described. In this case, a chip suction force subsequently to be described becomes insufficient so that there is a fear that the insufficient chip suction force interferes with chip processing.

Furthermore, as shown in FIGS. 22 through 25, a cut-out 529 is formed in the end face of the chip guide section 528, which is directed toward the face 523a of the tip 523. The cut-out 529 permits passage of the chips which are generated along the face 523a. A gap size $t_5$ between the cut-out 529 and the face 523a is suitably determined in accordance with the material of the workpiece, the cutting conditions and so on. It is preferable, however, that the gap size $t_5$ is set to a range of from 0.2 mm to 1 mm. If the gap size $t_5$ is less than 0.2 mm, the chips are clogged in the gap $t_5$ so that there occurs such a fear that the chip processing is stagnated. On the other hand, if the gap size $t_5$ exceeds 1 mm, a chip suction force becomes insufficient so that there is such a fear that the insufficient gap size $t_5$ interferes with chip processing.

Further, a plurality of grooves 530 are formed respectively in the chip guide sections 528, and open respectively toward the grooves 522. Each of the grooves 530 opens toward the cut-out 529 and enlarges the gap $t_5$ between the cut-out 529 and the face 523a at the side facing toward the groove 522 to prevent the chips passing through the cut-out 529 from being clogged.

Figure 20:
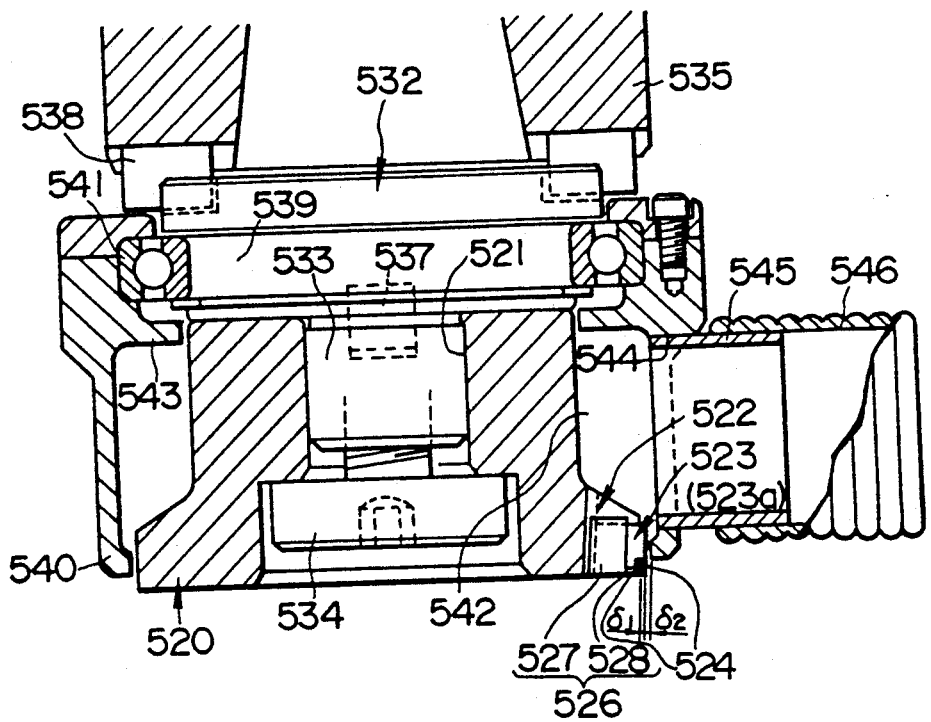
FIG. 20 is a longitudinal cross-sectional view of a rotary cutting tool according to a fifth embodiment of the invention.
Figure 21:
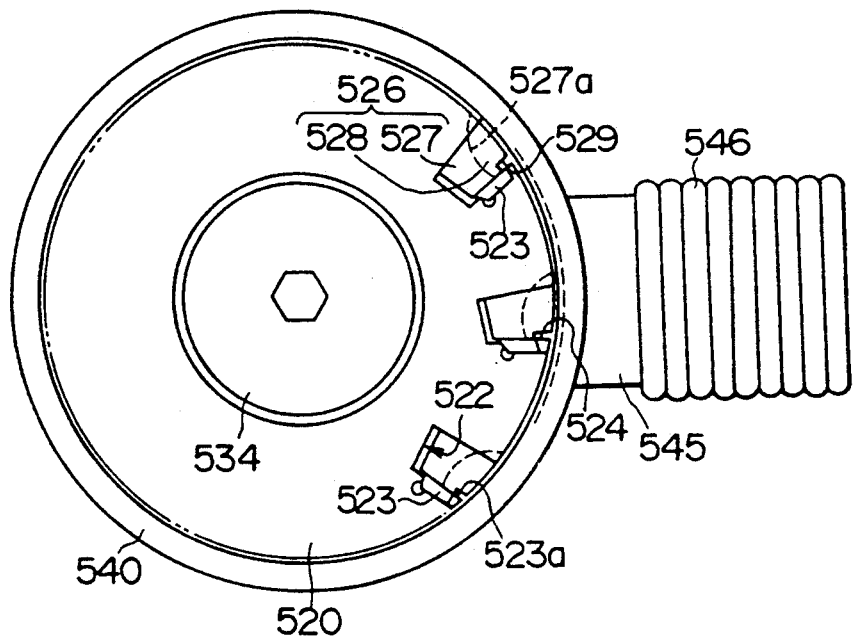
FIG. 21 is a bottom view of the rotary cutting tool illustrated in FIG. 20.
Figure 22:
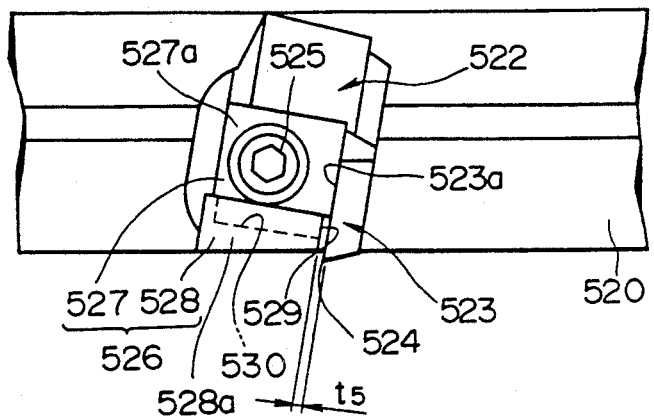
FIG. 22 is a fragmentary enlarged view showing an outer periphery of a forward end of a cutter body illustrated in FIGS. 20 and 21.

On the other hand, as shown in FIGS. 20 and 21, the cutter body 520 is axially tightened by a fastening bolt 534 and is united together with an arbor 532 under such a condition that the central bore 521 in the cutter body 520 is fitted about a fitting shaft 533 of the arbor 532. The arbor 532 is provided for connecting the cutter body 520 to a main spindle 535 of a machine body. Rotation of the main spindle 535 can be transmitted to the cutter body 520 by a key 537 interposed between the cutter body 520 and the arbor 532 and by a plurality of keys 538 interposed between the main spindle 535 and the arbor 532.

Further, a cover assembly 540 is rotatably mounted to a support shaft 539 formed at the fitting shaft 533 of the arbor 532, through a radial bearing (hereinafter referred simply to as "bearing") 541.

The cover assembly 540 is formed generally into a cylinder which opens toward the forward end of the cutting tool. The cover assembly 540 has its forward end which extends to a location overlapping with the chip guide section 528 of each of the clamp elements 526 in an axial direction of the cutting tool. The forward end of the cover assembly 540 has its inner diameter which is so determined as to be slightly larger than a rotational locus of the cutting edges 524.

A gap size $\delta_2$ between the inner peripheral surface of the forward end of the cover assembly 540 and the cutting edges 524 of the tips 523 in the radial direction of the cutting tool is suitably determined in accordance with material of the workpiece, cutting conditions, and so on. It is desirable, however, that the gap size $\delta_2$ is set to a range of from 0.5 mm to 2 mm. In order to perform more reliable chip processing, it is desirable that the gap size $\delta_2$ is set to a range of from 0.5 mm to 1 mm. If the gap size $\delta_2$ is less than 0.5 mm, there is a fear that the cutting edge 524 bites into the cover assembly 540 due to eccentricity of the cover assembly 540 or the like. On the other hand, if the gap size $\delta_2$ exceeds 2 mm, there occurs a fear that a chip suction force subsequently to be described becomes insufficient due to an amount or quantity of the chips generated, the cutting conditions, and so on.

A chip accommodating chamber 542 is defined between the inner peripheral surface of the cover assembly 540 and the outer peripheral surface of the cutter body 520. The chip accommodating chamber 542 is partitioned from the side of the cover assembly 540 facing toward the bearing 541 by a diameter-reduced section 543 formed on the cover assembly 540 on the side of the proximal end thereof.

A through bore 544 is formed in the peripheral wall of the cover assembly 540. A suction port element 545 is fitted in the through bore 544. A suction hose 546 of a suction machine (not shown) is fitted about an outer periphery of the suction port element 545. Thus, the chip accommodating chamber 542 communicates with the suction machine. The cover assembly 540 is restricted by the suction hose 546 so as to be prevented from being rotated from the axis of the cover assembly 540.

In the cutter constructed above, since the air is drawn by the suction machine, a negative pressure occurs in the interior of the chip accommodating chamber 542. By the negative pressure, air surrounding the cutter body 520 is successively drawn through the gaps between the faces 523a of the tips 523 and the cut-outs 529 formed in the chip guide sections 528 of the clamp elements 526 and through the gaps between the chip guide sections 528 and the inner peripheral surface of the forward end of the cover assembly 540. As a result, the suction force toward the chip accommodating chamber 542 acts upon the vicinity of the cutting edges 524 in a concentrated manner.

Accordingly, the chips generated along the face 523a of each of the tips 523 from the cutting edges 524 thereof are strongly drawn toward the chip accommodating chamber 542 while being guided through the gap between the cut-out 529 of the chip guide section 528 and the face 523a of the tip 523. Moreover, the chips are rounded off and divided into pieces by the wall surface 527a of the clamp element 526, and are guided into the chip accommodating chamber 542. The chips are further drawn from the chip accommodating chamber 542 through the suction hose 546 and are collected to the suction machine.

In addition, since the chip guide sections 528 are provided respectively at the clamp elements 526, it is not required to remodel the forward end of the cutter body 520 in order to cover the grooves 522. Further, since the cover assembly 540 and the suction port element 545 are mounted to the arbor 532, it is not also required to remodel the cutter body 520 in order to cover the peripheral surface of the cutter body 520. Thus, there can be obtained a superior functional advantage that the cutter body used conventionally is easily diverted to perform chip processing.

Figure 26:
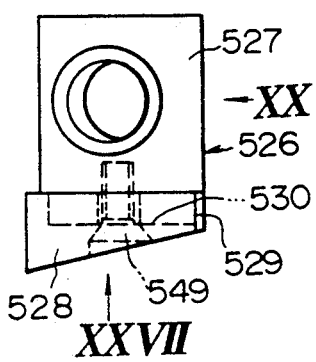
FIG. 26 is a side elevational view similar to FIG. 23, but showing a modification of the clamp element illustrated in FIGS. 20 through 25.
Figure 27:
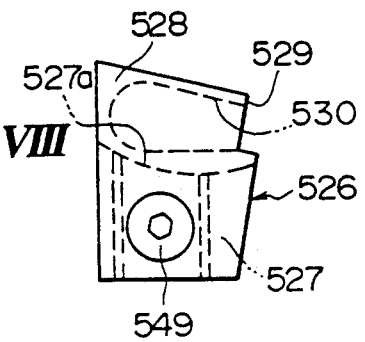
FIG. 27 is a view as viewed from the arrow XXVII in FIG. 26.
Figure 28:
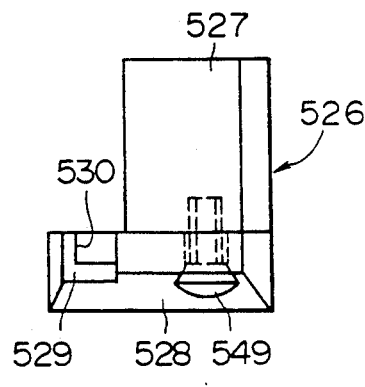
FIG. 28 is a view as viewed from the arrow XXVIII in FIG. 26.

In connection with the above, in the fifth embodiment, the chip guide sections 528 are particularly formed in an integral manner respectively with the clamp elements 526. The invention should not be limited to this specific example. For instance, as shown in FIGS. 26 through 28, the arrangement may be such that the wedge section 527 is formed separately from the chip guide section 528, and the wedge section 527 and the chip guide section 528 are connected to each other through a bolt 549. In this case, there can be obtained a superior functional advantage that the gap quantity $t_5$ between the cut-out 529 and the face 523a of the tip 523 can easily be adjusted in accordance with the configuration of the chips generated, and the wedge section 527 and the chip guide section 528 can easily be replaced with new ones at breakage thereof.

Furthermore, in the fifth embodiment, the clamp element 526 is particularly pressed or urged against the tip 523 by the wedge effect. However, the invention should not be limited to this specific example. Various modifications can be made to the invention. That is, the arrangement may be such that the tip 523 is directly fastened in its thickness direction.

Referring next to FIGS. 29 through 33, there is shown a rotatable cutting tool according to a sixth embodiment of the invention.

Figure 29:
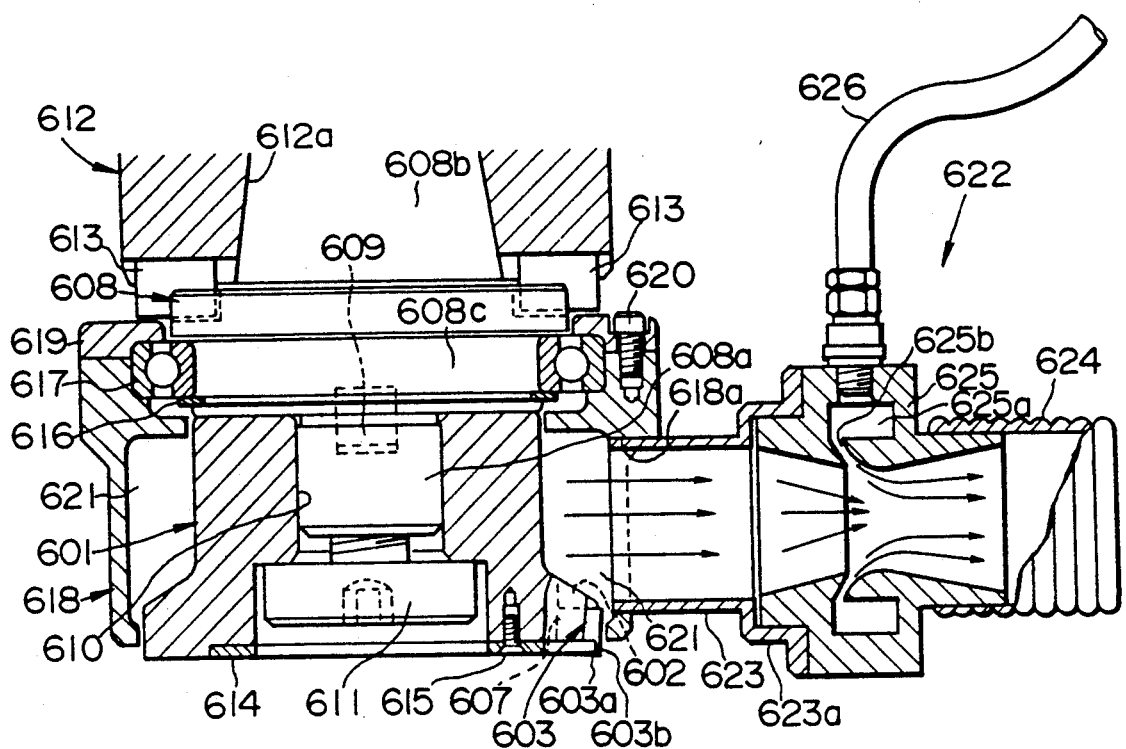
FIG. 29 is a longitudinal cross-sectional view of a rotary cutting tool according to a sixth embodiment of the invention.
Figure 30:
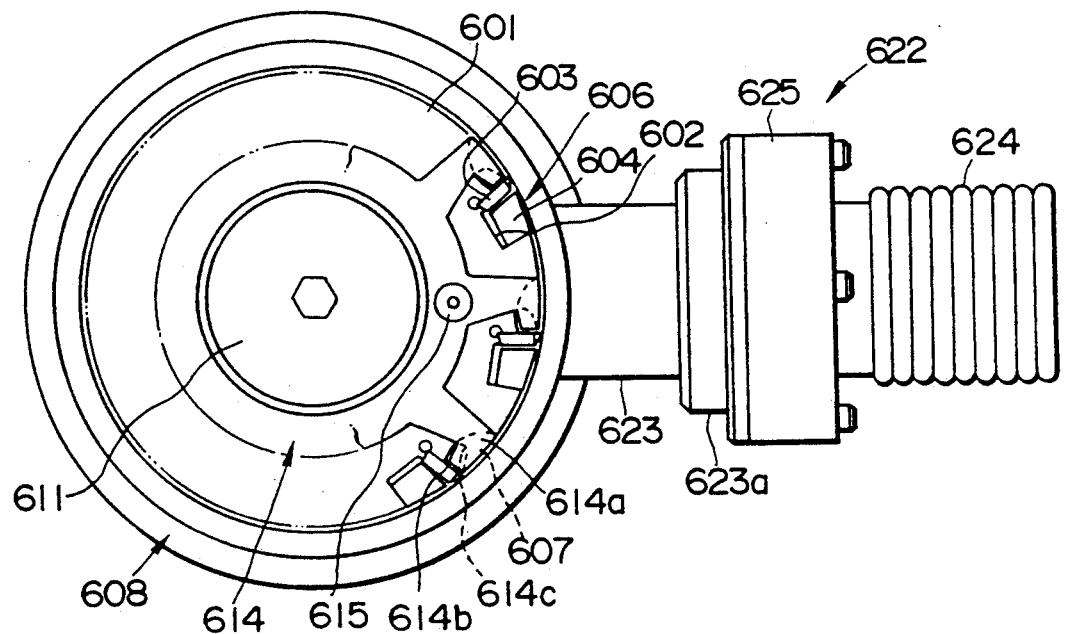
FIG. 30 is a bottom view of the rotary cutting tool illustrated in FIG. 29.
Figure 31:
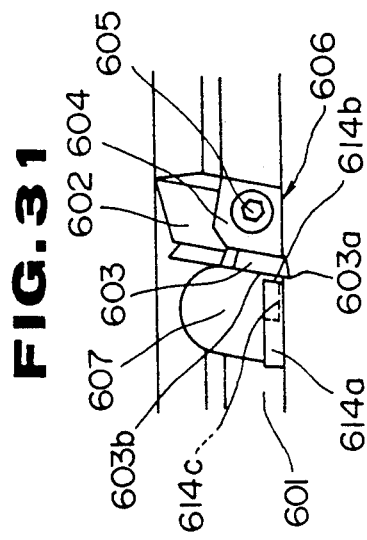
FIG. 31 is a fragmentary enlarged view showing a forward section of the cutting tool illustrated in FIGS. 29 and 30.

As shown in FIGS. 29 through 31, the rotatable cutting tool according to the sixth embodiment comprises a cutter body 601. The cuter body 601 is cylindrical in shape and has its forward end which extends forwardly more than the conventional face milling cutter described previously with reference to FIGS. 76 through 78. A plurality of tip mounting grooves 602 and a plurality of tip pockets 607 are formed in the outer periphery of the forward end of the cutter body 601 in equidistantly spaced relation to each other in a peripheral direction of the cutting tool, similarly to the conventional face milling cutter shown in FIGS. 76 through 78. A plurality of tips 603, each of which is provided with a face cutting edge 603a and outer peripheral cutting edges 603b, are fixedly mounted detachably in position respectively in the tip mounting grooves 602 by respective clamp mechanisms 606, similarly to the conventional face milling cutter. Each of the clamp mechanisms 606 comprises a wedge element 604 and a clamp screw 605.

In the face milling cutter tool according to the sixth embodiment of the invention, a chip guide element 614 is embedded in the forward end face of the cutter body 601 such that a surface of the chip guide element 614 is moved slightly rearwardly in the axial direction of the cutting tool with respect to the face cutting edge 603a. The chip guide element 614 is provided for guiding and discharging chips generated by the cutting edges 603a and 603b to a chip accommodating space or a chip discharge space 621 subsequently to be described. The chip guide element 614 is fixedly mounted to the: cutter body 601 by a plurality of flat head screws 615 (only one shown).

Figure 32:
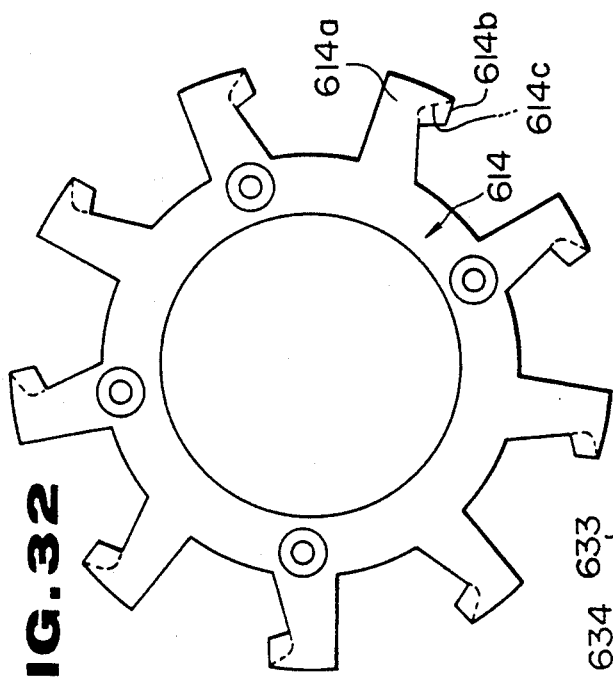
FIG. 32 is a top plan view of a chip guide element illustrated in FIGS. 29 through 31.

As shown in FIG. 32, the chip guide element 614 is in the form of a plate which is formed, at its outer periphery, with a plurality of hook-shaped sections 614a in equidistantly spaced relation to each other in the peripheral direction of the cutting tool. The hook-shaped sections 614a are the same in number as the tips 603. The chip guide element 614 has its outer diameter which is so determined as to be slightly smaller than a rotational locus of the outer peripheral cutting edges 603b. When the chip guide element 614 is fixedly mounted to the forward end face of the cutter body 601, as shown in FIGS. 29 and 30, the hook-shaped sections 614a have their outer peripheral surface which is located at a position slightly moved rearwardly toward the radial inner side of the cutter body 601 from the outer peripheral cutting edges 603b of the respective tips 603. Further, each of the hook-shaped sections 614a is determined in configuration as follows. That is, when the chip guide element 614 is fixedly mounted to the cutter body 601, as shown in FIGS. 30 and 31, each of the hook-shaped sections 614a covers a corresponding one of the tip pockets 607 to close the chip discharge space 621 subsequently to be described. A slight gap occurs between a forward end face 614b of each of the hook-shaped sections 614a in the bending direction and the face of the corresponding tip 603, so that chips torn off from the surface of the workpiece by the cutting edges 603a and 603b are guided to the tip pocket 607. As shown in FIGS. 31 and 32, a groove 614c is formed in the forward end portion of the hook-shaped section 614a, and opens in the bending direction of the hook-shaped section 614a and toward the mounting face of the chip guide element 614. The gap portion between the face of the tip 603 and the forward end face 614b of the hook-shaped section 614a in the bending direction is enlarged inwardly to prevent the chips passing through the gap portion from being clogged.

On the other hand, as shown in FIG. 29 , similarly to the conventional face milling cutter tool illustrated in FIGS. 76 through 78, a mounting bore 610 of the cutter body 601 is fitted about shaft section 608a of an arbor 608, and a fastening bolt 611 is screwed into the end face of the shaft section 608a of the arbor 608 from the end face of the cutter body 601 on the larger diameter side thereof, whereby the cutter body 601 is fixedly mounted in unison to the arbor 608 through a detent key 609 in a coaxial or eccentric manner. A taper shank 608b is provided on the arbor 608 at a location opposite to the shaft section 608a, and is fitted in the tapered bore 612a in a main spindle 612. Although not shown, a female threaded section is formed at the forward end of the taper shank 608b for firmly connecting the face milling cutter tool and the main spindle 612 to each other by a drawing bolt (not shown)

Furthermore, a larger-diameter shaft section 608c is formed at the rearward end of the shaft section 608a of the arbor 608. A bearing 617 is fixedly mounted to the larger-diameter shaft section 608c by a retainer ring 616. A chip accommodating element or a cover assembly 618 is fitted about an outer ring of the bearing 617. The cover assembly 618 is connected in unison to a cover 619 fitted about the outer ring of the bearing 617 from the side opposite to the retainer ring 61 6, through a plurality of bolts 620 (only one shown) so that the cover assembly 618 is rotatable coaxially with respect to the cutter body 601.

As shown in FIGS. 29 and 30, the cover assembly 618 is in the form a thin hollow cylinder for covering the cutter body 601 and the outer peripheral cutting edges 603b of the tips 603. The cover assembly 618 has its inner diameter which is so determined as to form the chip discharge space 621 between the inner peripheral surface of the cutter body 601 and the outer peripheral surface of the smaller-diameter section of the cutter body 601. The chip discharge space 621 has its dimension sufficient to accommodate the chips divided into pieces by the tip pockets 607. The inner peripheral surface of the cover assembly 618 adjacent the bearing 617 is narrowed to such a degree as to be slightly larger than the smaller-diameter section of the cutter body 601. Thus, the sealing ability of the chip discharge space 621 is raised, and a dust-proof effect or advantage occurs with respect to the bearing 617. The forward end face of the cover assembly 618 is positioned at a location which is slightly moved rearwardly axially from a portion of each of the outer peripheral cutting edges 603b of the tips 603, which is bitten into the workpiece. The forward end of the cover assembly 618 has its inner peripheral surface which is narrowed to such a degree as to be slightly larger than a rotational locus of the outer peripheral cutting edges 603b of the tip 603.

On the other hand, an air jet pump 622 is connected to the outer peripheral surface of the cover assembly 618, for drawing the chips within the chip discharge space 621 together with air to discharge the chips to the outside. That is, a connecting pipe 623 is fitted in a through bore 618a formed in the peripheral wall of the cover assembly 618. The air jet pump 622 has its suction port section which is connected to a flange 623a of the connecting pipe 623. A duct hose 624 has its on end which is fitted about and connected to a discharge port section of the air jet pump 622.

The air jet pump 622 has a body 625 which is formed into a cylindrical shape and whose proximal end is formed into the suction port section. The air jet pump 622 is connected to the flange 623a of the connecting pipe 623. The air jet pump 622 has its other end which is formed into the discharge port section connected to one end of the duct hose 624. The body 625 has its peripheral wall which is formed with an air chamber 625a. The air chamber 625a is annular in shape and extends around the peripheral wall of the body 625 in the peripheral direction A tapered air jetting passage 625b is formed which extends from the position of the proximal end of the air chamber 625a toward the forward end of the inner peripheral surface of the body 625. The body 625 has its inner peripheral surface which is most reduced in diameter at a location adjacent the opening section of the air jetting passage 625b. The inner peripheral surface of the body 625 is gradually enlarged in diameter from the opening section of the air jetting passage 625b toward the proximal end and the forward end of the body 625. In the body 625 constructed as above, an air supply hose 626 is connected to the air chamber 625a and is connected to an air supply source.

Figure 33:
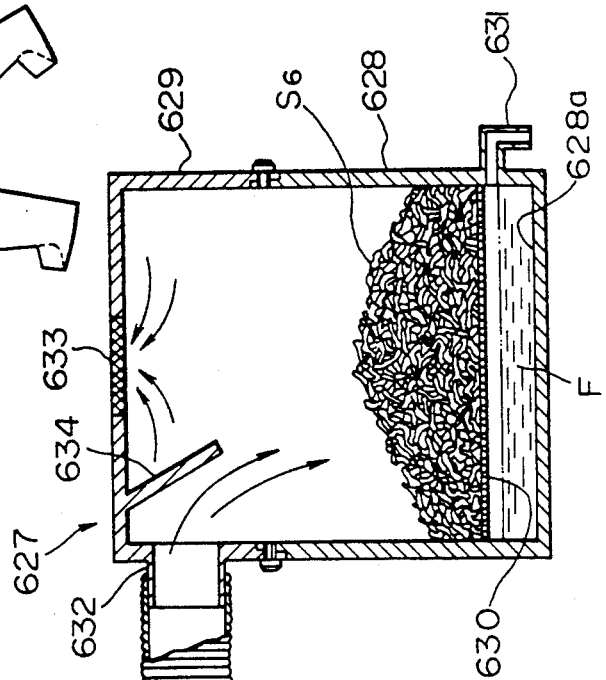
FIG. 33 is a cross-sectional view of a chip receiving box for use in the rotary cutting tool illustrated in FIGS. 29 and 30.
Figure 33:
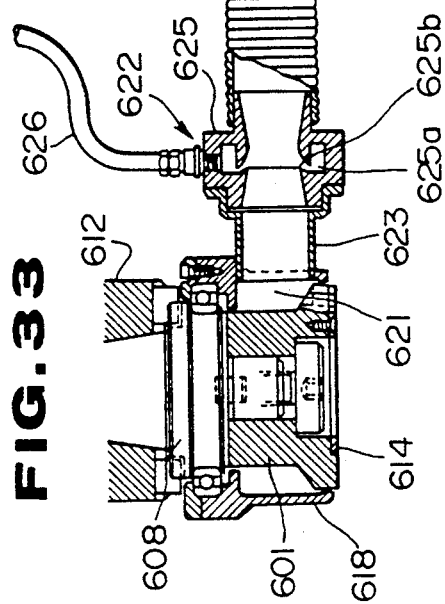

The duct hose 624 has its other end which is connected to a chip receiving box 627 as shown in FIG. 33.

The chip receiving box 627 is so constructed that a side wall of the chip receiving box 627 is capable of being divided into upper and lower sections. The lower section of the chip receiving box 627 is formed into a chip accommodating section 628, and the upper portion is formed into a lid or closure 629. A mesh receiving plate 630 is provided at a location adjacent a bottom face 628a of the chip accommodating section 628, for receiving chips $S_6$. A discharge pipe 631 is provided at the side wall of the chip accommodating section 628 at a location adjacent the mesh receiving plate 630, for discharging cutting oil F. Moreover, a pipe 632 is provided at the side wall of the closure 629, for causing the duct hose 624 to communicate with the interior of the chip receiving box 627. An air-discharge filter 633 is provided at a ceiling wall of the closure 629. A shielding plate 634 is provided in an inclined manner in a direction directed downwardly away from the opening of the pipe 632, for shielding a portion on an extension line of the opening of the pipe 632.

In the face milling cutter tool constructed as described above, the chips torn off from the surface of the workpiece by the face cutting edges 603a are guided to the gap sections between the faces of the tips 603 and the end faces of the hook-shaped sections 614a of the chip guide element 614 from the surface side thereof, and are discharged and divided into pieces into the tip pockets 607. Further, the chips torn off from the surface of the workpiece by the outer peripheral cutting edges 603b are guided to the gap sections between the faces of the tips 603 and the end faces of the hook-shaped sections 614a of the chip guide element 614 from the outer peripheral surface side thereof, and are discharged and divided into pieces into the tip pockets 607. Since new chips are successively discharged into the tip pockets 607, the divided chips are pushed up into the chip discharge space 621. The new chips are passed from the through bore 618a through the air jet pump 622 and the duct hose 624, and are collected in the chip receiving box 627.

Moreover, in the air jet pump 622, the air is jetted at a high speed toward the forward end of the body 625 through the air jetting passage 625b. Since the jetting section of the air is reduced in diameter, the pressure at the jetting section is rendered negative. Further, since the air at the proximal end of the body 625 is pulled due to the inertia force of the jetting air, sufficient air within the chip discharge space 621 is drawn by the air jet pump 622.

Furthermore, the chips $S_6$ fed into the chip receiving box 627 is abutted against the shielding plate 634 so that the chips $S_6$ are rapidly reduced in speed and are accumulated on the mesh receiving plate 630. Further, the cutting oil F adhering to the chips $S_6$ falls down through the mesh receiving plate 630 and accumulates at the bottom surface 628a of the chip receiving box 627. The oil F is discharged through the discharge pipe 631. The air is discharged through the filter 633.

As described above, in the face milling cutter tool according to the sixth embodiment of the invention, the chips generated at cutting by the cutting edges 603a and 603b are passed into the tip pockets 607 by the chip guide elements 614, and are guided to the chip discharge space 621. The chips ar successively drawn and discharged to the outside of the cover assembly 618 by the air jet pump 622. Thus, the chips are prevented from being accumulated on the surface of the workpiece, and from being scattered onto the machine and to the vicinity thereof. Accordingly, breakage of the cutting edges at processing and deterioration in processing surfaces do not occur so that there is no such a fear that accuracy is deteriorated due to thermal deformation of the workpiece and the machine, and reduction in accuracy of the machine and service life thereof due to invasion of the chips does not occur.

Moreover, since the air is drawn bY the air jet pump 622, there is obtained also such a functional advantage that sufficient air within the chip discharge space 621 can be drawn. Since, in the air jet pump 622, mere supply of the air through the air supply hose 626 enables the suction force to be exhibited, there is also such a functional advantage that the air jet pump 622 can be installed simply and at low cost. Further, since the air jet pump 622 has no rotating mechanisms, no accident occurs due to biting of the chips or the like, and maintenance is also simple.

Furthermore, since the chip receiving box 627 is provided with the shielding plate 627, falling chips $S_6$ are separated from the air in a short period of time, so that only air is discharged through the filter 633. Further, there is also such a functional advantage that it is possible to separate the chips $S_6$ from the cutting oil F by the mesh receiving plate 630.

Referring next to FIGS. 34 through 39, there is shown a rotatable cutting tool according to a seventh embodiment of the invention.

Figure 34:
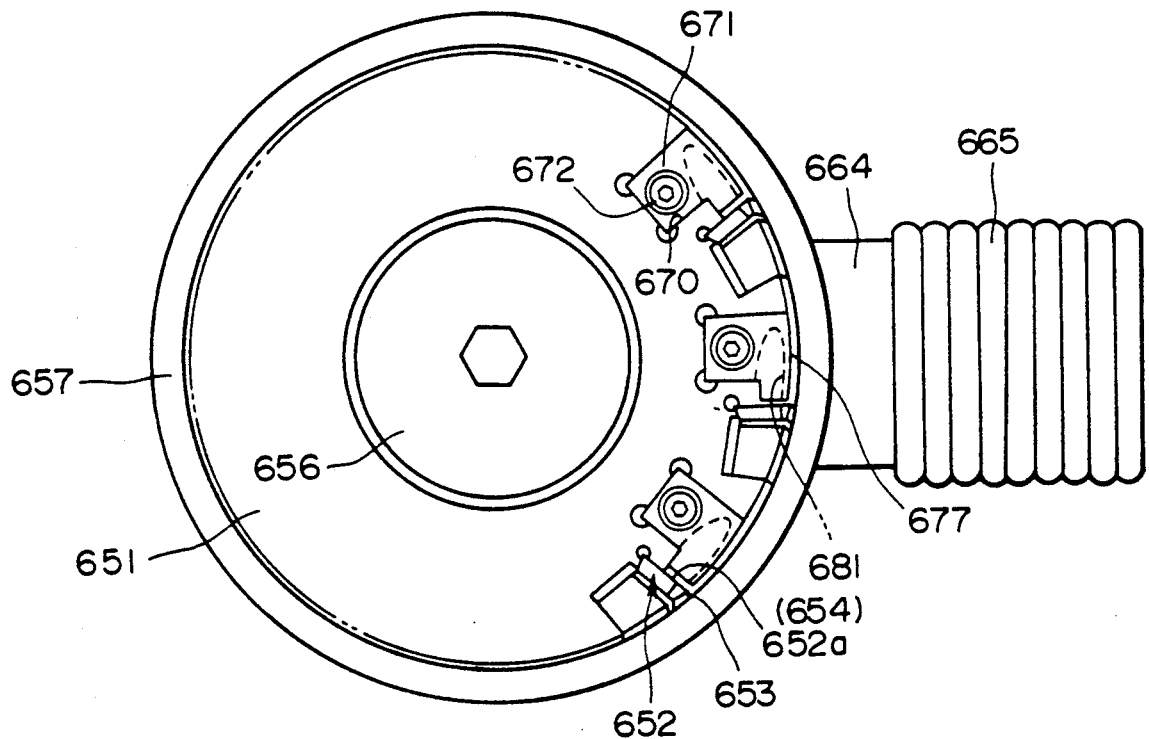
FIG. 34 is a bottom view of a rotary cutting tool according to a seventh embodiment of the invention.
Figure 35:
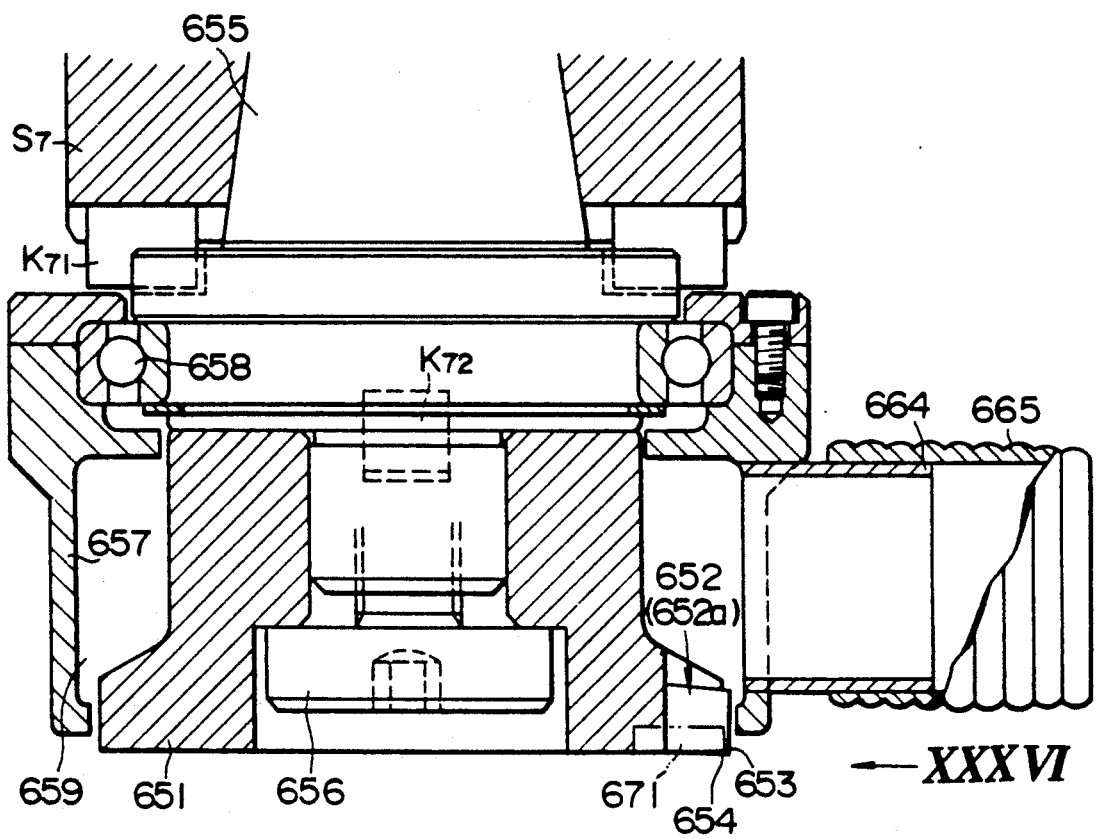
FIG. 35 is a longitudinal cross-sectional view of the rotary cutting tool illustrated in FIG. 34.
Figure 36:
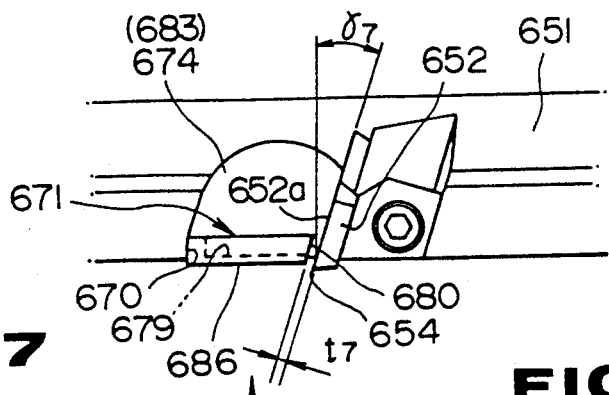
FIG. 36 is a fragmentary view as viewed from the arrow XXXVI in FIG. 35.
Figure 37:
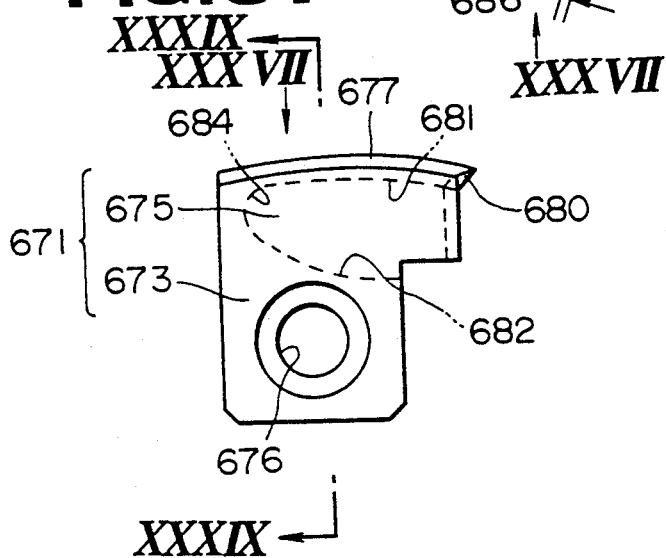
FIG. 37 is a view as viewed from the arrow XXXVII in FIG. 36
Figure 39:
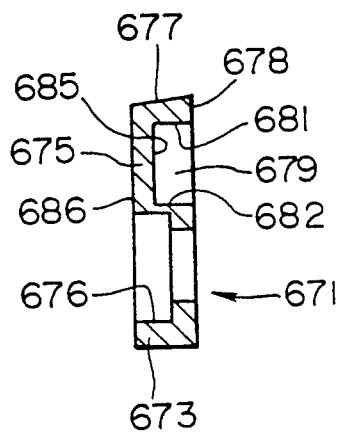
FIG. 39 is a cross-sectional view taken along the line XXXIX—XXXIX in FIG. 37.
Figure 38:
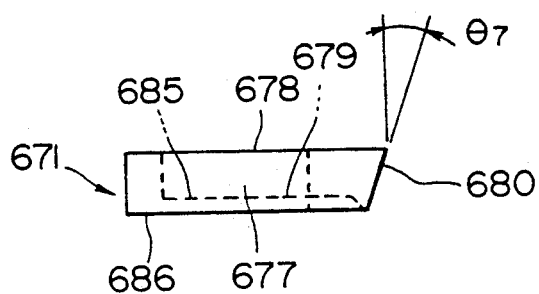
FIG. 38 is a view as viewed from the arrow XXXVIII in FIG. 37.

As shown in FIGS. 34 and 35, a face milling cutter in the seventh embodiment is common to the face milling cutters in the previous first through sixth embodiments in the following points. That is, a plurality of cutting tips 652 are mounted to an outer periphery of a forward end of a cutter body 651. A cover assembly 657 is rotatably mounted, through a bearing 658, to an arbor 655 connected to a proximal end of the cutter body 651. A discharge or suction port element 664 is provided at the outer periphery of the cover assembly 657. The suction port element 664 communicates with a chip accommodating chamber 659.

However, the seventh embodiment differs from the previous embodiments in the following points. That is, a plurality of mounting seats 670 are formed at respective locations which are directed toward the cutting tips 652 at the forward end face of the cutter body 651. A plurality of chip guide elements 671 are detachably mounted respectively to the mounting seats 670 by respective bolts 672. The configuration of the chip guide elements 671 per se is also different from that of each of the previously described embodiments.

Specifically, as shown in FIGS. 36 through 39, each of the chip guide elements 671 comprises a mounting section 673 fitted in a corresponding one of the mounting seats 670 of the cutter body 651, and a chip guide section 675 for covering the opening of a corresponding one of the tip pockets 674 of the cutter body 651 at the forward end thereof. The mounting section 673 is formed into a generally square planar plate. The mounting section 673 has its center which is formed with a bolt bore 676 through which the bolt 672 extends or is passed.

On the other hand, the chip guide section 675 is formed into a planar plate which is longer than the mounting section 673 in the tool peripheral direction. The chip guide section 675 has an outer peripheral side face 677 which is formed into an arcuate shape. The arcuate outer peripheral side surface 677 has its curvature which is the same as that of the outer peripheral surface of the cover body 651. Further, a groove 679 is formed in a surface 678 of the chip guide section 675, which faces toward the chip accommodating chamber 659. The groove 679 has its one end which opens to an end face 680 directed toward a face 652a of the cutting tip 652.

Here, a wall surface 681 of the groove 679 facing toward the outer peripheral side surface 677 is formed into a concave face which is arcuate substantially in coaxial relation to the outer peripheral side surface 677. On the other hand, a wall surface 682 of the groove 679 adjacent the mounting section 673 is formed into a surface which is concave arcuately toward the mounting section 673. However, the wall surface 682 has its dimension which is substantially the same in curvature as a wall surface 683 of the tip pocket 674 in the cutter body 651. These wall surfaces 681 and 682 are smoothly connected to each other through an arcuate surface 684. Further, the groove 679 has a bottom surface 685 which is formed into a planar surface extending in parallel relation to the other surface 686 of the chip guide element 671.

Moreover, the end face 680 of the chip guide section 675 is formed into an inclined surface which is inclined a predetermined angle with respect to the surface 678. An inclined angle $\theta_7$ of the inclined surface is so determined as to be be equal to an axial rake angle $\gamma_7$ given to the face 652a of the cutting tip 652 mounted to the cutter body 651.

The mounting section 673 described above is fitted in the mounting seat 670 of the cutter body 651, whereby the chip guide element 671 constructed as above is mounted in position on the forward end face of the cutter body 651. The chip guide element 671 is fastened by the bolt 672 and is fixedly mounted to the cutter body 651. At this time, the outer peripheral side surface 677 of the chip guide section 675 is contiguous to the outer peripheral surface of the cutter body 651, and is so positioned as to describe an arc identical with the outer peripheral surface of the cutter body 651. Further, the end face 680 of the chip guide section 675 is so positioned as to form a constant gap $t_7$ between the end face 680 and the face 652a of the cutting tip 652.

Moreover, the relationship between the depth of the mounting seat 670 and the wall thickness of the chip guide element 671 is so determined that the surface 686 facing toward the forward end of the cutting tool is moved rearwardly toward the proximal end of the cutting tool from the cutting edge 654 of the cutting tip 652, and the surface 678 of the chip guide element 671 facing toward the chip accommodating chamber 659 is moved rearwardly toward the proximal end of the cutting tool from the forward end of the cover assembly 657.

As described above, in the face milling cutter constructed as above according to the seventh embodiment, similarly to the face milling cutters described with reference to FIGS. 1 through 33, a suction hose 665 is connected to the discharge port element 664 connected to the cover assembly 657 to draw air within the chip accommodating chamber 659, whereby the chips generated by the cutting edges 653 and 654 are successively drawn and collected through the gap $t_7$ between the end face 680 of the chip guide element 671 and the face 652a of the cutting tip 652.

Further, in the face milling cutter in the seventh embodiment, the outer peripheral side surface 677 of the chip guide element 671 is contiguous to the outer peripheral surface of the cutter body 651 and is formed into the arcuate surface describing the arc identical with the outer peripheral surface of the cutter body 651. The wall surface 681 of the groove 679, which faces toward the outer peripheral side surface 677, is also formed into the arcuate surface which is substantially coaxial with the outer peripheral side surface 677. Accordingly, the wall thickness between the outer peripheral side surface 677 and the groove wall surface 681 is thinned till a range of minimum strength-retention, whereby it is possible to considerably enlarge the groove 679 radially outwardly of the cutting tool more than that of each of the previous embodiments, while the outer peripheral side surface 677 is stored within the rotational locus of the cutting tip 653.

Thus, according to the seventh embodiment, discharge of the chips within the grooves 679 is improved so that clogging of the chips at the gaps $t_7$ between the end faces 680 of the chip guide elements 671 and the faces 652a of the cutting tips 652 is beforehand avoided, thereby enabling the suction and collection of the chips to be done more reliably.

Figure 40:
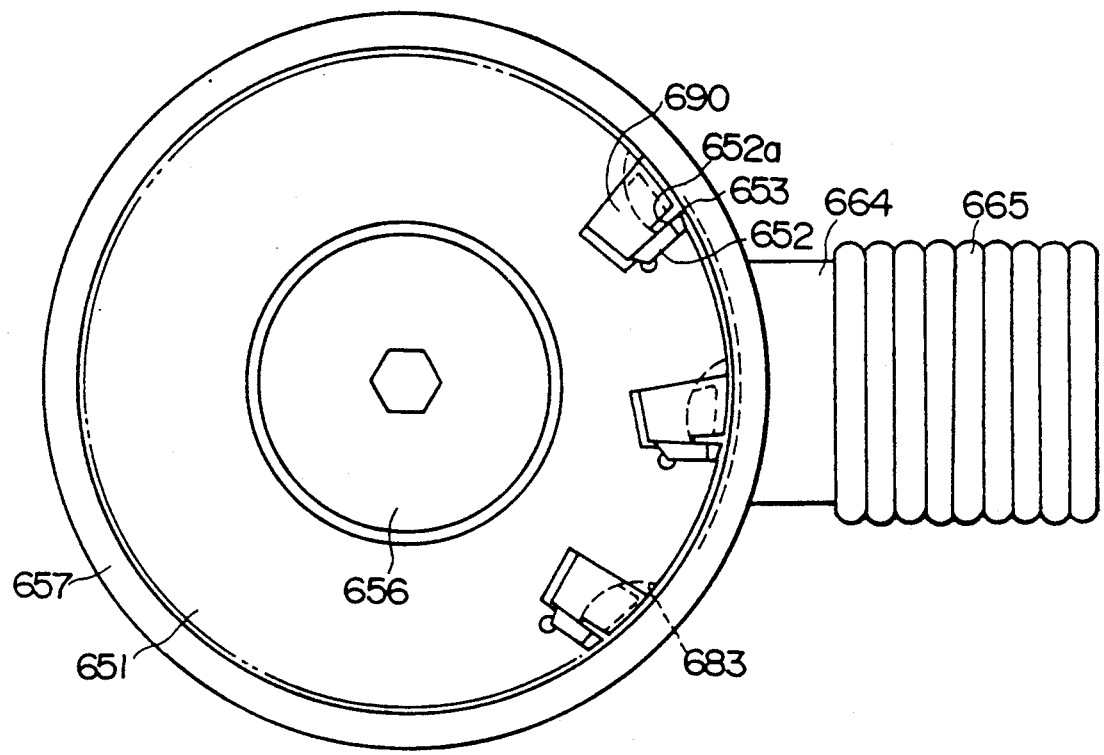
FIG. 40 is a bottom view of a modification of the rotary cutting tool illustrated in FIGS. 34 through 39.
Figure 41:
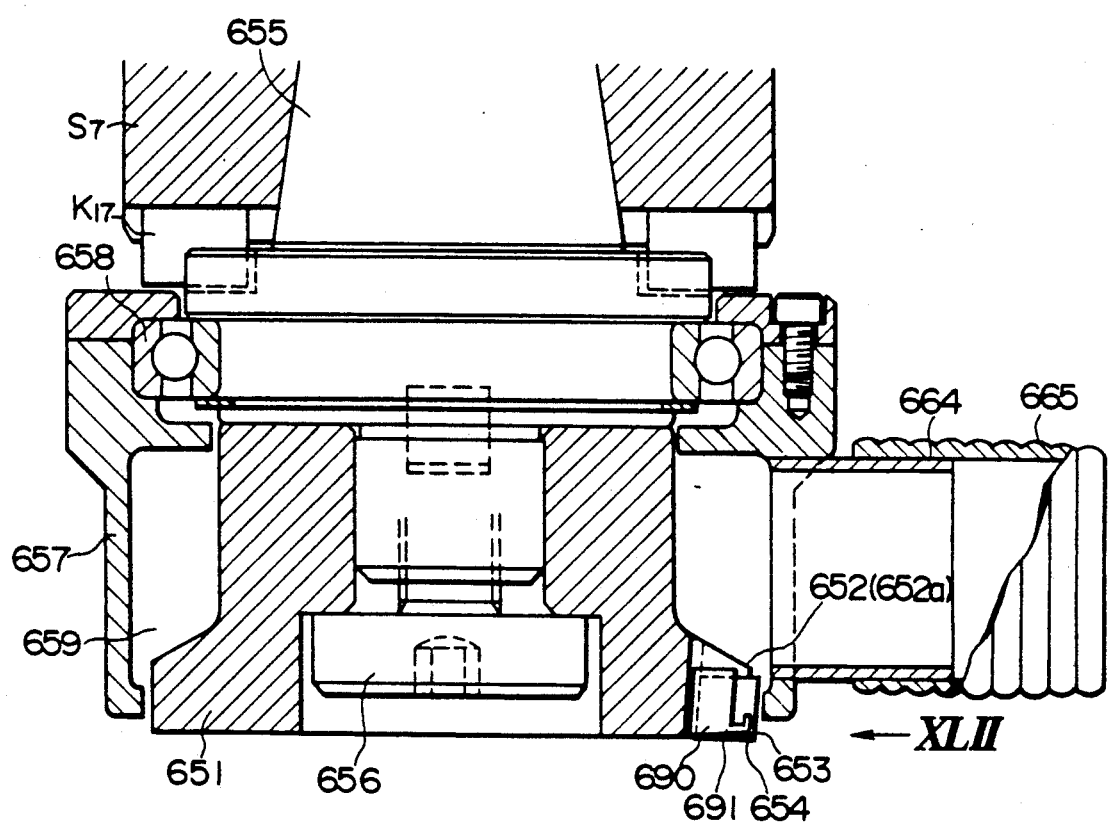
FIG. 41 is a longitudinal cross-sectional view showing the rotary cutting tool illustrated in FIG. 40.
Figure 42:
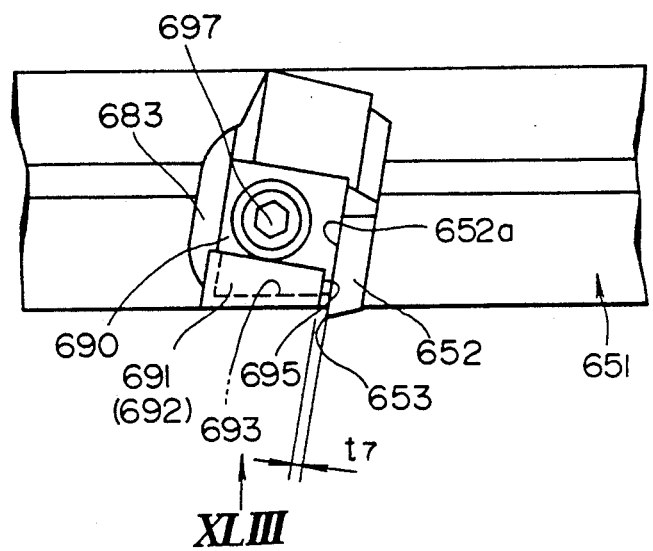
FIG. 42 is a fragmentary enlarged view as viewed from the arrow XLII in FIG. 41.

In the foregoing, the seventh embodiment has been described in which the wedge elements for fixedly mounting the cutting tips and the chip guide elements are particularly provided separately from each other. As shown in FIGS. 40 through 42, in the case of a rotatable cutting tool in which a wedge element 690 is arranged on the side of the face 652a of each of the cutting tips 652, it is possible to divert the wedge element 690 to bring the same into a chip guide element.

Figure 44:
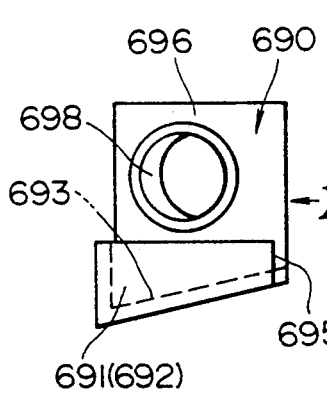
FIG. 44 is a view as viewed from the arrow XLIV in FIG. 43.
Figure 43:
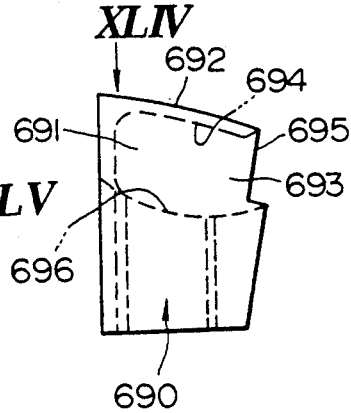
FIG. 43 is a view as viewed from the arrow XLIII in FIG. 42.
Figure 45:
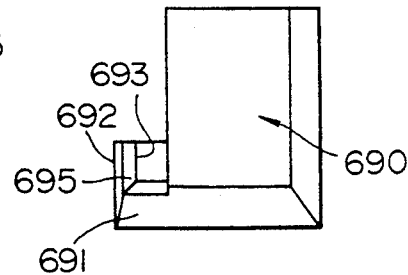
FIG. 45 is a view as viewed from the arrow XLV in FIG. 44.

That is, the arrangement should be made as follows. As shown in FIGS. 43 through 45, a chip guide section 691 is formed on the one end of the wedge element 690 in an integral manner. An outer peripheral side surface 692 of the chip guide section 691 is formed into an arcuate surface contiguous to the outer peripheral surface of the cutter body 651. A groove 693 is formed in the chip guide section 691 at a location which is directed toward the chip accommodating chamber 659. A wall surface 694 of the groove 693 facing toward the outer peripheral side surface 692 is formed into an arcuate surface which is substantially coaxial with the outer peripheral side surface 692. In this connection, the reference numeral 695 in FIGS. 40 through 45 denotes an end face which is directed toward the face 652a of the cutting tip 652. Similarly to the seventh embodiment, the end face 695 is formed into an inclined surface which is inclined at the same angle as the axial rake angle of the face 652a. Further, an outer peripheral side surface 696 of the wedge element 690 is formed into an arcuate surface which is contiguous to the wall surface 683 of the tip pocket 674 of the cutter body 651. Moreover, a bolt 697 for mounting the wedge element 690 to the cutter body 651 is inserted through a bolt bore 698.

Referring next to FIGS. 46 through 51, there is shown a rotatable cutting tool according to an eighth embodiment of the invention.

Figure 46:
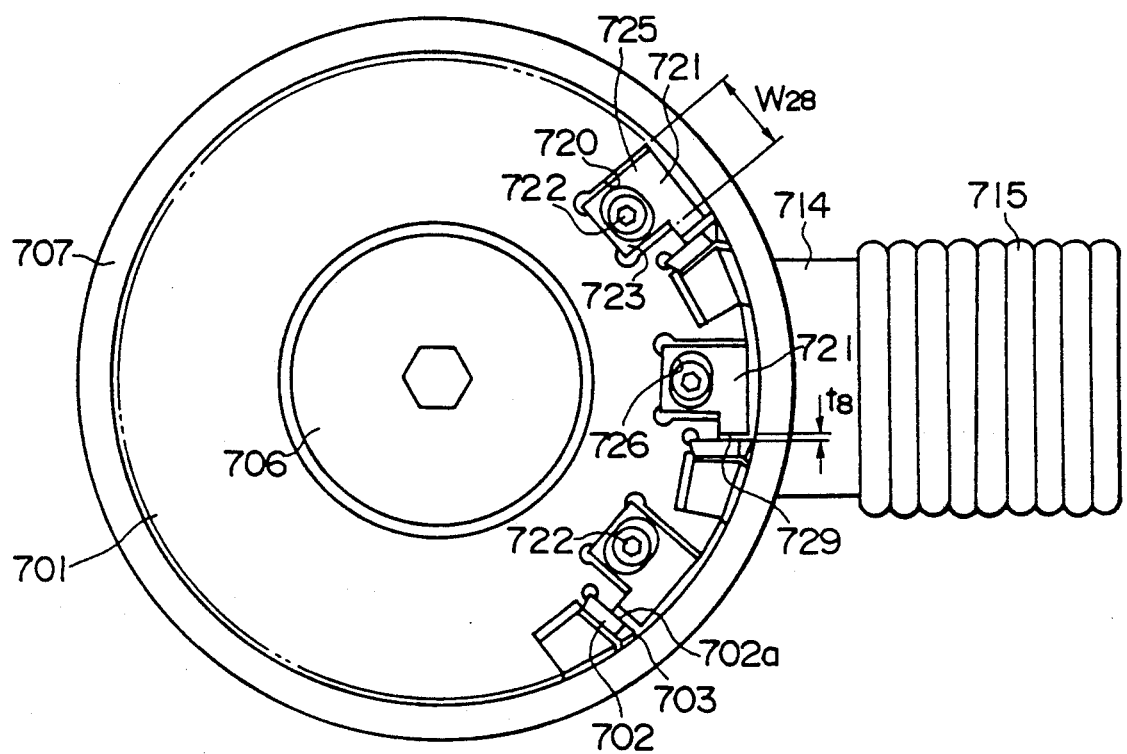
FIG. 46 is a bottom view of a rotary cutting tool according to a eighth embodiment of the invention.
Figure 47:
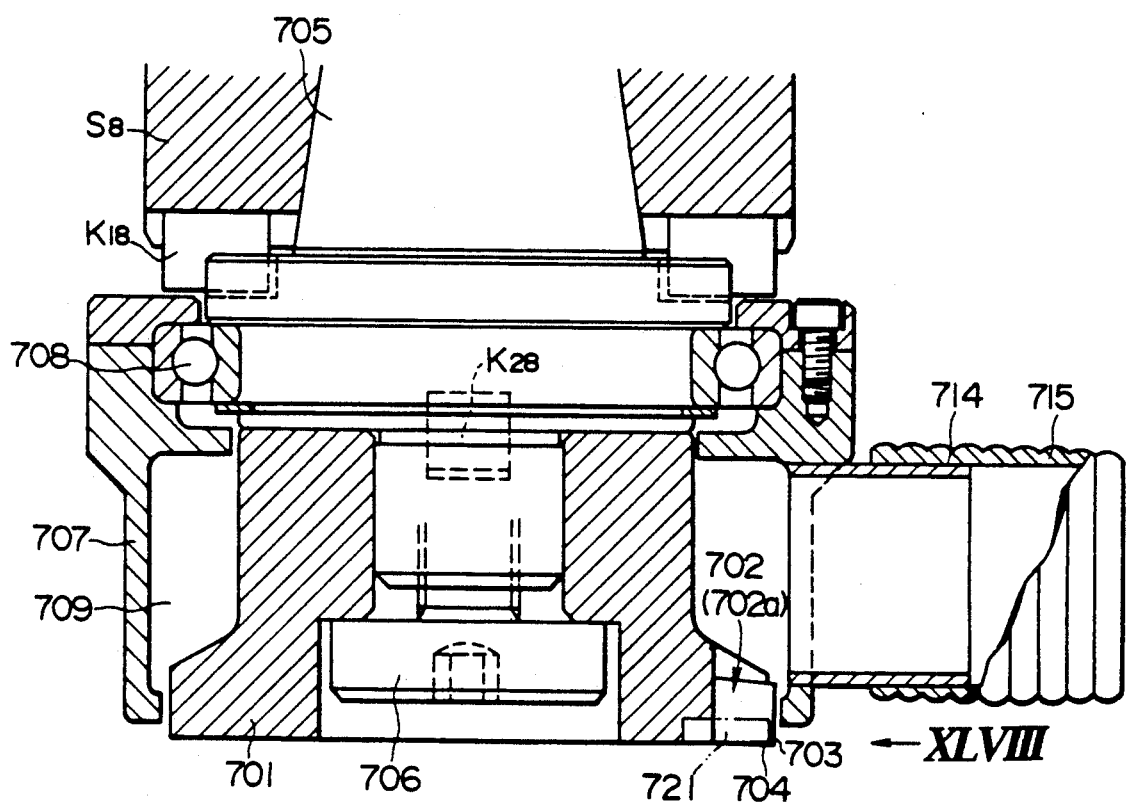
FIG. 47 is a longitudinal cross-sectional view of the rotary cutting tool illustrated in FIG. 46.
Figure 48:
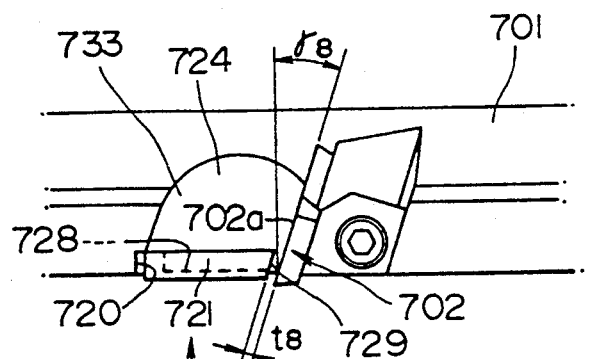
FIG. 48 is a fragmentary enlarged view as viewed from the arrow XLVIII in FIG. 47.
Figure 49:
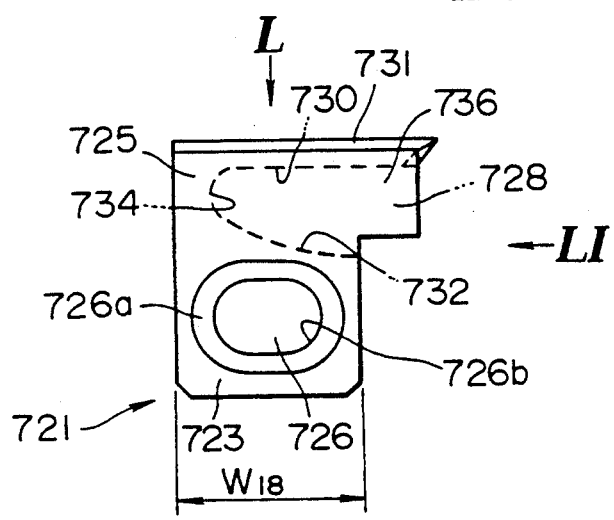
FIG. 49 is a view as viewed from the arrow XLIX in FIG. 48.
Figure 51:
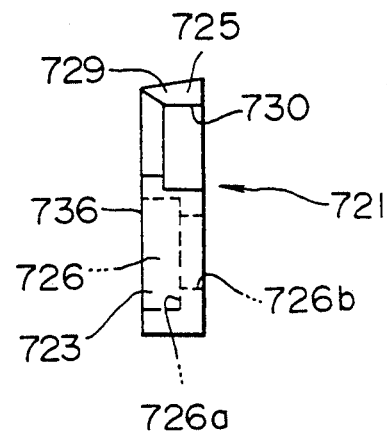
FIG. 51 is a a view as viewed from the arrow LI in FIG. 49.
Figure 50:
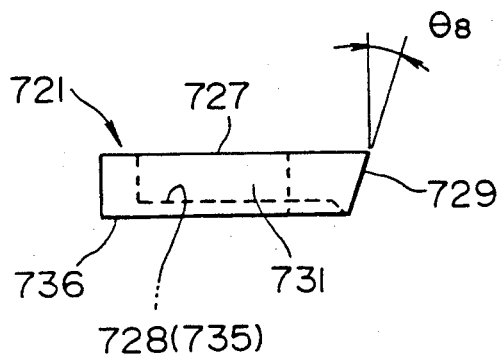
FIG. 50 is a view as viewed from the arrow L in FIG. 49.

As shown in FIGS. 46 and 47, a face milling cutter in the eighth embodiment is common to the face milling cutters in the previous embodiments in the following points. That is, a plurality of cutting tips 702 are mounted to an outer periphery of a forward end of a cutter body 701. A cover assembly 707 is rotatably mounted, through a bearing 708, to an arbor 705 connected to a proximal end of the cutter body 701. A discharge or suction port element 714 is provided at the peripheral surface of the cover assembly 707. The suction port element 714 communicates with a chip accommodating chamber 709.

However, the eighth embodiment differs from the previous first through sixth embodiments in the following points. That is, a plurality of mounting seats 720 are formed at respective locations which are directed toward the cutting tips 702 at the forward end face of the cutter body 701. A plurality of chip guide elements 721 are detachably mounted respectively to the mounting seats 720 by respective bolts 722. The configuration of the chip guide elements 721 is also different from that of each of the previously described first through seven embodiments.

Specifically, as shown in FIG. 46 and FIGS. 48 through 51, each of the chip guide elements 721 comprises a mounting section 723 fitted in the mounting seat 720 of the cutter body 701, and a chip guide section 725 for covering the opening of a tip pocket 724 in the cutter body 701 at the forward end thereof.

Here, the mounting section 723 is formed into a generally square planar plate. The mounting section 723 has its center which is formed with a bolt bore 726 through which the bolt 722 extends or is passed. The bolt bore 726 comprises a bolt seat 726a engaged with the head of the bolt 722, and a through bore 726b through which the threaded section of the bolt 722 extends. The bolt bore 726 is formed into an elongated configuration extending generally in the peripheral direction of the cutter body 701. Further, a width dimension $W_8$ of the mounting section 723 in the peripheral direction of the cutter body 701 is so determined as to be smaller than a width $W_{28}$ of the mounting seat 720 of the cutter body 701.

On the other hand, the chip guide section 725 is formed into a planar plate which is longer than the mounting section 723 in the tool peripheral direction. A groove 728 is formed on a surface 727 of the chip guide section 725, which faces toward the chip accommodating chamber 709. The groove 728 has its one end which opens to an end face 729 which is directed toward a face 702a of the cutting tip 702.

The groove 728 has its one wall surface 730 which is formed into a planar surface extending generally in parallel relation to an outer peripheral side surface 731 of the chip guide section 725. The other wall surface 732 is formed into an arcuate concave surface which is depressed toward the mounting section 723. The other wall surface 732 has its curvature which is substantially the same as that of a wall surface 733 (refer to FIG. 48) of the tip pocket 724 of the cutter body 701 These wall surfaces 730 and 732 are smoothly connected to each other through an arcuate surface 734. The groove 728 has its bottom surface 735 which is formed into a planar surface extending generally in parallel to the other surface 736 of the chip guide element 721.

Moreover, the end face 729 of the chip guide section 725 is formed into an inclined surface which is inclined a predetermined angle with respect to the surface 727. An inclined angle $\theta_8$ of the inclined surface is so determined as to be equal to an axial rake angle $\gamma_8$ given to the face 702a of the cutting tip 702 mounted to the cutter body 701.

The mounting section 723 described above is fitted in the mounting seat 720 of the cutter body 701, whereby the chip guide element 721 constructed as above is mounted in position on the forward end face of the cutter body 701. Further, the chip guide element 721 is fastened to the cutter body 701 by the bolt 722 and is fixedly mounted to the cutter body 701. At this time, the outer peripheral side surface 731 of the chip guide section 725 is so positioned as not to protrude from the outer peripheral surface of the cutter body 701. Further, the end face 729 is so positioned as to form a gap $t_8$ between the end face 729 and the face 702a of the cutting tip 702.

Moreover, the relationship between the depth of the mounting seat 720 and the wall thickness of the chip guide element 721 is so determined that the surface 736 facing toward the forward end of the cutting tool is moved rearwardly toward the proximal end of the cutting tool from the cutting edge 704 of the cutting tip 702, and the surface 727 of the chip guide element 721 facing toward the chip accommodating chamber 709 is moved rearwardly toward the proximal end of the cutting tool from the forward end of the cover assembly 707

In the face milling cutter constructed as above, similarly to the face milling cutter described with reference to FIGS. 34 through 39, a suction hose 715 is connected to the suction port element 714 mounted to the cover assembly 707 to draw air within the chip accommodating chamber 709, whereby the chips generated by the cutting edges 703 and 704 are successively drawn and collected through the gap $t_8$ between the end face 729 of the chip guide element 721 and the face 702a of the cutting tip 702.

Further, in the face milling cutter in the eighth embodiment, the bolt bore 726 in the chip guide element 721 is formed into the elongated configuration extending in the peripheral direction of the cutter body 701, and the width of the mounting section 723 in the peripheral direction of the cutter body 701 is so determined as to be smaller than that of the mounting seat 720 of the cutter body 701. In the manner described above, it is possible to move the chip guide element 721 in the peripheral direction of the cutter body 701 by loosening of the bolt 722. Thus, it is possible to adjust the dimension of the gap $t_8$ between the end face 729 and the face 702a of the cutting tip 702, to a value suitable for the chips generated. Accordingly, according to the face milling cutter in the eighth embodiment, the gap $t_8$ is changed or altered in accordance with the kind or type of the chips generated, making it possible to always obtain maximum suction efficiency.

In connection with the above, it is preferable that the gap $t_8$ can be adjusted at least within a range of from 0.2 mm to 2.0 mm.

Referring next to FIGS. 52 through 57, there is shown a rotatable cutting tool according to a ninth embodiment of the invention.

Figure 52:
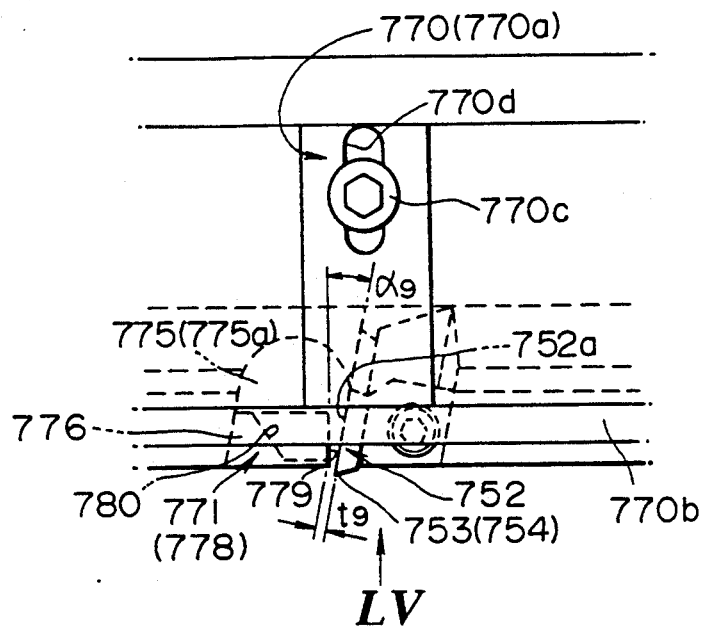
FIG. 52 is a fragmentary side elevational view of a rotary cutting tool according to a ninth embodiment of the invention.
Figure 55:
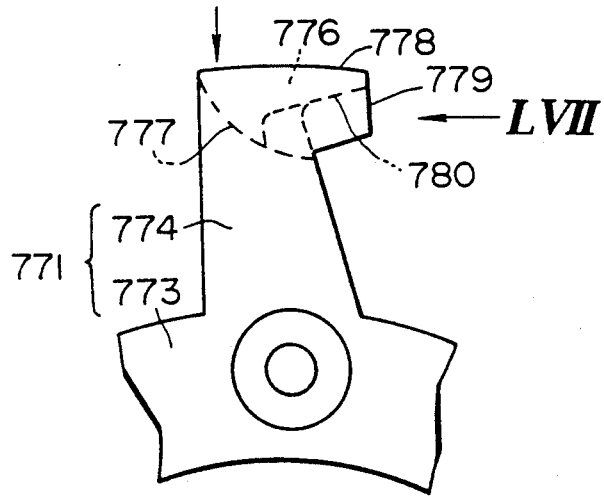
FIG. 55 is a fragmentary enlarged view as viewed from the arrow LV in FIG. 52.
Figure 56:
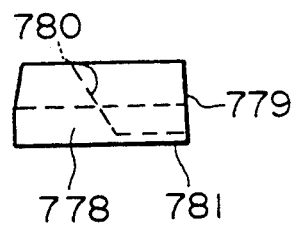
FIG. 56 is a fragmentary view as viewed from the arrow LVI in FIG. 55.
Figure 57:
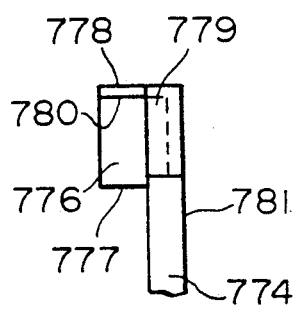
FIG. 57 is a fragmentary view as viewed from the arrow LVII in FIG. 55.
Figure 53:
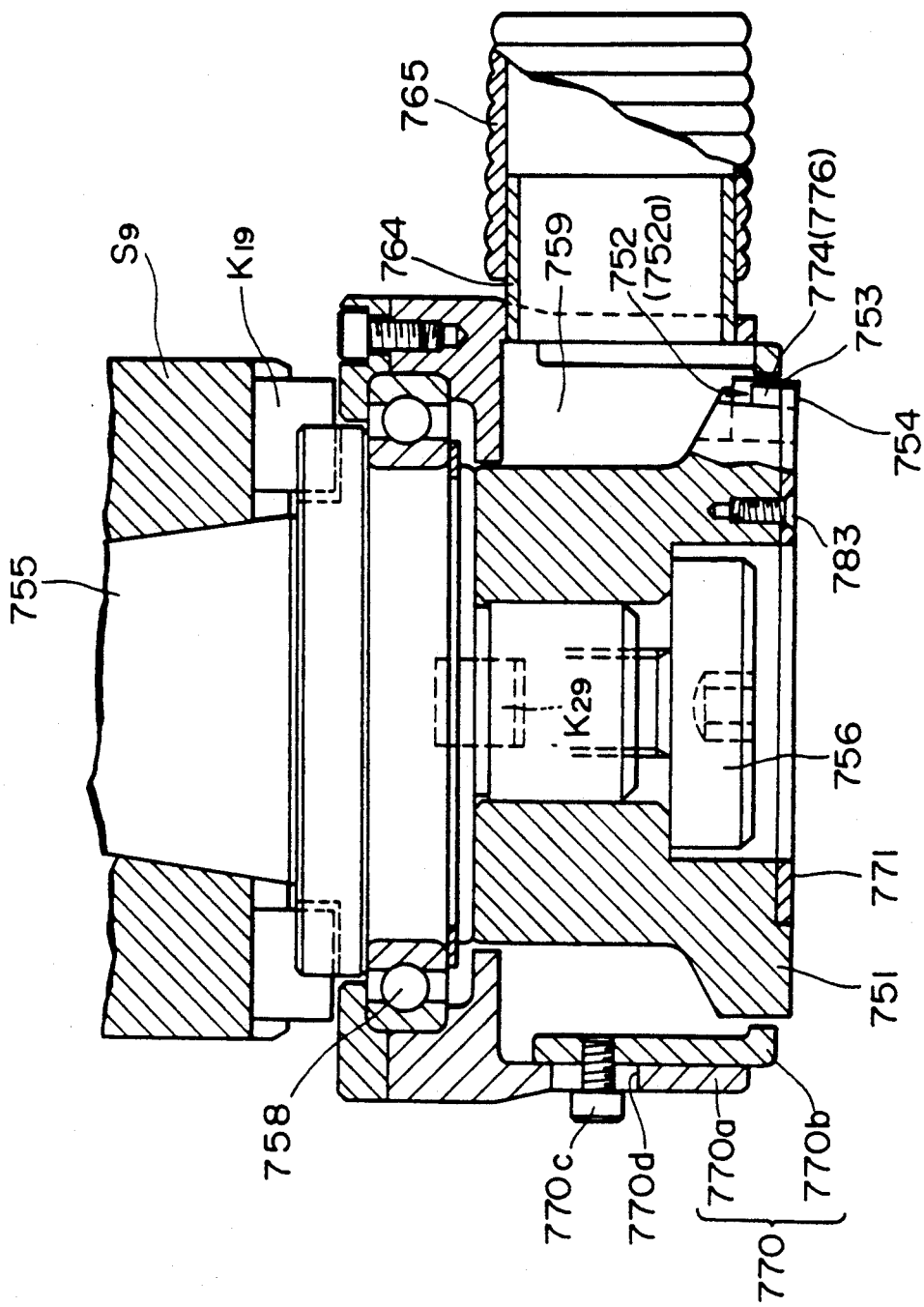
FIG. 53 is a longitudinal cross-sectional view of the rotary cutting tool illustrated in FIG. 52.
Figure 54:
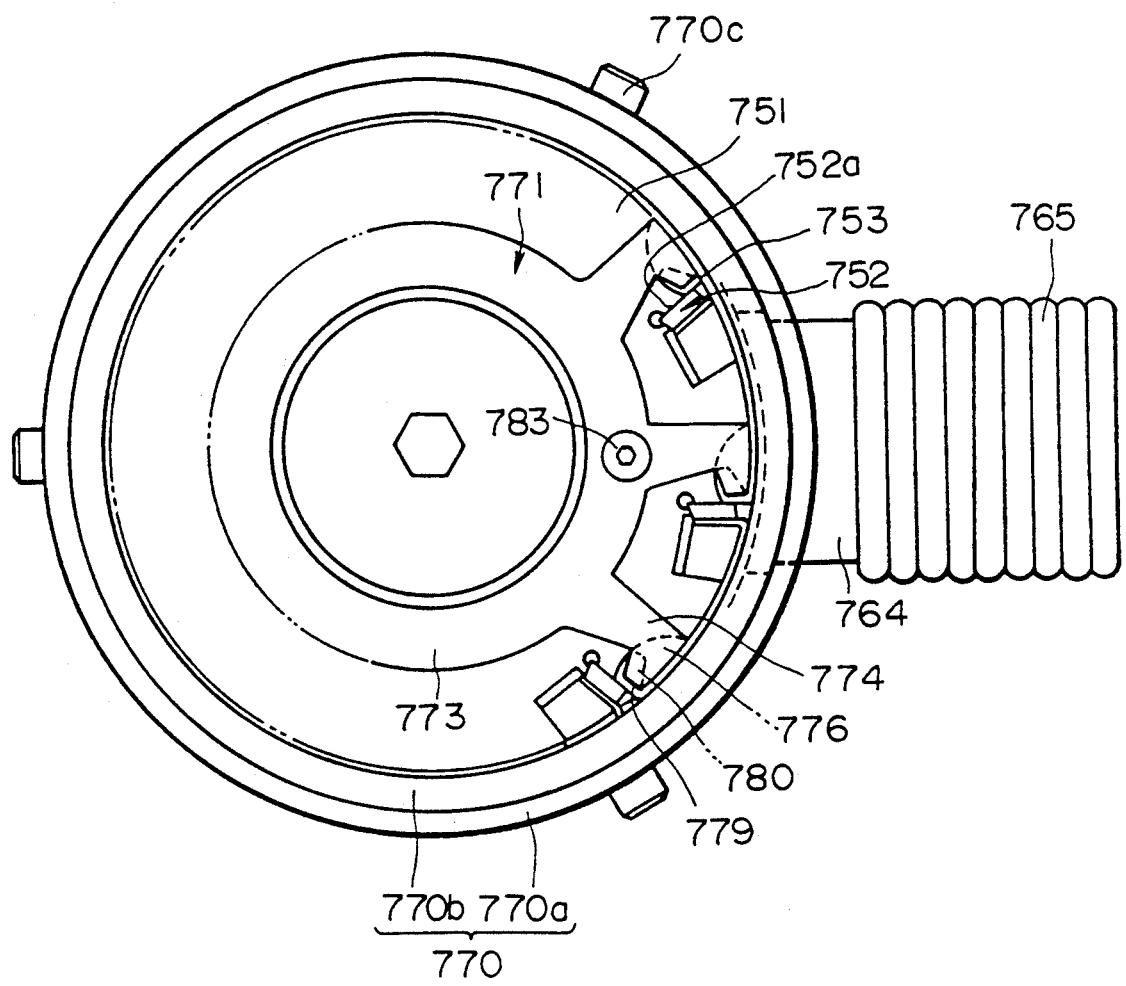
FIG. 54 is a bottom view of the rotary cutting tool illustrated in FIG. 53.

As shown in FIGS. 52 through 54, a face milling cutter in the ninth embodiment is generally constructed as follows. That is, a plurality of cutting tips 752 are mounted to an outer periphery of a forward end of a cutter body 751. A generally cylindrical cover assembly 770 is rotatably mounted, through a bearing 758, to an arbor 755 connected to a proximal end of the cutter body 751. A discharge or suction port element 764 is provided at the peripheral wall of the cover assembly 770. The discharge port element 764 communicates with a chip accommodating chamber 759. Further, a chip guide element 771 is mounted to the forward end of the cutter body 751.

The cover assembly 770 comprises a stationary cover 770a mounted rotatably relatively to the arbor 755, and a movable cover 770b fitted in the stationary cover 770a and opening toward the forward end of the cutting tool. Under such a condition that a plurality of bolts 770c for fixing the movable cover 770b are loosened, the movable cover 770b is moved in the axial direction of the cutting tool along elongated bores 770d, whereby a position of the forward end of the cover assembly 770 can be adjusted in accordance with a change in depth of cut of cutting edges 753 and 754 of each of the cutting tips 752.

Further, the chip guide element 771 is arranged such that a plurality of chip guide sections 774 extending radially outwardly of the cutting tool are mounted to an outer periphery of a proximal section 773 which is annular in shape.

Here, as shown in FIG. 52 and FIGS. 55 through 57, a plurality of projections 776 are formed respectively on the sides of the chip guide section 774 facing toward the chip accommodating chamber 759, and are fitted respectively in a plurality of tip pockets 775 of the cutter body 751. These projections 776 have their respective inner peripheral side surfaces 777 which are formed respectively into arcuate surfaces which are in close or intimate contact with wall surfaces 775a of the respective tip pockets 775. An outer peripheral side surface 778 is formed into an arcuate surface which is contiguous to the outer peripheral surface of the cutter body 751.

A groove 780 is formed in the projection 776, and is directed toward a face 752a of the cutting tip 752. The groove 780 is provided for smoothly discharging chips passing through the gap $t_9$ between an end face 779 and the face 752a, toward the chip accommodating chamber 759. The end face 779 of the chip guide element 771 is formed into a planar surface which extends perpendicularly to a surface 781 of the chip guide element 771.

The chip guide element 771 constructed as above is mounted to the forward end of the cutter body 751 such that the chip guide element 771 is substantially in flush with the forward end face of the cutter body 751, and is tightened by a plurality of bolts 783 so that the chip guide element 751 is united together with the cutter body 751. Here, the end face 779 is s formed as to be inclined in a specific direction with respect to the face 752a of the cutting tip 752 which is inclined a predetermined axial rake angle $\alpha_9$ with respect to the axial direction of the cutter tool. Accordingly, the gap $t_9$ between the end face 779 and the face 752a is gradually enlarged as a distance increases from the forward end of the cutter tool to the proximal end thereof. In this connection, it is not necessarily required that the inclined angle of the end face 779 is in conformity with the rake angle $\alpha_9$ of the face 752a. However, it is preferable that the inclined angle of the end face 779 is set within a range of from 5° to 30° with respect to the axis of the cutting tool as far as possible. Further, it is adequate that the gap $t_9$ is set to a range of from 0.5 mm to 2.0 mm at the forward end of the cutting tool, that is, at a location where the gap $t_9$ is smallest.

Similarly to the face milling cutter described previously, a suction hose 765 is connected to the suction port element 764 of the cover assembly 770 to draw air within the chip accommodating chamber 759, whereby chips generated by the cutting edges 753 and 754 are successively drawn and collected through the gap $t_9$ between the end face 779 of the chip guide element 771 and the face 752a of the cutting tip 752.

Here, according to the ninth embodiment, since the gap $t_9$ between the end face 779 of the chip guide element 771 and the face 752a is enlarged as the distance increases from the forward end of the cutting tool toward the proximal end thereof, discharge of the chips passing through the gap $t_9$ can be improved, and clogging of the chips can be avoided. Further, since the enlarging or increasing side of the gap $t_9$ is almost covered by the forward end of the cover assembly 770 and is not exposed toward the outer periphery of the cutting tool, it is possible to restrain reduction of the chip suction effects to the minimum.

In connection with the above, the ninth embodiment has been described particularly as an example of the throwaway type face milling cutter. However, the invention should not be limited to the specific example. The invention is applicable also to a face milling cutter having soldered cutting tips or other various rotatable cutting tools.

Figure 58:
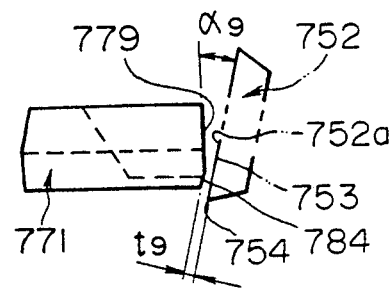
FIG. 58 is a view showing a modification of the rotary cutting tool illustrated in FIG. 52 through 57.

Moreover, in the ninth embodiment, the gap $t_9$ is particularly enlarged uniformly from the forward end of the cutting tool toward the proximal end thereof. However, the invention should not be limited to this specific example. For example, as shown in FIG. 58, the arrangement may be such that, of the end face 779 of the chip guide element 771, a planar section 784 extending generally in parallel relation to the face 752a is provided on a portion facing toward the forward end of the cutting tip 752. In this case, the magnitude of the gap $t_9$ exposed toward the outer periphery of the cutting tool does not change or vary, in so far as the position of the forward end of the cover assembly 770 is adjusted vertically within a range in which the depth of cut of the cutting edges 753 and 754 is relatively small. Accordingly, there can be obtained such a functional advantage that it is possible to completely prevent reduction in the chip suction efficiency in the case where the depth of cut is particularly small. In this connection, the length of the planar section 784 in this case may suitably be changed in accordance with the depth of cut of the cutting edges 753 and 754. Generally, however, it is suitable that the length of the planar section 784 is on the order of 1 mm to 3 mm.

Figure 59:
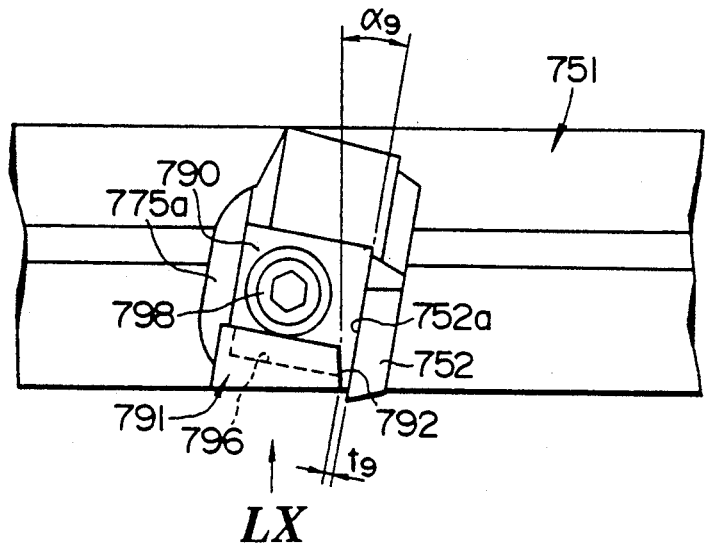
FIG. 59 is a side elevational view of another modification of the rotary cutting tool illustrated in FIG. 52.
Figures 60, 61, 62:
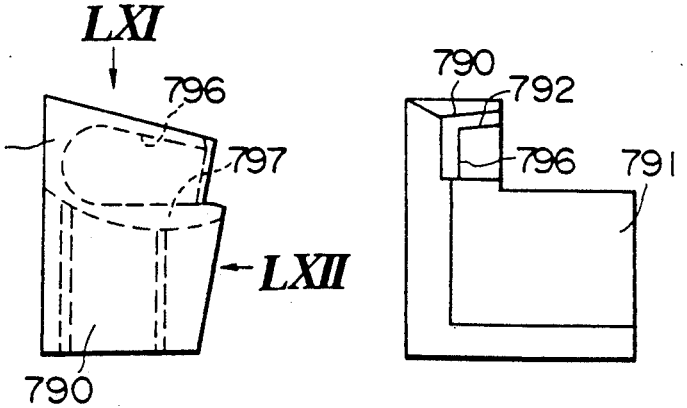
FIG. 60 is a view as viewed from the arrow LX in FIG. 59.
FIG. 61 is a view as viewed from the arrow LXI in FIG. 60.
FIG. 62 is a view as viewed from the arrow LXII in FIG. 60

Furthermore, in the ninth embodiment, the chip guide element 771 has integrally formed therewith the proximal section 773 which is in the form of an annulus. However, the invention should not be limited to this specific example. For instance, as shown in FIG. 59, the chip guide element 771 may be united together with a wedge element 790 for fixing the cutting tip 752. In this case, as shown in FIGS. 59 through 62, a plurality of chip guide elements 791 should be integrally formed respectively with one ends of respective wedge elements 790, and end faces 792 of the respective chip guide element 791 are brought respectively to inclined surfaces which are inclined with respect to the faces 752a of the respective cutting tips 752.

Figure 63:
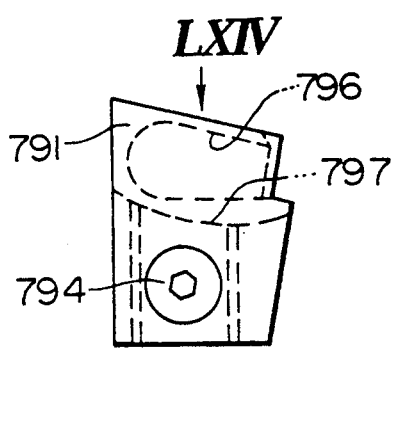
FIG. 63 is a front elevational view of a chip guide element of still another modification of the rotary cutting tool illustrated in FIG. 52.
Figure 64:
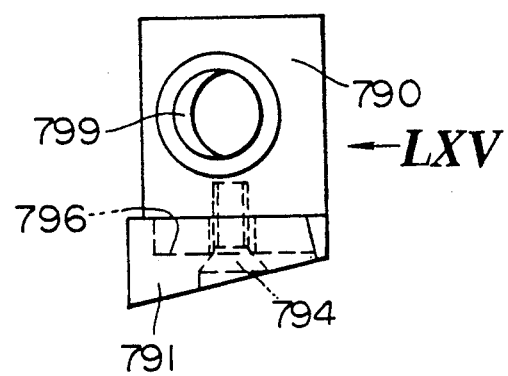
FIG. 64 is a view as viewed from the arrow LXIV in FIG. 63.
Figure 65:
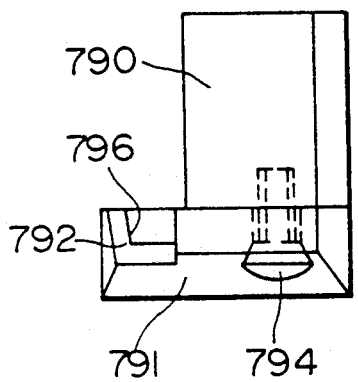
FIG. 65 is a view as viewed from the arrow LXV in FIG. 64.

In connection with the above, in the case where each of the chip guide elements 791 is united with a corresponding one of the wedge elements 790, as shown in FIGS. 63 through 65, it is of course that the arrangement may be such that the chip guide element 791 is fixedly mounted to the wedge element 790 by a bolt 794.

Figure 66:
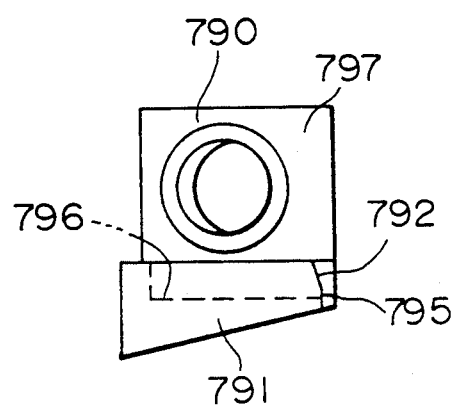
FIG. 66 is a view of another modification of the modification illustrated in FIGS. 59 through 62.

Further, as shown in FIG. 66, it is naturally possible to form a planar surface 795 on a part of the end face 792, similarly to the modification illustrated in FIG. 59.

In connection with the above, the reference numeral 796 in FIGS. 59 through 66 denotes a groove for improving discharge of the chips passing through the gap t9. The reference numeral 797 designates an outer peripheral side surface which is formed into an arcuate surface contiguous to the wall surface 775a of the tip pocket 775 formed in the cutter body 751. Further, the reference numeral 798 denotes a bolt for mounting the wedge element 790 to the cutter body 751. The reference numeral 799 designates a bolt bore through which the bolt 798 extends.

Furthermore, in the ninth embodiment and the various modifications, the end face 779 or 792 of the chip guide element 771 or 791 is formed into the inclined surface to enlarge the gap t9. The invention should not be limited to this specific example. Various modifications may be made in which the end face 779 or 792 is formed into an arcuate surface, an inclined surface in which an angle changes in a multiple step manner, a surface spaced from the face 752a in a step manner, or the like.

Referring next to FIGS. 67 through 70, there is shown a rotatable cutting tool according to a tenth embodiment of the invention.

The rotatable cutting tool according to the tenth embodiment comprises a cutter body 813 which is generally in the form of a cylinder having a central bore 814. A plurality of recesses or grooves 815 are formed in the outer periphery of the forward end of the cutter body 813 in equidistantly spaced relation to each other in the peripheral direction of the cutting tool, and open toward the forward end face and the outer peripheral surface of the cutter body 813. At least one or a plurality of tips 816 each in the form of a planar plate are detachably mounted respectively to the grooves 815 by respective wedge elements 818 which are fastened respectively by clamp screws 817. One of cutting edges 819 formed respectively at the ridgelines of a face 816a of one of the tips 816 slightly projects from the forward end face of the cutter body 813. A plurality of tip pockets 820 each having an arcuate wall surface are formed in the peripheral surface of the cuter body 813 at respective locations facing toward the faces 816a of the respective tips 816.

Figure 67:
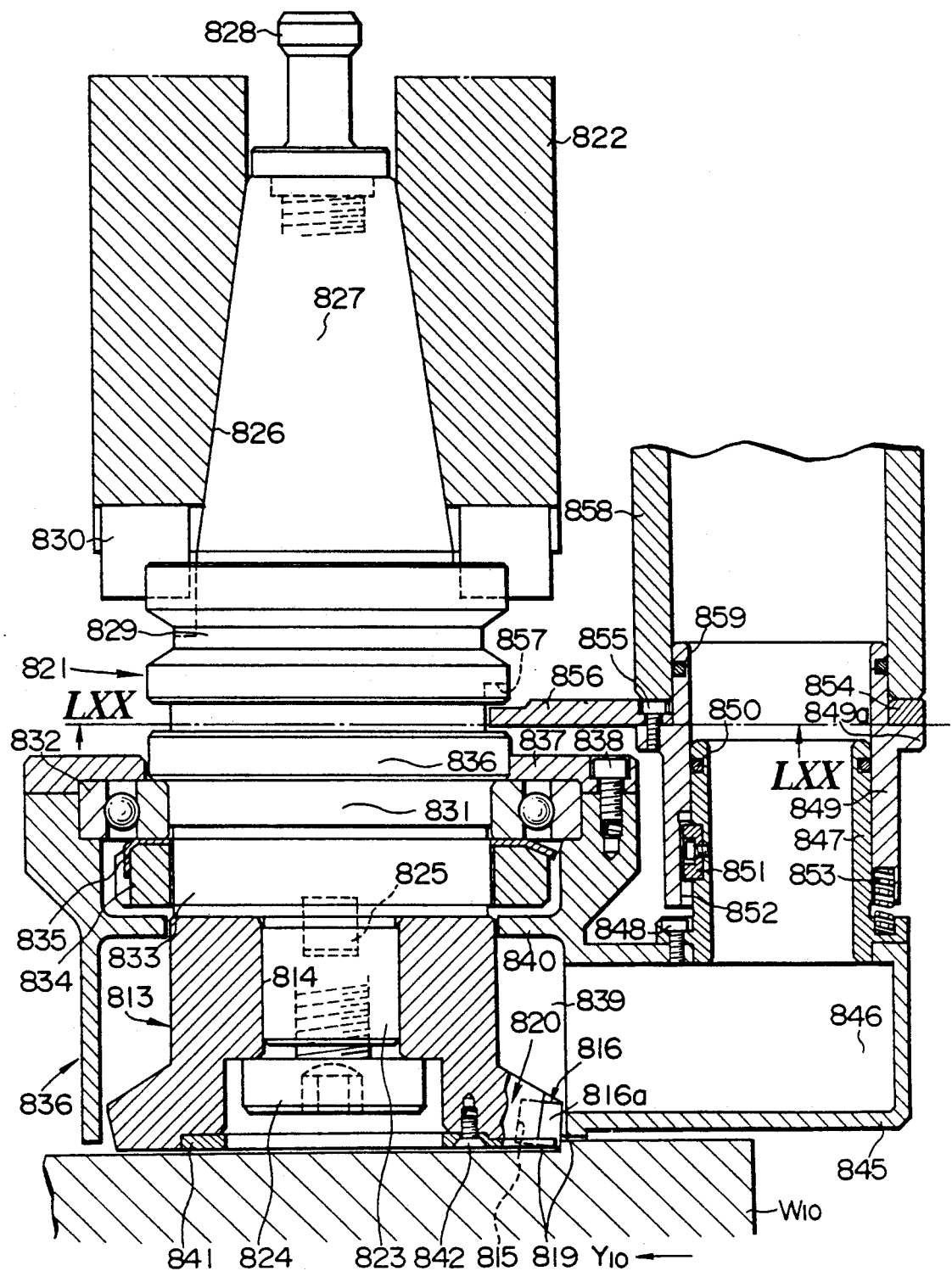
FIG. 67 is a longitudinal cross-sectional view of a rotary cutting tool according to a tenth embodiment of the invention.

As shown in FIG. 67, an arbor 821 is arranged at the proximal end of the cutter body 813. The arbor 821 is provided for mounting the cutter body 813 to a main spindle 822 of a machine tool. The arbor 821 has its forward end which is formed with a fitting shaft 823 fitted in the central bore 814 of the cutter body 813. Further, a fastening bolt 824 is screwed into the fitting shaft 823. The fitting shaft 823 is axially screwed by the fastening bolt 824, whereby the cutter body 813 is detachably mounted to the arbor 821. Further, a key 825 is interposed between the arbor 821 and the cutter body 813 for restricting rotation of the cutter body 813.

On the other hand, a taper shank (hereinafter referred simply to as "shank") 827 is formed at the proximal end of the arbor 821, and is inserted in a tapered bore 826 formed in the main spindle 822. A pull stud 828 is screwed into the forward end of the shank 827, and is engaged with a draw bar (not shown) within the main spindle 822. The pull stud 828 is pulled up toward the rearward end of the main spindle 822 by the draw bar, whereby the arbor 821 is detachably mounted to the main spindle 822.

A grip 829 is formed at the proximal end of the shank 877 and is engaged with a tool exchanging arm (not shown) of an automatic tool exchanging apparatus which is provided on the machine tool. A plurality of keys 830 are interposed between the grip 829 and the main spindle 822 for transmitting rotation of the main spindle 822 to the arbor 821.

Furthermore, an intermediate shaft 831 is formed between the grip 829 and the fitting shaft 823. A radial bearing (hereinafter referred simply to a "bearing") 832 is fitted about the intermediate shaft 831. The bearing 832 has an inner ring which is clamped between a washer 835 fastened by a nut 834 threadedly engaged with a threaded section 833 at the forward end of the intermediate shaft 831 and a flange 836 formed at the proximal end of the intermediate shaft 831, so that the bearing 832 is restricted from its movement.

Moreover, a cover assembly 836 is fitted about the outer ring of the bearing 832. The cover assembly 836 is generally in the form of a cylinder, and is connected, through a plurality of bolts 838, to a bearing retainer 837 which is fitted about the outer ring of the bearing 832 at a location opposite to the washer 835. Thus, the cover assembly 836 is supported rotatably with respect to the cutter body 813.

Figure 68:
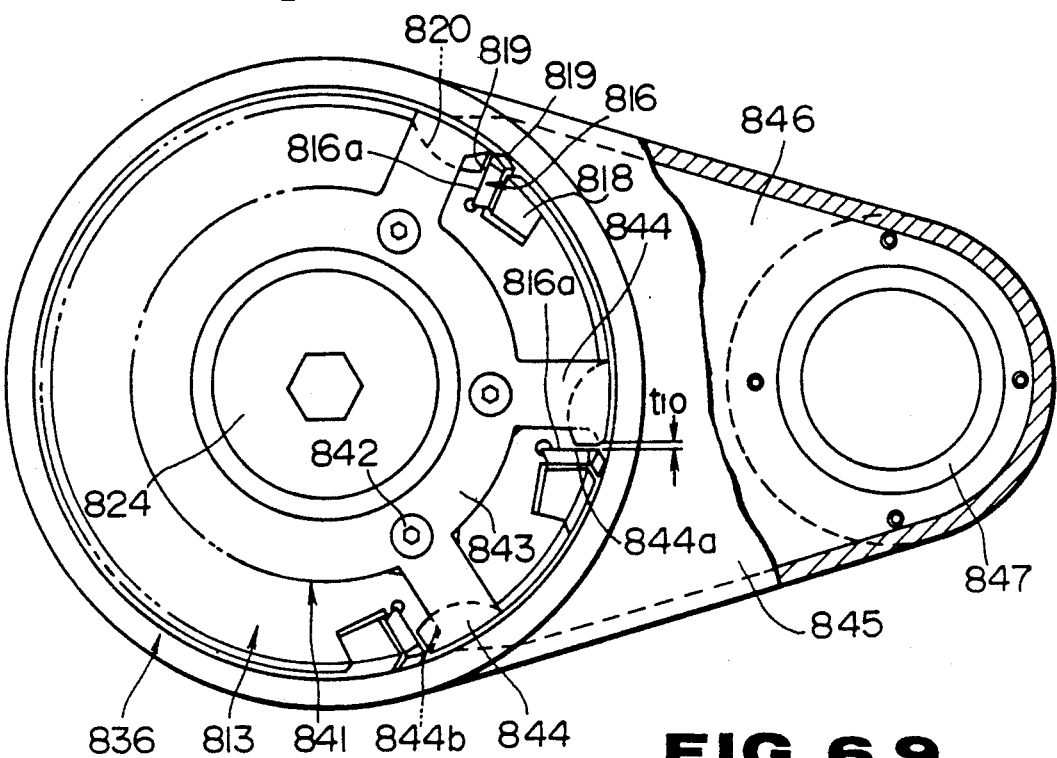
FIG. 68 is a bottom view of the rotary cutting tool illustrated in FIG. 67.

As shown in FIGS. 67 and 68, the forward end of the cover assembly 836 extends to a location slightly moved rearwardly from the depth of cut of the cutting edges 819 of the tips 816 which project radially outwardly of the cutter body 813. The cover assembly 836 has its inner diameter which is so determined as to be slightly larger than a rotational locus of the cutting edges 819 about the axis of the cutter body 813. A plurality of radial gaps between the inner peripheral surface of the cover assembly 836 and the respective cutting edges 813 projecting radially outwardly of the cutter body 813 are suitably determined in accordance with the material of the workpiece, cutting conditions, and so on. It is desirable, however, that each of the radial gap quantities be determined within a range of from 0.5 mm to 2 mm. In order to perform more reliable chip processing, it is desirable that the radial gap quantity be set within a range of from 0.5 mm to 1 mm. If the gap size is less than 0.5 mm, there is a fear that the cutting edges 819 are bitten into the cover assembly 836 due to eccentricity thereof or the like. On the other hand, if the radial gap quantity exceeds 2 mm, a chip suction force is reduced so that the reduction of the chip processing ability is unavoidable.

A chip accommodating chamber 839 is defined between the inner peripheral surface of the cover assembly 836 and the outer peripheral surface of the cutter body 813 adjacent the proximal end thereof. The chip accommodating chamber 839 is partitioned from the side of the inner periphery of the cover assembly 832 facing toward the bearing 832, by a diameter-reduced section 840 which is formed on the inner peripheral surface of the cove assembly 836 adjacent the proximal end thereof.

Figure 69:
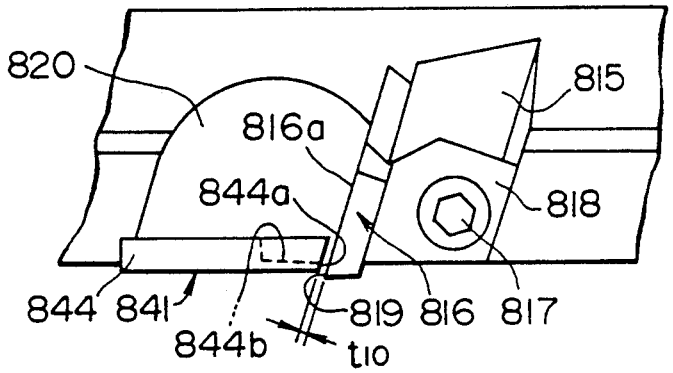
FIG. 69 is a fragmentary enlarged view of an outer periphery of a forward end of a cutter body illustrated in FIGS. 67 and 68.

As shown in FIGS. 67 through 69, a chip guide element 841 is mounted to the forward end face of the cutter body 813 by a plurality of flat head screws 842. The chip guide element 841 comprises a mounting section 843 in the form of a thin ring, and a plurality of guide sections 844 formed at a peripheral edge of the mounting section 843 in equidistantly spaced relation to each other in the peripheral direction for covering the tip pockets 820. The chip guide section 843 has its surface which is so positioned as to be moved rearwardly toward the proximal end of the cutter body 813 from the cutting edges 819 of the tips 816. Further, a gap $t_{10}$ is provided between the face 816a of each of the tips 816 and an end face 844a of a corresponding one of the guide sections 844 facing toward the face 816a, for guiding chips generated along the face 816a, to the tip pocket 820.

Furthermore, a groove 844b is formed in the reverse side of the forward end of the guide section 844, and extends from the end face 844a toward the wall surface of the tip pocket 820. Thus, consideration is made to prevent the chips passing through the gap $t_{10}$ from being clogged to discharge the chips to the tip pocket 820 without hindrance.

On the other hand, as shown in FIGS. 67 and 68, a projection 845 is formed at a part of the peripheral wall of the cover assembly 836, and projects radially outwardly of the cutter body 813. The projection 845 has its interior which is formed into a chip guide passage 846 communicating with the chip accommodating chamber 839. A primary suction tube 847 serving as a first suction port element has its proximal end which is fitted in a side face of the forward end of the projection 845 facing axially of the cutting body 813. The primary suction tube 847 has its forward end which extends toward the shank 827 along the axial direction of the cutter body 813. The primary suction tube 847 has it interior which communicates with the chip accommodating chamber 839 through the chip guide passage 845. The primary suction tube 847 is fixedly mounted to the projection 845 by a plurality of bolts 848.

A connecting pipe 849 serving as a connecting member or element is fitted about the outer periphery of the primary suction tube 847 for sliding movement along the primary suction tube 847 in the axial direction. The tubes 847 and 849 have their respective interiors which are sealed air tight by an 0-ring 850. A key groove 852 is formed in the inner peripheral surface o the proximal end of the connecting tube 849, and is engaged with a key 851 which is arranged on the outer peripheral surface of the primary suction tube 847; Thus, the connecting tube 849 is restricted from its rotation. Further, a spring 853 serving as biasing means is arranged between the primary suction tube 847 and the connecting tube 849 for biasing the connecting tube 849 toward the shank 827.

Figure 70:
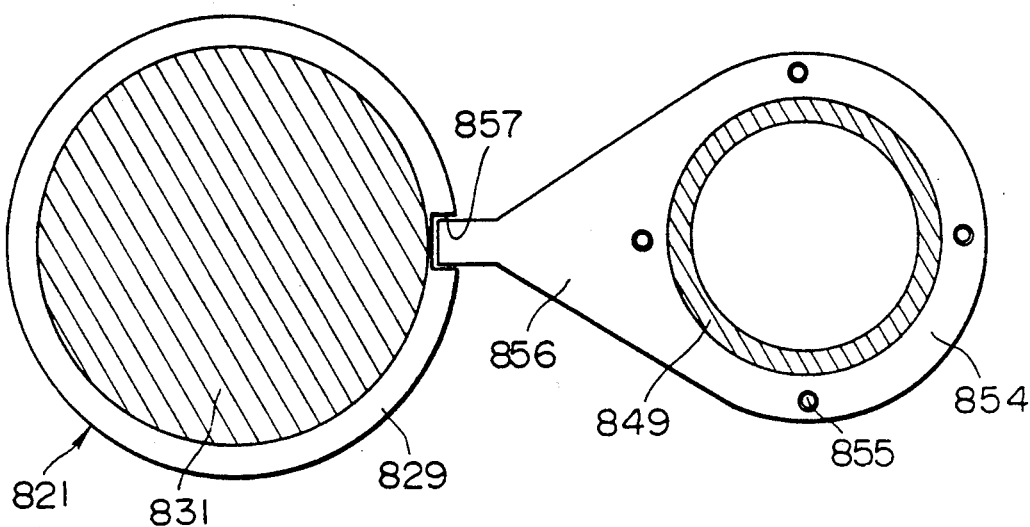
FIG. 70 is a cross-sectional view taken along the line LXX—LXX in FIG. 67.

Further, a flange 849a is formed at the outer peripheral surface of the connecting tube 849. A stopper 854 serving as an engaging member or element is in contact with the flange 849a and is fixedly connected thereto by a plurality of bolts 855. As shown in FIGS. 67 and 70, an engaging section 856 is formed at a part of the peripheral edge of the stopper 854, and extends toward the radial center of the cutter body 813. On the other hand, a groove 857 is formed at a location in the grip 829 of the arbor 821, which faces toward the forward end of the engaging section 856. The groove 857 opens toward the forward end of the cutter body 813 and outwardly of the peripheral surface of the arbor 821. The forward end of the engaging section 856 is engageable with the groove 857, accompanied with sliding movement of the connecting tube 849, As shown in FIG. 67, a secondary suction tube 858 serving as a second suction port element is arranged at a forward end of a main spindle head (not shown) of the machine tool supporting the main spindle 822, that is, at a location in coaxial relation to the connecting tube 849 at the time the arbor 821 is mounted to the main spindle 822. The secondary suction tube 858 has a forward end which is connected in a gas-tight manner to the forward end of the connecting tube 849 through an 0-ring 859 when the arbor 821 is mounted to the main spindle 822. The forward end of the secondary suction tube 858 is abutted against the stopper 854 to press down the connecting tube 849 toward the forward end of the cutter body 813. Moreover, the secondary suction tube 858 has a proximal end (not shown) which is connected to a suction machine (not shown) provided on the machine tool.

The operation of the face milling cutter constructed as above will be described below.

The face milling cutter constructed as above is stored within a magazine (not shown) of the automatic tool exchanging apparatus of the machine tool. The face milling cutter is transported to a tool exchanging arm of the automatic tool exchanging apparatus from this condition, and is mounted to the main spindle 822. During the transportation, the connecting tube 849 is biased by the spring 853 toward the forward end of the shank 827. Thus, the engaging section 856 of the stopper 854 is engaged with the groove 857 of the arbor 821. Accordingly under the magazine storing condition and during exchange of the tool, the cover assembly 836 is prevented from being rotated and is anchored to a predetermined peripheral position with respect to the arbor 821.

The arbor 821 is mounted to the main spindle 822, whereby the connecting tube 849 is fitted about the secondary suction tube 858 which is fixedly mounted to the machine side. Thus, the chip accommodating chamber 839 within the cover assembly 836 is connected to the suction machine provided on the machine side, through the chip guide passage 846, the primary suction tube 847, the connecting tube 849 and the secondary suction tube 858. Further, when the secondary suction tube 858 is connected to the connecting tube 849, the connecting tube 849 is pushed toward the forward end of the cutter body 813 against the biasing force of the spring 853. Accordingly, the forward end of the engaging section 856 of the stopper 854 is released from the groove 857 of the arbor 821. Thus, the arbor 821 and the cover assembly 836 are brought to their rotatable conditions independently of each other. However, the cover assembly 836 is continuously restricted against rotation by the secondary suction tube 858 connected to the connecting tube 849.

After the arbor 821 has been mounted to the main spindle 822, the cutter body 813 is rotated about its rotational axis by the main spindle 822, and the workpiece $W_{10}$ is fed in a direction $Y_{10}$ in FIG. 67 by a table (not shown) of the machine tool. In this manner, the cutting edges 819 of the respective tips 816 cut the workpiece $W_{10}$.

At this time, the suction machine connected to the proximal end of the secondary suction tube 858 draws air within the chip accommodating chamber 839 through the connecting tube 849, the primary suction tube 847 and the chip guide passage 846. Thus, air surrounding the cutter body 813 is successively drawn into the chip accommodating chamber 839 from the opening section of the forward end of the cover assembly 836.

Furthermore, the chips generated along the faces 816a of the tips 816 from the cutting edges 819 thereof are passed through the gap $t_{10}$ between the end faces 844a of the chip guide elements 841 and the faces 816a of the tips 816, and are guided to the tip pockets 820. The chips are rounded off and divided into pieces by the tip pockets 820. The divided chips are drawn into the chip accommodating chamber 839 together with air drawn through the opening at the forward end of the cover assembly 836. The divided chips are further drawn and collected by the suction machine through the chip guide passage 846, the primary suction tube 847 and so on.

When the tool is removed from the main spindle 822 after processing has been completed, the cutter body 813 and the arbor 821 are positioned at their peripheral locations which are the same as those at mounting of the main spindle 822 by the orientation function of the main spindle 822, because of engagement between the cutter body 813 and the arbor 821 and the tool exchanging arm. Accompanied with the positioning, the groove 857 of the arbor 821 is positioned at a location directed toward the forward end of the engaging section 856 of the stopper 854. Thus, the arbor 821 is removed from the main spindle 822 and, simultaneously, the groove 857 and the engaging section 856 of the stopper 854 are again engaged with each other. In this manner, rotation of the cover assembly 836 is again restricted by the arbor 821.

As described above, in the face milling cutter in the tenth embodiment, the cover assembly 836 is anchored to the predetermined peripheral position with respect to the arbor 821 under such a condition that the face milling cutter is removed from the main spindle 822. Further, the construction is such that the cover assembly 836 and the arbor 821 are disengaged from each other in interlocking relation to mounting of the arbor 821 to the main spindle 822 and, simultaneously, the chip accommodating chamber 839 and the suction machine communicate with each other. Accordingly, the face milling cutter can be used in a machine tool such as a machining center or the like provided with an automatic tool exchanging apparatus without any hindrance. Thus, there can be obtained remarkable functional advantages in the case where a large quantity of chips is generated and it is impossible for an operator to handle the chip processing, such as the case in which unmanned processing is done by a machining center for a long period of time.

What is claimed is:

1. A rotary cutting tool comprising a cutter body having a rotational axis therethrough and having forward and proximal ends, cutting means provided on the outer periphery of said cutter body and chip suction means attached to said cutter body for drawing chips generated by said cutting means, said chip suction means including:

generally cylindrical cover means supported by said cutter body for rotation relative thereto and covering the outer peripheral surface of the forward end of said cutter body so as to define a chip accommodating chamber between said cover means and the outer peripheral surface of said cutter body;

a chip guide member arranged at the forward end of said cutter body in facing relation to said cutting means for guiding the chips generated by said cutting means to said chip accommodating chamber; and suction port means provided on said cover means so as to be communicated with said chip accommodating chamber.

2. A rotary cutting tool according to claim 1, wherein said cutting means comprises at least one cutting tip.

3. A rotary cutting tool for use with a machine body, according to claim 1, wherein said cutter body is formed, at its center, with a central bore and has a cut-out formed in a periphery of said central bore, said proximal end of said cutter body being adapted to be connected to said machine body, and wherein said rotary cutting tool further comprises cutter fastening means attached to said cutter body for connecting the same to said machine body, said cutter fastening means including:

an adapter having a forward end which is fitted in the proximal end of said cutter body, said adapter having a proximal end which is connected to said machine body for rotation therewith;

an intermediate member inserted in said central bore of said cutter body, said intermediate member being formed, at its outer periphery, with a projection which is fitted in said cut-out of said cutter body;

a drive key interposed between said adapter and said intermediate means for transmitting rotation of said adapter to said cutter body; and a connecting bolt means fitted in a center of said intermediate means for fastening the intermediate member and said adapter to each other.

4. A rotary cutting tool according to claim 2, further comprising work clamp means arranged at the forward end of said cutter body for pressing down a workpiece, wherein said cutter body has the forward end thereof which is formed, at its center, with a recess, and wherein said work clamp means includes:

a support member inserted in said recess of said cutter body for axial movement therealong;

biasing means for biasing said support member toward the forward end of said cutter body; and a work clamping member arranged at a location closer to said forward end of said cutter body than said support member, said clamping member having its proximal end which is supported by said support member for rotation about the rotational axis of said cutter body.

5. A rotary cutting tool according to claim 2, wherein a plurality of said suction port means are arranged on an outer periphery of said cover means in circumferentially spaced relation to one another.

6. A rotary cutting tool according to claim 2, wherein said cover means has its forward end which opens toward the forward end of said cutter body, and wherein said cover means is arranged such that it has its forward end whose position is adjustable in an axial direction of said cutter body.

7. A rotary cutting tool according to claim 2, wherein said cutter body has its forward end whose outer periphery is formed with a recess opening to the forward end and the outer periphery of said cutter body, wherein said rotary cutting tool further comprises clamp means for detachably mounting said cutting tip to said recess, wherein said clamp means has its forward end facing toward the forward end of said cutter body, and wherein said chip guide member is arranged such that gaps are formed respectively between said chip guide member and the face of said cutting tip and between said chip guide member and the inner peripheral surface of the forward end of said cover means.

8. A rotary cutting tool according to claim 2, wherein said cutting tip includes a face cutting edge and an outer peripheral cutting edge, wherein said cover means covers said outer peripheral cutting edge, said cover means having its axis identical with that of said cutter body, and wherein said rotary cutting tool further comprises air-jet pump means arranged at said cover means for drawing air within said chip accommodating chamber to discharge said chips to the outside.

9. A rotary cutting tool according to claim 2, wherein said chip guide member is arranged so as to be directed toward said face of said cutting tip with a gap formed therebetween, whereby the chips generated along the face of said cutting tip are drawn into said chip accommodating chamber through said gap, wherein said chip guide member has its outer peripheral side surface which is formed into an arcuate surface contiguous to the outer peripheral surface of said cutter body, wherein said chip guide member has a groove formed at the side of said chip guide member which faces toward said chip accommodating chamber, said groove facing toward the face of said cutting tip, and wherein, of said groove, a wall surface opposed to said arcuate surface is formed into an arcuate concave surface which is substantially coaxial with said outer peripheral side surface.

10. A rotary cutting tool according to claim 2, wherein said chip guide member is arranged so a to be directed toward said face of said cutting tip with a gap formed therebetween, whereby the chips generated along the face of said cutting tip are drawn into said chip accommodating chamber through said gap, wherein said chip guide member is movable circumferentially of said cutter body.

11. A rotary cutting tool according to claim 2, wherein said chip guide member is arranged so as to be directed toward said face of said cutting tip with a gap formed therebetween, whereby the chips generated along the face of said cutting tip are drawn into said chip accommodating chamber through said gap, wherein said chip guide member has an end face which is opposed to said face of said cutting tip, said end face of said chip guide means being so formed as to be gradually spaced away from said face of said cutting tip toward said proximal end of said cutting tool.

12. A rotary cutting tool according to claim 11, wherein, of the end face of said chip guide member which is opposed to said face of said cutting tip, a portion, which is located adjacent to the forward end of said cutter body, is provided with a planar section which is substantially in parallel with the face of said cutting tip.

13. A rotary cutting tool for us with a machine tool having a spindle, according to claim 2, further comprising:
- an arbor adapted to be fitted in said spindle and arranged at the proximal end of said cutter body;
- first suction port means communicating with said chip accommodating chamber and having a forward end which extends toward said arbor;
- connecting means communicating with said first suction port means, said connecting means being fitted in said first port means under such a condition as to be movable axially of said cutter body;
- biasing means for biasing said connecting means toward said arbor;
- a groove formed in a peripheral edge of said arbor and opening outwardly of a peripheral surface of said arbor and toward the forward end of said cutter body;
- an engaging member arranged on a surface of said connecting means for engaging with said groove; and
- second suction port means arranged adjacent to said spindle of said machine tool and fitted with respect to said connecting means when said arbor is fitted in said spindle to press down said connecting means toward the forward end of said cutter body against a biasing force of said biasing means.

14. A rotary cutting tool according to claim 2, wherein said cover means has its forward end which extends to such a position as to cover one of a plurality of cutting edges of said cutting tip, which projects radially outwardly of said cutter body.

15. A rotary cutting tool according to claim 14, wherein said cover means has its inner diameter which is so determined as to be larger than a locus of rotation of the one of said cutting edges of said cutting tip, which projects radially outwardly of said cutter body.

16. A rotary cutting tool for use with a suction device having hose means, according to claim 2, wherein said suction port means is formed by tube means whose one end is fitted in said intermediate section of said cover means, the other end of said tube means being connected to said hose means of said suction device.

17. A rotary cutting tool according to claim 2, wherein a radial gap is defined between the inner peripheral surface of the forward end of said cover means and one of a plurality of cutting edges of said cutting chip, which projects outwardly of the peripheral surface of said cutter body, said radial gap being of the order of 0.5 mm to 2 mm.

18. A rotary cutting tool according to claim 17, wherein said radial gap is within 1 mm.

19. A rotary cutting tool according to claim 1, wherein said cover means has its forward end extending substantially to an intermediate position of one of a plurality of cutting edges of said cutting tip, which projects radially outwardly of said cutter body.

20. A rotary cutting tool according to claim 19, wherein the forward end of said cover means has its inner diameter which is so determined as to be larger than a rotational locus, about the rotational axis of said cutter body, of the one of said cutting edges of said cutting tip, which projects radially outwardly of said cutter body.

21. A rotary cutting tool according to claim 2, wherein said cover means has an intermediate section contiguous to said forward end of said cover means, said intermediate section being enlarged in diameter more than that of said forward end of said cutter body, and wherein said cutter body has its proximal end which is reduced in diameter, whose outer periphery cooperates with an inner peripheral surface of said intermediate section to define said chip accommodating chamber.

22. A rotary cutting tool according to claim 21, wherein said suction port means includes a pair of suction ports at their respective locations where the outer peripheral surface of said cover means is equally divided into two peripherally, and a pair of suction hoses connected respectively to said pair of suction ports, and wherein said pair of suction ports have their respective one ends which are fitted in said intermediate section of said cover means, the other ends of the respective suction ports being connected respectively to said pair of suction hoses so that said cover means is restricted by said suction hoses against rotation about the rotational axis of said cutter body.

23. A rotary cutting tool according to claim 2, wherein said suction port means includes a plurality of suction ports arranged in equidistantly spaced relation to each other.

24. A rotary cutting tool according to claim 2, wherein said suction port means includes a plurality of suction ports arranged in concentrated manner at a location forwardly of a feeding direction of said cutter body.

25. A rotary cutting tool according to claim 2, wherein said cover means has a forward end extending to a location shifted rearwardly from a depth of cut of one of a plurality of cutting edges of said cutting tip, which projects radially outwardly of said cutter body.

26. A rotary cutting tool according to claim 3, wherein said cover means has, at its proximal end, a fitting section which is arranged at the proximal end of said cutter body, said adapter being fitted in said fitting section of said cover mean for rotation relative thereto.

27. A rotary cutting tool according to claim 3, wherein said adapter is formed, at its outer periphery, with a flange which is clamped between the proximal end of said cover means and the proximal end of said cutter body.

28. A rotary cutting tool according to claim 3, wherein said adapter has an annular projection which is fitted in a fitting section of said central bore in said cutter body, said drive key being fixedly mounted on said annular projection.

* * * * *